(12) United States Patent
Lu et al.

(10) Patent No.: US 7,528,990 B2
(45) Date of Patent: May 5, 2009

(54) IMAGE-FORMING SYSTEM WITH IMPROVED WORKABILITY BY DISPLAYING IMAGE FINISH AND SETTING ITEMS IN COURSE OF PROCESSING

(75) Inventors: Bin Lu, Tokyo (JP); Tetsuya Muroi, Kanagwa-ken (JP); Junichi Takami, Kanagawa-ken (JP); Iwao Saeki, Kanagawa-ken (JP); Tetsuya Sakayori, Tokyo (JP); Yoshinaga Kato, Kanagawa-ken (JP); Yoshifumi Sakuramata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 708 days.

(21) Appl. No.: 11/153,911

(22) Filed: Jun. 16, 2005

(65) Prior Publication Data

US 2006/0181750 A1 Aug. 17, 2006

(30) Foreign Application Priority Data

Jun. 16, 2004 (JP) ............................. 2004-178883
Aug. 26, 2004 (JP) ............................. 2004-247133
Sep. 15, 2004 (JP) ............................. 2004-268846

(51) Int. Cl.
*H04N 1/40* (2006.01)
(52) U.S. Cl. ........................ 358/1.9; 358/527
(58) Field of Classification Search ................. 358/1.9, 358/2.1, 1.15–1.17, 406, 504, 527, 468
See application file for complete search history.

(56) References Cited

U.S. PATENT DOCUMENTS

2005/0128521 A1* 6/2005 Takahashi ................... 358/1.15

FOREIGN PATENT DOCUMENTS

| JP | 8-279884 | 10/1996 |
|---|---|---|
| JP | 2001-285534 | 10/2001 |

* cited by examiner

*Primary Examiner*—Thomas D Lee
*Assistant Examiner*—Stephen M Brinich
(74) *Attorney, Agent, or Firm*—Dickstein Shapiro LLP

(57) ABSTRACT

An image finish information generation unit included in an image-forming system is configured to generate an expected image finish and an input setting screen to be used for receiving setting inputs from an operator based on image data obtained by reading a document by a scanner or through a network, and to instruct a display unit to display the image finish and the setting screen before print processing. If the operator makes further setting inputs through the input setting screen, another expected image finish screen is generated and displayed, incorporating the setting inputs. Through a spatial item identification unit and a language item identification unit, spatial position information received by a touch panel is identified as a spatial setting item, and voice information through a microphone is recognized by the language item identification as a language setting item. In addition, related setting items are prepared and displayed in a hierarchy.

44 Claims, 60 Drawing Sheets

| SETTING ITEM | | | | |
|---|---|---|---|---|
| 1. KIND OF DOCUMENT | : ☐ CHARACTER | ☐ PHOTOGRAPH | | |
| 2. STAPLE | : ☐ LEFT | ☐ MIDDLE | ☐ RIGHT | |
| | ☐ TOP | ☐ MIDDLE | ☐ BOTTOM | |
| 3. PUNCH | : ☐ LEFT | ☐ RIGHT | ☐ TOP | |

FIG. 3A

| SETTING ITEM | | | | | | |
|---|---|---|---|---|---|---|
| 1. KIND OF DOCUMENT | : | ☑ CHARACTER | | ☑ PHOTOGRAPH | | |
| 2. STAPLE | : | ☑ LEFT | | ☐ MIDDLE | | ☐ RIGHT |
| | | ☑ TOP | | ☐ MIDDLE | | ☐ BOTTOM |
| 3. PUNCH | : | ☑ LEFT | | ☐ RIGHT | | ☐ TOP |

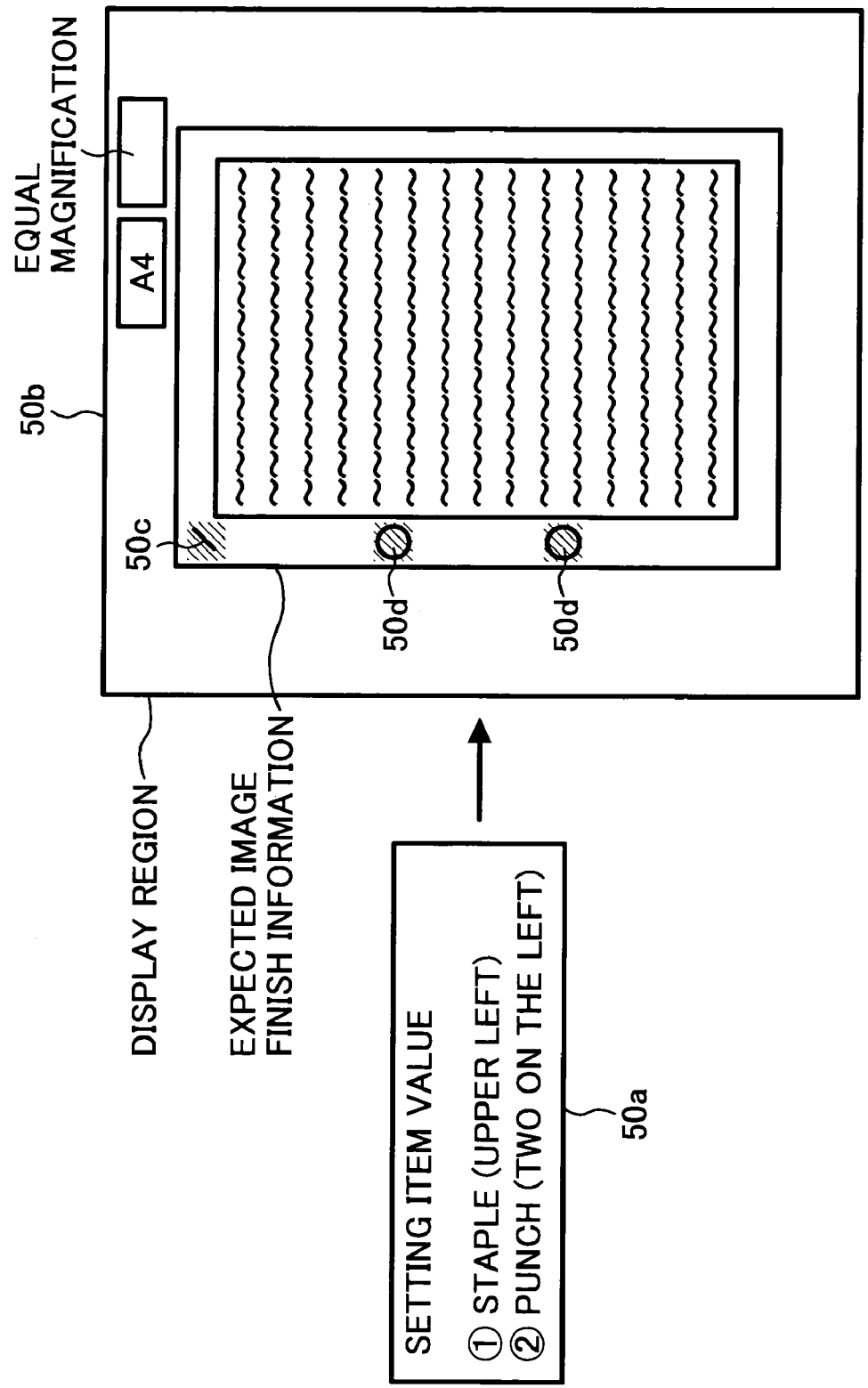

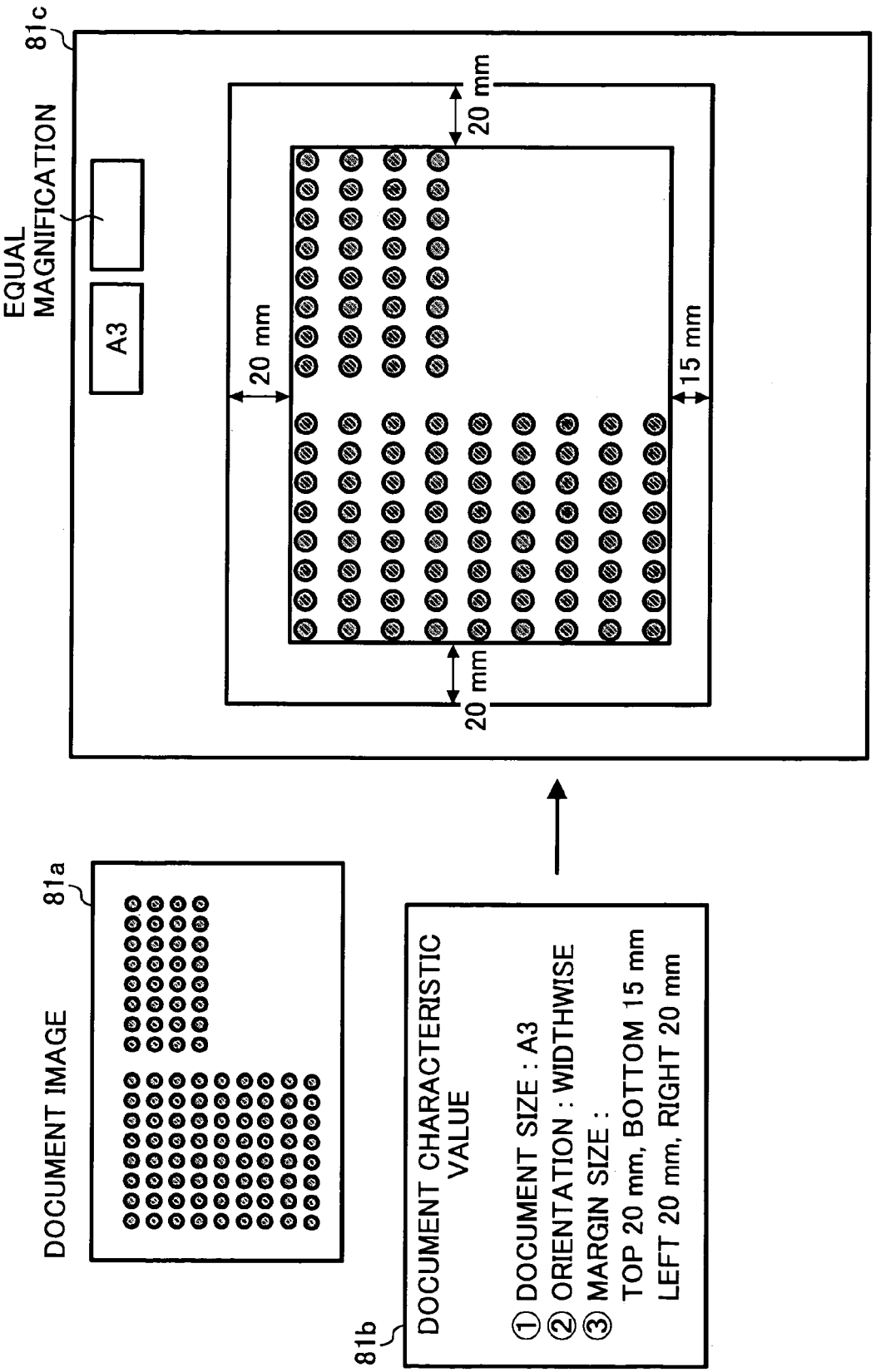

FIG. 10A

| SETTING ITEM | | | | |
|---|---|---|---|---|
| 1. KIND OF DOCUMENT | : | ☑ CHARACTER | ☐ PHOTOGRAPH | |
| 2. STAPLE | : | ☑ LEFT | ☐ MIDDLE | ☐ RIGHT |
| | | ☑ TOP | ☐ MIDDLE | ☐ BOTTOM |
| 3. PUNCH | : | ☑ LEFT | ☐ RIGHT | ☐ TOP |

FIG. 10B

| SETTING ITEM | | | | |
|---|---|---|---|---|
| 1. KIND OF DOCUMENT | : | ☑ CHARACTER | ☐ PHOTOGRAPH | |
| 2. STAPLE | : | ☐ LEFT | ☐ MIDDLE | ☑ RIGHT |
| | | ☑ TOP | ☐ MIDDLE | ☐ BOTTOM |
| 3. PUNCH | : | ☐ LEFT | ☑ RIGHT | ☐ TOP |

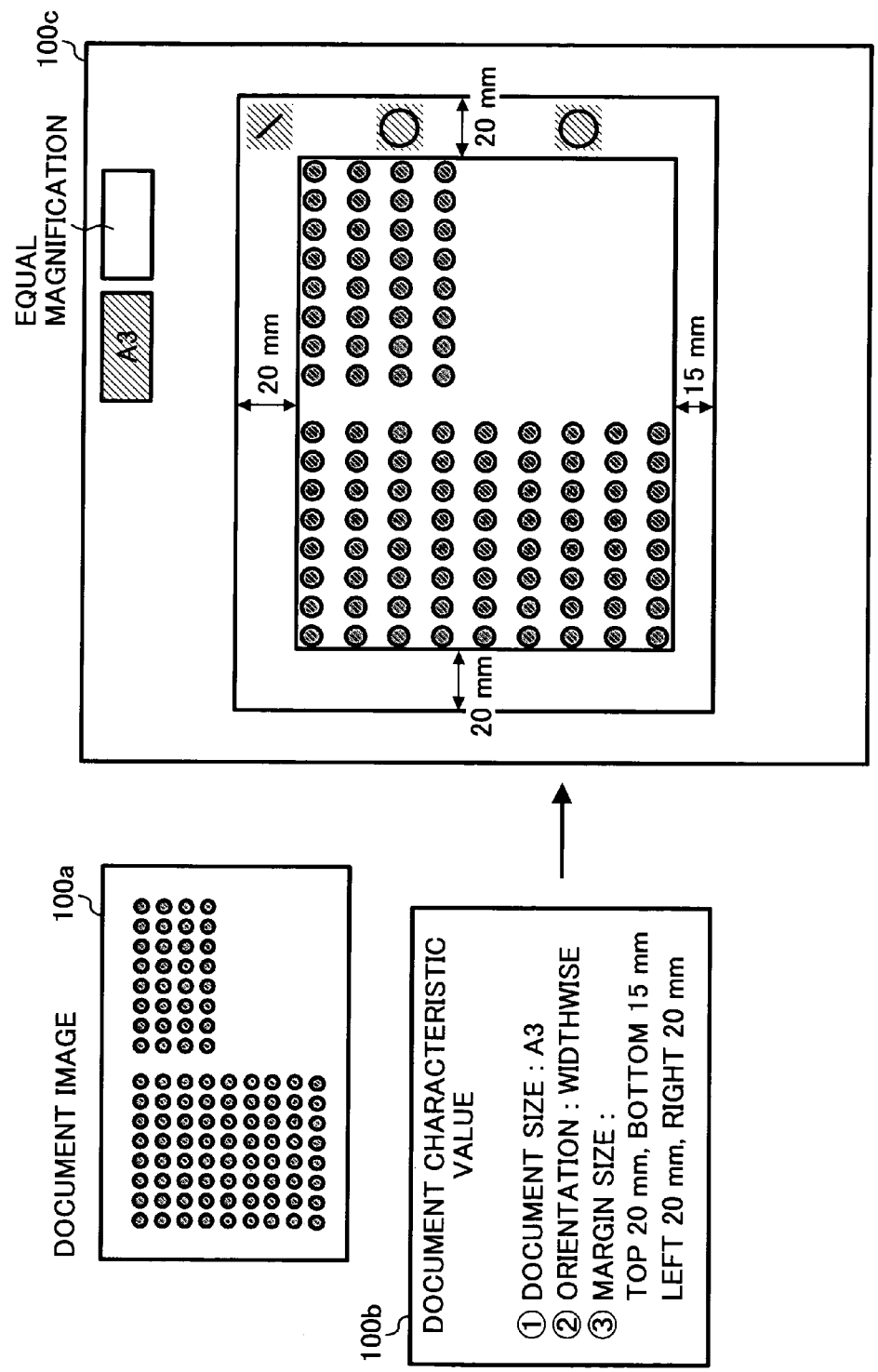

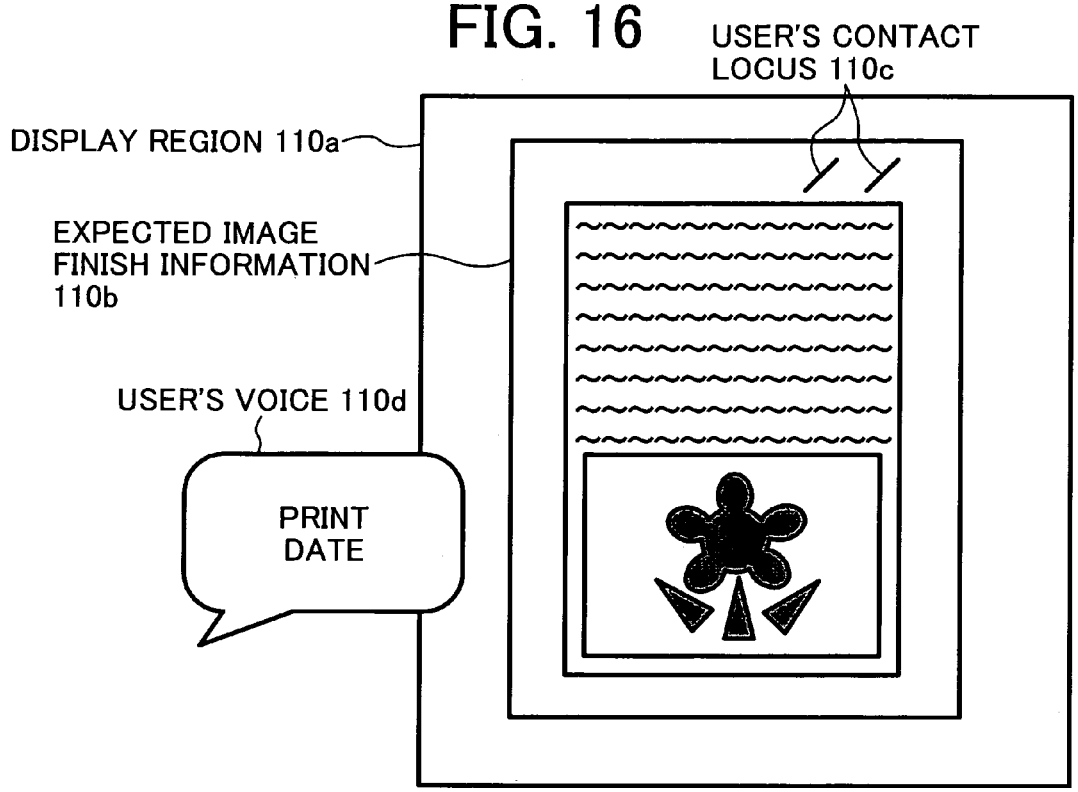
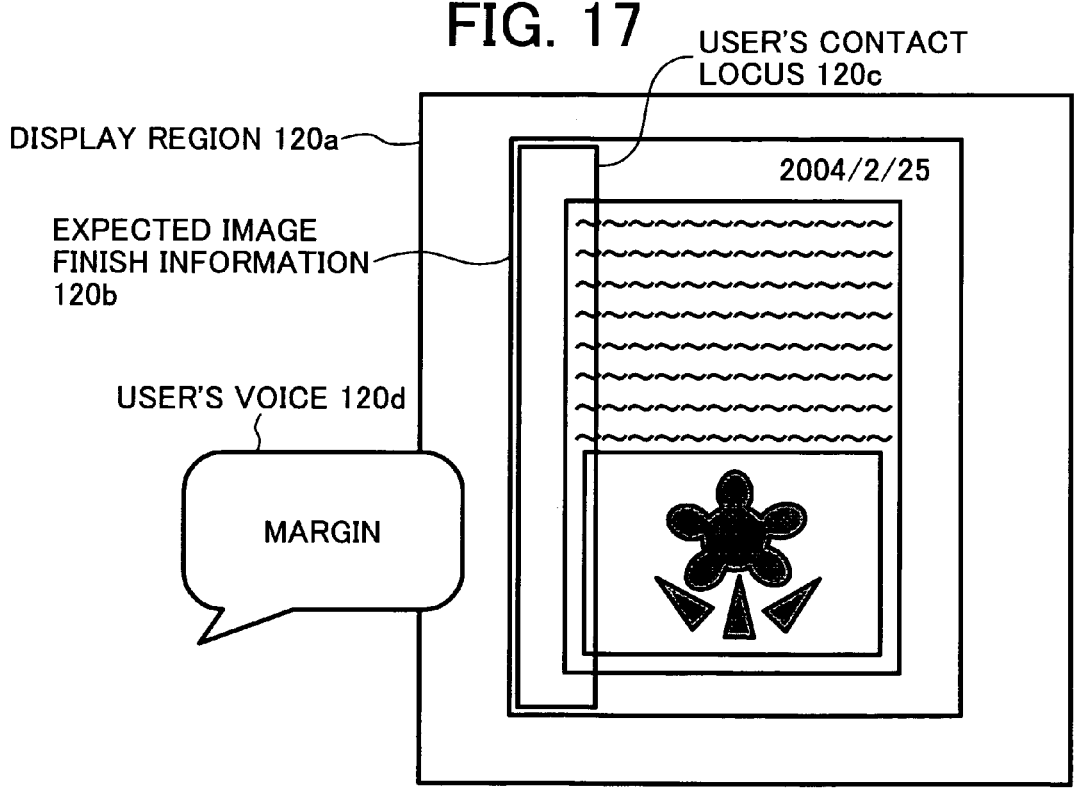

FIG. 37B

| X-AXIS RANGE (%) | Y-AXIS RANGE (%) | SETTING ITEM (1) | SETTING ITEM (2) | STATUS |
|---|---|---|---|---|
| 0-10 | 0-10 | STAPLE AT UPPER LEFT | PUNCH | |
| 0-10 | 0-10 | PUNCH AT UPPER LEFT | STAPLE AT UPPER LEFT | |
| 0-10 | 0-10 | STAMP AT UPPER LEFT | MARGIN, ENLARGEMENT/ REDUCTION | |
| 0-10 | 20-80 | STAPLE ON THE LEFT | PUNCH ON THE LEFT | |
| 0-10 | 20-80 | PUNCH ON THE LEFT | STAPLE ON THE LEFT | |
| 0-10 | 20-80 | LEFT MARGIN | | |
| 40-60 | 40-60 | ENLARGEMENT/ REDUCTION | | |
| 40-60 | 30-70 | SADDLE STITCH | | MULICOLUMN, COLLECTIVE |
| 90-100 | 90-100 | PAGE CHANGE | | MULTIPLE PAGES |
| 90-100 | 0-10 | STAMP AT UPPER RIGHT | MARGIN, ENLARGEMENT/ REDUCTION | |

FIG. 57
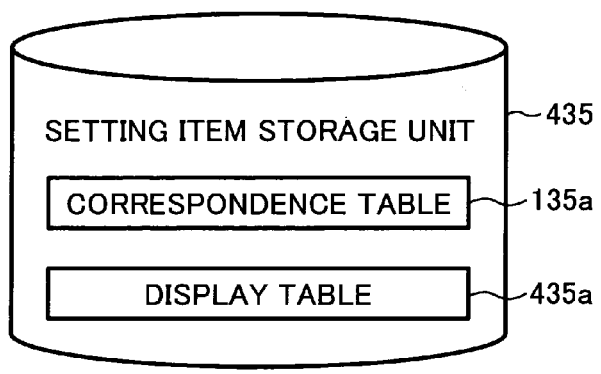
FIG. 58
| X-AXIS RANGE | Y-AXIS RANGE | SETTING ITEM | STATUS |
|---|---|---|---|
| 50 | 50 | COLLECTIVE | COLLECTIVE 2-IN-1 |
435a
FIG. 59
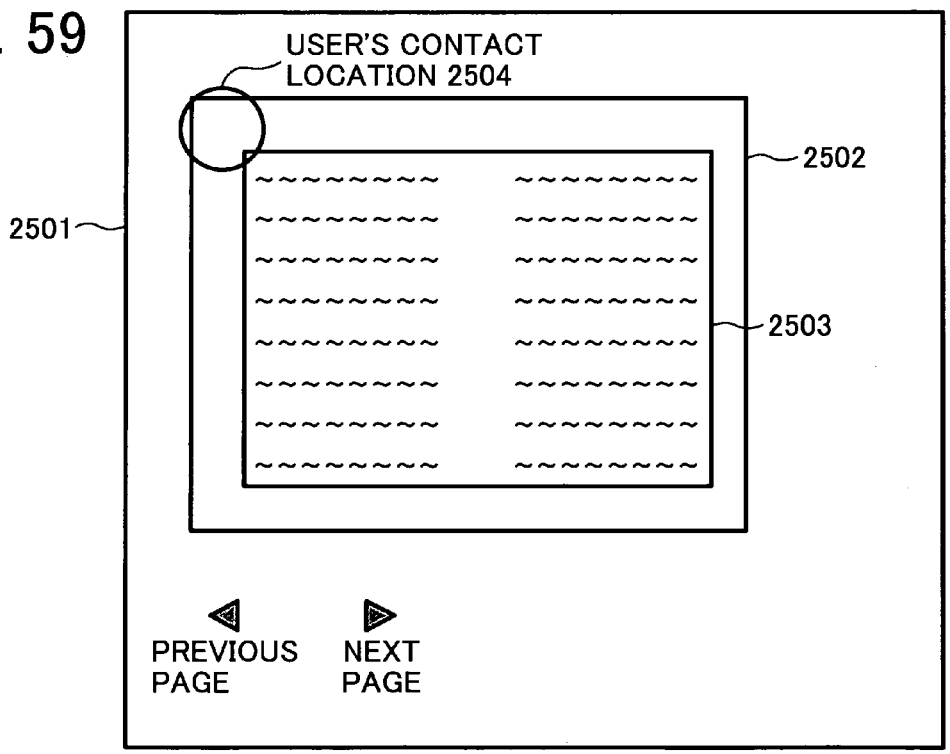

| X-AXIS RANGE | Y-AXIS RANGE | SETTING ITEM | STATUS |
|---|---|---|---|
| 50 | 50 | COLLECTIVE | COLLECTIVE 2-IN-1 |
| 5 | 5 | STAPLE AT UPPER LEFT | |

| X-AXIS RANGE | Y-AXIS RANGE | SETTING ITEM | STATUS |
|---|---|---|---|
| 50 | 50 | COLLECTIVE | COLLECTIVE 2-IN-1 |

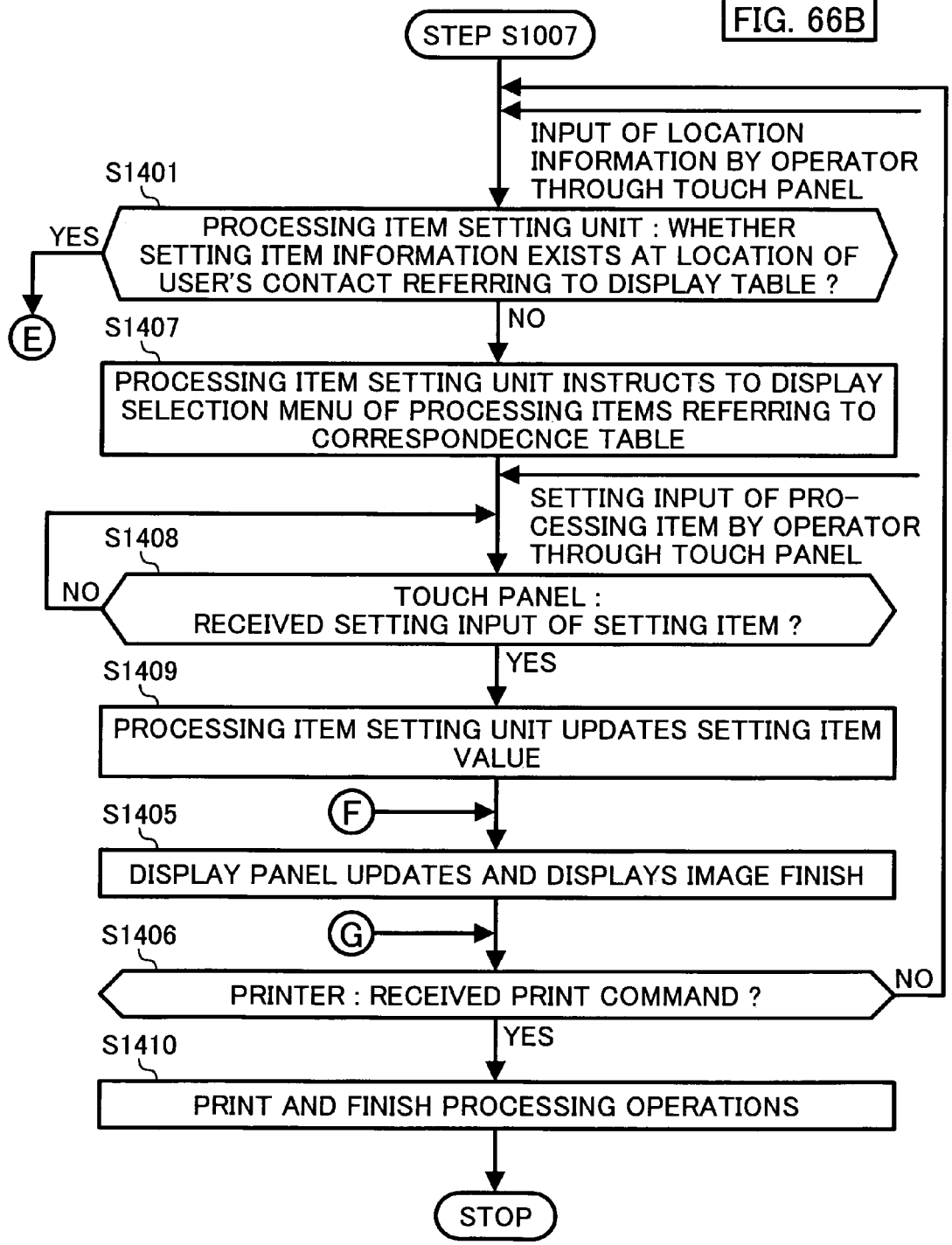

IMAGE-FORMING SYSTEM WITH IMPROVED WORKABILITY BY DISPLAYING IMAGE FINISH AND SETTING ITEMS IN COURSE OF PROCESSING

CROSS-REFERENCE TO RELATED APPLICATIONS

This patent document claims priority and contains subject matter related to Japanese Patent Applications No. 2004-178883, 2004-247133, and 2004-268846, filed with the Japanese Patent Office on Jun. 16, 2004, Aug. 26, 2004, and Sep. 15, 2004, respectively, the entire contents of which are hereby incorporated by reference.

FIELD OF THE INVENTION

The present invention relates generally to image-forming systems, and more specifically to an image-forming system with improved workability by properly processing image data and displaying image finish and related processing items prior to a printout operation and in course of image data processing.

BACKGROUND OF THE INVENTION

A variety of image-forming apparatuses have been widely used, such as a duplication apparatus capable of reading document images by a scanner and printing readout images, a printer or facsimile machine capable of receiving and printing out transmitted images, and a multi-functional machine which combines copy, print, and facsimile functions in one single machine. As the machines and process operations become more complex, it is increasingly important to properly instruct priority and ordering of multiple operations in order to operate efficiently.

In these image-forming apparatuses, the process operations can vary widely depending on various setting conditions, which are related to the original documents, such the type and density of the document, and related to image processing, such as image enlargement/reduction, double/single-sided, and space margin.

A user has to select the conditions and instruct the machine to function properly and efficiently through necessary setting inputs. It is required, therefore, for the user to view a considerably large number of items on a display screen, for example, to select from and make necessary setting inputs accurately.

This problem has been caused at least partly by the fact that conditions (or general information) of the original document are not recognized on machine's side, and that all conceivable options, therefore, have had to be listed in menu selection even including those items unnecessary for the document currently being processed. As a result, the selection menu becomes quite complicated and the operation for menu setting involves tangled procedures, thereby detracting from the user's convenience in machine operation.

In order to obviate this problem, several image-forming apparatuses have been disclosed previously.

For example, Japanese Laid-Open Patent Application No. 8-279884 ('884 application) discloses an image-forming apparatus which is configured to perform a pre-scan of reading a document original upon closing a document presser cover over the document placed onto a document platen; distinguish a document image that has been read out, between color and black-and-white, and character and picture images; and automatically classify image processing according to the distinction, thereby improving the image processing capability of the apparatus.

As another example, another image-forming apparatus is disclosed in Japanese Laid-Open Patent Application No. 2001-285534 ('534 application), in which a setting for document reading conditions is performed with more ease.

Specifically, if the conditions for reading a document are set by a user, the apparatus is configured for the contents of this setting to be grouped together as a set which is subsequently stored to correspond to a designated button for invoking the set of reading conditions. Then, the stored contents can be invoked by touching this button and some of previous items included therein are updated automatically. As a result, the setting of document reading conditions can be achieved with more ease in the apparatus.

While several improvements have been made as indicated above, several problems still persist, in which it is required for a user to view a vast number of items, and identify and accurately input necessary ones. This has detracted from the user's convenience in operating the apparatus.

This problem in performing input setting for print processing has rather increased recently, as encountered in advanced image-forming apparatuses which are provided with numerous functions from top to bottom in frequency of usage, or in multi-functional apparatuses with some of the numerous functions in combination.

In the abovementioned image-forming apparatus disclosed in the '884 application, the document image is automatically classified and processed according to the classification of the document type which is distinguished based the document image resulting from the pre-scan. However, since the results obtained from the pre-scan are not reflected directly to setting items displayed on a screen, efficiency of setting the print processing conditions has not improved.

Also, in the image-forming apparatus disclosed in the '534 application, the setting contents are arbitrarily selected and input by a user, grouped together as a set, and stored as a group to correspond to a condition invocation button, as indicated earlier.

Although the stored contents are then invoked by touching the button and some of the input items can be updated, the steps themselves of selecting setting contents are still unchanged and efficiency of setting operation has not much improved.

Therefore, several problems remain yet to be solved in the known image-forming apparatuses.

Typically, it is not feasible for a user to watch an image finish expected from current setting contents prior to print processing after reading a document original, while the function of recent image-forming apparatuses has become increasingly complex and setting operations have also become more complicated, or some image finishes are output in a way contrary to what the user wanted or intended during the input setting.

BRIEF SUMMARY OF THE INVENTION

The general purpose of this invention is therefore to provide an image-forming apparatus and a method therefor, having most, if not all, of the advantages and features of similar existing apparatuses and related methods, while eliminating many of the aforementioned disadvantages of other apparatuses and related methods.

Accordingly, it is an object of the present invention to provide an image-forming system and method with improved workability by properly processing image data and displaying image finish and related processing items prior to a printout operation and in course of image data processing.

It is still another object of the invention to provide an improved image-forming system and method configured to display an expected image finish based on image data, which are obtained by reading a document, and a simplified input setting menu, which contains processing items narrowed-down from complicated initial items to be used for inputting desirable items, to thereby be able to improve working efficiency and convenience for a user in the image-forming operation.

The following description is a synopsis of only selected features and attributes of the present disclosure. A more complete description thereof is found below in the section entitled "Description of the Preferred Embodiments."

The above and other objects of the present invention are achieved by providing an image-forming system configured to perform at least a first operation to input image data, a second operation to process the image data and form a print finish, and a third operation to display an expected finish as the result of the first and the second operations, comprising a finish information generation unit configured to generate expected image finish information on completion of the first and the second operations; an input setting screen information generation unit configured to generate input setting screen information for receiving a setting input by an operator based on the expected image finish information generated by the finish information generation unit; a display unit configured to display an expected image finish resulting from the expected image finish information and an input setting screen resulting from the input setting screen information generated by the input setting screen information generation unit; and a setting unit configured to receive a variety of setting inputs including the setting input by the operator by way of the input setting screen displayed on the display unit.

On receiving the variety of setting inputs by the setting unit in the image-forming system, the finish information generation unit generates the expected image finish information based on the variety of setting inputs currently received, the input setting screen information generation unit generates another input setting screen information based on the expected image finish information generated by the finish information generation unit, the display unit displays the expected image finish resulting from the expected image finish information and the input setting screen resulting from the input setting screen information generated by the input setting screen information generation unit, and the setting unit receives the variety of setting inputs including the setting input by the operator by way of the input setting screen displayed on the display unit.

If the portion on the input setting screen, resulting from input setting screen information, is different from that corresponding to initial input setting screen, resulting from initial setting values, the display unit is adapted to display the updated portion with emphasis.

The abovementioned capabilities of the image-forming system of the present invention are exerted further by a method and a computer program product for use with the image-forming system, which will be detailed later on.

In another aspect of the invention, the image-forming system is further provided with a spatial item identification unit and a language item identification unit. The spatial item identification unit is configured to acquire spatial information on the expected image finish by the contact of a contacting material, such as at least one of a finger of an operator and a stylus, and to identify a spatial instruction item as a spatial setting; and the language item identification unit is configured to receive voice information and identify a language instruction item as a setting mediated by language based on the voice information.

The display unit includes a touch panel for displaying the expected image finish, and the spatial item identification unit acquires the spatial information by making a contact onto the touch panel with the contacting material, and identifies the spatial instruction item.

In addition, the spatial instruction item identification unit identifies a spatial certainty for the spatial instruction item, the language instruction item identification unit identifies a language certainty for the language instruction item, and the setting unit determines an item relevancy as information on a relevancy of the spatial instruction item and the language instruction item.

Based on the result from a weighting addition of the spatial instruction item, the language instruction item, and the item relevancy, each appending weighting factors, the setting unit can set properly the setting item for image formation.

In still another aspect of the invention, the image-forming system is further provided with a location acquisition unit in place of the spatial item identification unit and the language item identification unit mentioned above.

The location acquisition unit is configured to receive a touch input by an operator onto the display unit displaying the expected image finish information and acquire information on the location of the touch input.

Based on the information on the location acquired by the location acquisition unit, a setting unit configured to acquire processing item information, instruct the display unit to display a processing item resulting from the processing item information acquired, receive the touch input onto the processing item displayed by the display, and set up the processing item received.

The location acquisition unit also sets the coordinate on the image screen and acquires the information on the location using coordinate information determined by making use of the coordinate currently set.

An execution determination unit is further included, which is configured to determine whether a processing item set by the setting unit is executable. If the processing item is determined non-executable, the setting unit instructs the display unit to display information indicating that the processing item is non-executable.

Further aspects of the present invention and the manners in which it addresses the above problems, as well as others, will become more readily apparent from the following detailed description when taken in conjunction with the accompanying drawings, detailed description, and claims.

BRIEF DESCRIPTION OF THE DRAWINGS

In the following drawings, like reference numerals will be used to refer to like elements as between the various figures, in which:

FIG. 3A is a plan view illustrating a display image on the display screen notifying the receipt of the initial setup input by the operator by way of the display screen of FIG. 2B;

FIG. 3B is a plan view illustrating a display image showing an image finish which is expected to be formed as instructed by setup currently input by way of the display screen of FIG. 3A;

FIG. 5 is a drawing of an expected image finish screen illustrating the portions in the screen, which are different from those in an initial expected image finish screen, are displayed with emphasis;

FIG. 8A is an explanatory view illustrating a display image of an expected image finish which is formed from the data of a document read out by the image-forming system according to the second embodiment of the invention;

FIG. 10A is a view illustrating a screen image for setting various items for generating the expected image finish screen of FIG. 9;

FIG. 10B is a view illustrating another screen image for setting additional items;

FIG. 10C is a view illustrating a display image of an updated expected image finish which is formed after incorporating renewed user setting inputs;

FIG. 16 is a plan view of an expected image finish shown diagrammatically illustrating the steps for setting image processing items by contact operation or utterance onto a touch panel by a user according to the first embodiment of the invention;

FIG. 17 is another plan view of the expected image finish in which image processing items are set by contact operation or utterance onto a touch panel by the user to receive further setting inputs by way of the screen;

FIG. 37B includes a table illustrating the correspondence table 135a, in which the correspondence is shown between the coordinate values and setting items;

FIG. 57 is a functional block diagram illustrating a setting item storage unit in the image processing section of the image-forming system;

FIG. 58 illustrates a statement in the display table indicating the collective 2-in-1 setting already stored;

FIG. 59 is a plan view illustrating an expected image finish displayed according to the statement in the display table;

DETAILED DESCRIPTION OF THE INVENTION

Figure 1:
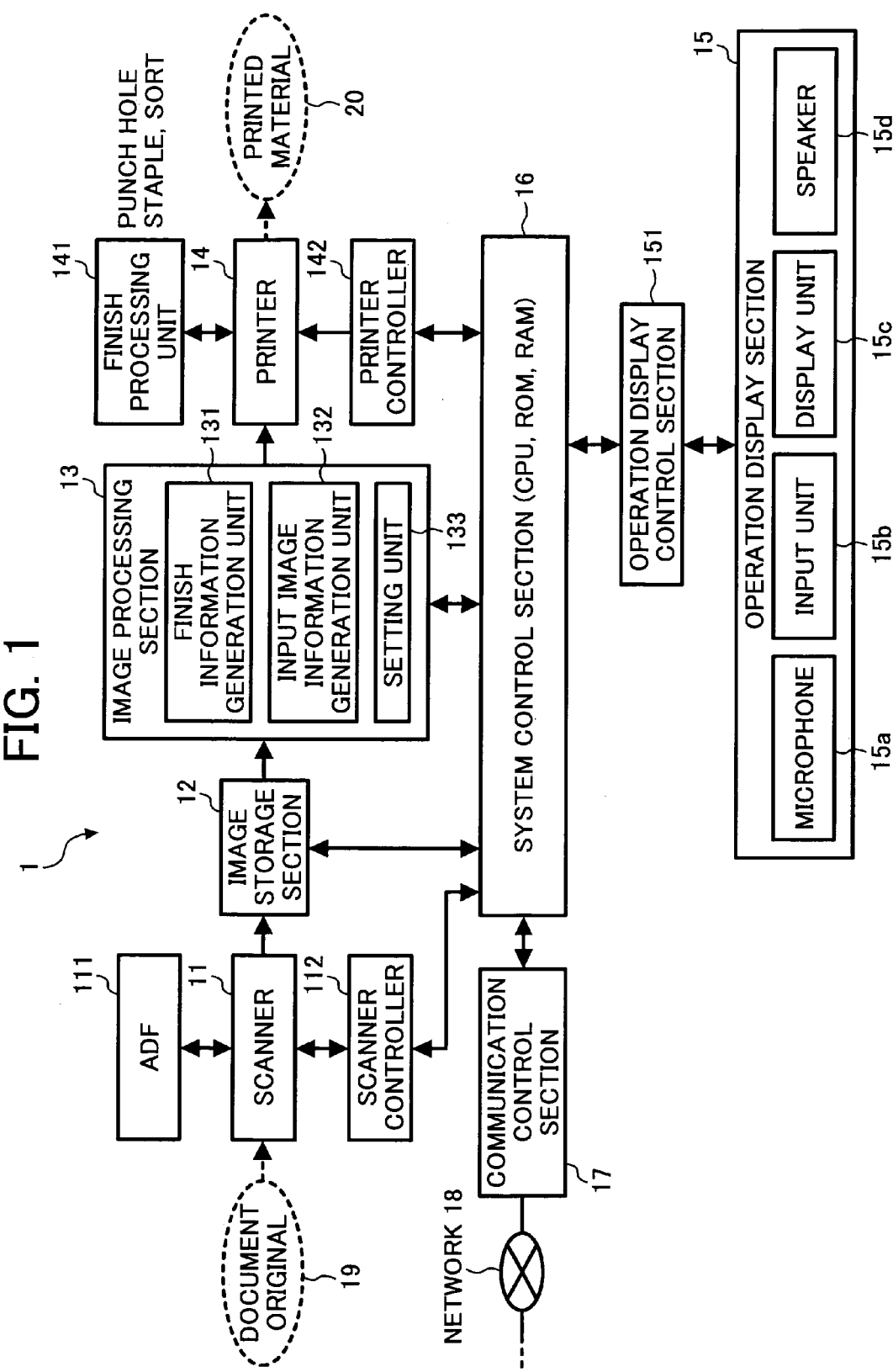
FIG. 1 is a functional block diagram illustrating an image-forming system according to a first embodiment of the invention.

In the detailed description which follows, specific examples are described regarding image-forming systems and methods for properly processing image data and displaying the image data and related processing items prior to a printout operation and in course of data processing.

It is understood, however, these examples are intended to be illustrative, but not limiting. For example, it is appreciated that the systems and methods described herein may also be adaptable to any form of image data processing. Other embodiments will be apparent to those skilled in the art upon reading the following description.

As briefly described earlier in the summary section, the image-forming system of the invention is configured to perform at least a first operation to input image data, a second operation to process the image data and form a print finish, and a third operation to display an expected finish as the result of the first and the second operations.

The image-forming system includes at least a finish information generation unit configured to generate expected image finish information on completion of the first and the second operations; an input setting screen information generation unit configured to generate input setting screen information for receiving a setting input by an operator based on the expected image finish information generated by the finish information generation unit; a display unit configured to display an expected image finish resulting from the expected image finish information and an input setting screen resulting from the input setting screen information generated by the input setting screen information generation unit; and a setting unit configured to receive a variety of setting inputs including the setting input by the operator by way of the input setting screen displayed on the display unit.

On receiving the variety of setting inputs by the setting unit in the image-forming system, the finish information generation unit is configured to generate the expected image finish information based on the variety of setting inputs currently received, the input setting screen information generation unit is configured to generate the input setting screen information based on the expected image finish information generated by the finish information generation unit, the display unit is configured to display the expected image finish resulting from the expected image finish information and the input setting screen resulting from the input setting screen information generated by the input setting screen information generation unit, and the setting unit is configured to receive the variety of setting inputs including the setting input by the operator by way of the input setting screen displayed on the display unit.

The image-forming system may further include an image analysis unit configured to analyze the image data and to extract document characteristic values, in which the finish information generation unit generates the expected image finish information based on the document characteristic values extracted by the image analysis unit, and the input setting screen information generation unit generates the input setting screen information based on the document characteristic values extracted by the image analysis unit.

In addition, if the portion in the input setting screen, resulting from the input setting screen information generated by the input setting screen information generation unit, is different from that corresponding to the portion in an initial input setting screen, resulting from initial setting values, the display unit in the image-forming system is configured to display the portion with emphasis.

And, if the setting unit receives a setting item by the operator and if the display unit displays an updated input setting screen which is updated according to the setting item by the operator, the display unit is configured to display the portion with emphasis, in which the portion in the updated input setting screen is different from the portion corresponding to the noted portion in an input setting screen prior to updating.

Further, in the image-forming system of the invention, the finish information generation unit generates expected image finish information containing text information, the input setting screen information generation unit generates an input setting screen information containing the text information based on the expected image finish information containing the text information, the display unit is configured to display the expected image finish containing the text information and the input setting screen containing the text information, and the setting unit receives a variety of setting inputs containing the text information.

Several sections and units in the image-forming system may be incorporated into a subsystem, an image processing apparatus, to further exert the capability of the image-forming system.

The image processing apparatus includes an image processing section, an image analysis section, a related function retrieval section, and a related function correspondence table. The image processing section includes a finish information generation unit, an input image information generation unit, and a setting unit.

Moreover, by interconnecting the sections and units in the image-forming system by way of a network, an image processing system can be formed to further effect the efficiency of image-forming, which will be detailed later on.

The abovementioned capabilities of the image-forming system of the present invention are exerted further by a method and a computer program product for use with the image-forming system.

Specifically, the method for use with the image-forming system is provided for storing and processing image data for an image-forming system configured to perform at least a first operation to input image data, a second operation to process the image data and form a print finish, and a third operation to display an expected finish as the result of the first and the second operations.

The method includes the steps of receiving at least one of an image data input command, a process command, and a print finish command; generating expected image finish information on completion of the first and the second operations; generating input setting screen information for receiving a setting input by an operator based on the expected image finish information; displaying an expected image finish resulting from the expected image finish information and an input setting screen resulting from the input setting screen information; and receiving a variety of setting inputs including the setting input by the operator by way of the input setting screen.

On receiving the variety of setting inputs in the present method, the step of generating expected image finish information based on the variety of setting inputs currently received, the step of generating input setting screen information generates the input setting screen information based on the expected image finish information, the step of displaying an expected image finish displays the expected image finish resulting from the expected image finish information and the input setting screen resulting from the input setting screen information generated by the input setting screen information generation unit, and the step of receiving a variety of setting inputs receives the variety of setting inputs including the setting input by the operator by way of the input setting screen displayed on the display unit.

If the portion in the input setting screen, resulting from the input setting screen information generated by the input setting screen information generation unit, is different from that corresponding to the portion in an initial input setting screen, resulting from initial setting values, the step of displaying an expected image finish is configured to display the portion with emphasis.

In addition, a computer program product for use with the image-forming system is also provided, being configured to perform at least a first operation to input image data, a second operation to process the image data and form a print finish, a third operation to display an expected image finish as the result of the first and second operations, and a fourth operation to receive a setting input, in which the computer program product comprises a computer readable medium for storing computer instructions for performing the abovementioned process steps.

In another aspect of the invention, the image-forming system is further provided with a spatial item identification unit and a language item identification unit. The spatial item identification unit is configured to acquire spatial information on the expected image finish by the contact of a contacting material, such as at least one of a finger of an operator and a stylus, and to identify a spatial instruction item as a spatial setting; and the language item identification unit is configured to receive voice information and identify a language instruction item as a setting mediated by language based on the voice information.

In addition, the display unit includes a touch panel for displaying the expected image finish, and the spatial item identification unit acquires the spatial information by making a contact onto the touch panel with the contacting material, and identifies the spatial instruction item.

On selecting one of the spatial instruction item and the language instruction item, the setting unit selects the other instruction item after restricting a number of candidates for the other instruction item, and sets the setting item among the one of the spatial instruction item and the other instruction item.

For example, on selecting the spatial instruction item, the setting unit selects the language instruction item after restricting a number of candidates for the language instruction item, and sets the setting item among the spatial instruction item and language instruction item currently selected.

The spatial instruction item identification unit is also adapted to identify spatial certainty for the spatial instruction item, the language instruction item identification unit identifies a language certainty for the language instruction item, and the setting unit determines an item relevancy as information on relevancy of the spatial instruction item and the language instruction item.

In addition, the setting unit determines an item relevancy as information on the relevancy of the spatial instruction item and the language instruction item, and sets the setting item for image formation based on the spatial instruction item, the language instruction item, and the item relevancy.

This setting by the setting unit is performed according to the result obtained from a weighting addition of the spatial instruction item, the language instruction item, and the item relevancy, each appending weighting factors.

The abovementioned capabilities of the image-forming system of the present invention are exerted further by a method and a computer program product for use with the image-forming system.

Specifically, the method of the invention for use with the image-forming system includes at least the steps of generating expected image finish information; displaying an expected image finish generated in the step of generating based on the expected image finish information on a display unit; acquiring spatial information on the expected image finish by the contact of a contacting material, such as at least one of a finger of an operator and a stylus; identifying a spatial instruction item as a spatial setting; receiving voice information; identifying a language instruction item as a setting mediated by language based on the voice information; making the selection of the spatial instruction item identified in the step of identifying a spatial instruction item and in the step of identifying a language instruction item; and setting a setting item for image formation.

In addition, the step of identifying a spatial instruction item acquires spatial information on at least one of the location, the direction, and the region of an image on the display unit, and identifies the spatial instruction item; the step of identifying a language instruction item receives a voice by an utterance by the operator, and identifies the language instruction item; and the step of setting sets said setting item for image formation by making the selection of the spatial instruction item and the language instruction item.

Still in addition, the step of setting sets the setting item for image formation based on the result obtained from a weighting addition of the spatial instruction item, the language instruction item, and the item relevancy, each appending weighting factors.

In still another aspect of the invention, the image-forming system is further provided with a location acquisition unit in place of the spatial item identification unit and the language item identification unit mentioned above.

The location acquisition unit is configured to receive a touch input by an operator onto the display unit displaying the expected image finish information and acquire information on the location of the touch input.

Based on the information on the location acquired by the location acquisition unit, a setting unit configured to acquire processing item information, instruct the display unit to display a processing item resulting from the processing item information acquired, receive the touch input onto the processing item displayed by the display, and set up the processing item received.

The location acquisition unit also sets the coordinate on the image screen and acquires the information on the location using coordinate information determined by making use of the coordinate currently set.

If a processing item is set, the setting unit acquires processing item information related to the processing item, instructs the display unit to display a related processing item based on the processing item information, and receives the touch input. In this case, the setting unit may alternatively be adapted to acquire at least one of cancellation processing item information for canceling, and alteration processing item information for altering, the processing item, and then receive the touch input.

In addition, an execution determination unit is further included in the image-forming system, configured to determine whether a processing item set by the setting unit is executable. If the processing item is determined non-executable, the setting unit instructs the display unit to display information indicating that the processing item is non-executable.

The determination unit is also configured to determine the reason for being non-executable of the processing item, and the setting unit instructs the display unit to display information on the reason.

Still in addition, an image analysis unit is further included, which is configured to analyze the image data input and extract a document characteristic value. The image finish information generation unit then generates the expected image finish information based on the document characteristic value extracted by the image analysis unit.

The abovementioned capabilities of the image-forming system of the present invention are exerted further by a method and a computer program product for use with the image-forming system.

Specifically, the method of the invention for use with the image-forming system includes at least the steps of generating expected image finish information from image data input; displaying the expected image finish information generated in the step of generating; receiving a touch input by an operator onto a display unit displaying the expected image finish information; acquiring information on the location of the touch input; and, based on the information on the location acquired in the step of acquiring, acquiring processing item information in use for performing at least one of image data processing and print finish processing of the image data input, instructing the display unit to display a processing item resulting from the processing item information acquired, receiving the touch input onto the processing item displayed by the display, and setting the processing item received.

The step of acquiring is adapted to set a coordinate on an image screen displayed by the display unit and acquire the information on the location using coordinate information determined by making use of the coordinate currently set.

If a processing item is set, the step of setting acquires processing item information related to the processing item, instructs the step of displaying to display a related processing item based on the processing item information, and receives the touch input. In this case, the step of setting may alternatively be adapted to acquire at least one of cancellation processing item information for canceling, and alteration processing item information for altering, the processing item, and then receive the touch input.

In addition, a step of determining is further included, configured to determine whether a processing item set in the step of setting is executable. If the processing item is determined non-executable, the step of setting instructs the display unit to display information indicating that the processing item is non-executable.

The step of determining is also configured to determine the reason for being non-executable of the processing item, and the setting unit instructs the display unit to display information on the reason.

Still in addition, a step of analyzing is further included, which is configured to analyze the image data input and extract a document characteristic value. The step of generating then generates the expected image finish information based on the document characteristic value extracted in the step of analyzing.

Having generally described the present invention, further understanding can be obtained by reference to several embodiments which are provided to be illustrative and not to be limiting. Like numerals designate like elements.

First, the following embodiments 1 through 4 primarily relate to image-forming systems of the invention, configured to display an expected image finish and a simplified input setting menu containing the items narrowed-down from complex initial items to be used for inputting desirable items, and to display another expected image finish and input setting menu updated after reflecting setting inputs, if these inputs for image formation are made by an operator.

Embodiment 1

FIG. 1 is a functional block diagram illustrating an image-forming system according to a first embodiment of the invention.

Referring to FIG. 1, the image-forming system 1 includes a scanner 11, an automatic document feeder (hereinafter, referred to as ADF) 111, a scanner controller 112, an image storage section 12, an image processing section 13, a printer 14, a printer controller 142, a finish processing unit 141, an operation display section 15, an operation display control section 151, a system control section 16, and a communication control section 17.

The image-forming system 1 is connected to a network 18 by way of the communication control section 17. And, the image-forming system 1 is configured to read an image on a document original 19, process data of the image thus read out under appropriate conditions, and reproduce an image on a sheet of paper so as to output the image in the form of a printed material 20 after printing and finish processing.

The scanner 11 is configured to convert the image readout of the document original 19 into digital image data.

In addition, the scanner 11 is provided with ADF 111 which is capable of, upon plural sheets of the document being loaded on a document tray, feeding the sheets forward one by one to a predetermined platen location for reading, and performing repetitive reading steps automatically. The scanner 11 is also capable of reading the document sheet printed not only on single side of the document sheet but also on both sides after reversing the sides thereof by an appropriate transport switching means.

The scanner controller 112 assumes overall control of the scanner 11 in response to an instruction issued by the system control section 16.

The image storage section 12 is a buffer memory for temporarily storing digital image data and other similar data which are read out by the scanner 11 or externally input.

Onto the multivalued data which are sent from the scanner and temporarily stored in the image storage section 12, the image processing section 13 is configured to perform gamma correction or MTF (modulation transfer function) correction, gradation processing such as slicing or dither treatment, and thereafter binarization (or multi-valued) processing.

The image processing section 13 also performs several image processing steps to meet the conditions and priorities currently set by a user, such as image enlargement/reduction and density/color adjustment; and layout improvement processing such as double/single-sided print, collective print, or margin adjustment. Since the image processing section 13 constitutes the portion characteristic to the present invention, further details thereof will be given later on.

The printer 14 is configured to perform several steps utilizing electrophotographic techniques, such as deflective scanning of a light beam, based on the image data suitably processed by the image processing section 13; forming an electrostatic latent image on the surface of a photosensitive drum; developing the electrostatic latent image with toner to be visualized as a toner image; and transferring and subsequently fixing the toner image onto a sheet.

The printer controller 142 conducts the control of the printer 14 in response to instructions from the system control section 16.

The printer 14 is provided with the finish processing unit 141. The finish processing unit 141 is configured to perform various finish processing according to user setting, such as sorting out printed materials like printed material 20 by a number of copy or pages, arranging and stapling the plural pages of the printed materials, and punching proper punch holes for use in filing in a binder or file.

Being provided with a microphone 15a, an input unit 15b, a display unit 15c, and a speaker 15d, the operation display section 15 is configured to input setting contents by voice through the microphone 15a; input such contents by the input unit 15b through a keyboard, a touch-panel or other similar device; and display menu items of contents on a display panel 15c.

In addition, the display panel 15c is so designed as to make voice outputs by speaker 15d in addition to visual displays.

The operation display section 15 is adapted for a user to select and input items from a menu to preferably be executed by the image-forming apparatus.

The contents of the menu includes various conditions and priorities such as, for example, for reading an image by the scanner 11 corresponding to document conditions, processing the data of the image read out as above by image processing section 13, printing the processed image data by the printer 14, and/or performing finish processing such as sorting, stapling, or punching printed materials succeeding to printing by the finish processing unit 141.

The operation display section 15 may be embodied as an operation panel, for example.

The display panel 15c is instructed to show the user the information regarding expected image finish which is generated by a finish information generation unit 131.

The expected image information is shown on the display panel 15c, if the information is in the form of pictorial images and texts, while the expected image information is voice output using speaker 15d when it is generated in the form of a voice.

When a display device is preferred as the display panel 15c, the latter may be shared with a display device already existing in the image-forming apparatus 1, or alternatively be provided separately as a device for exclusive use.

The operation display control section 151 is configured to assume input/output controls of the operation display section 15 such as, for example, an output control of image data, which are processed by the image processing section 13, to the display unit 15c and speaker 15d of the operation display section 15; and an input control directed to the microphone 15a and input unit 15b also of the section 15.

Being connected to the sections, units, and devices in the image-forming system 1, the system control section 16 assumes overall control thereof. The system control section 16 includes several devices (not shown), including at least CPU, ROM, and RAM, in which CPU is configured to perform various necessary processing based on fundamental programs stored in ROM.

The communication control section 17 is connected to a network 18, such as LAN (local area network) and the Internet, so as to exchange image data and control data each other with other apparatuses connected by way of the network 18 according to the communication protocol.

Next, the image processing section 13 is further detailed as the characteristic portion in the present invention.

The image processing section 13 includes the finish information generation unit 131, an input image information generation unit 132, and a setting unit 133.

The finish information generation unit 131 is configured to generate information regarding expected image finish as a result of image processing of document images and finish treatment of thus processed images based on image data currently read out and various setting inputs.

The finish information generation unit 131 utilizes aforementioned multivalued data temporarily stored in the image storage section 12 during the processing.

The finish information generation unit 131 is also configured to generate initial finish information to be voice output to the speaker 15d of the operation display section 15 based on the multivalued data temporarily stored in the image storage section 12 and the image data processed by the image processing section 13. The thus generated initial finish information may be output either as a pictorial image and a text on the display panel 15c or voice outputs using speaker 15d.

The input image information generation unit 132 is configured to generate input screen information based on the initial finish information generated by the finish information generation unit 131, so as to display a setup screen image on the display panel 15c.

When a user performs an inputting operation for setting through a setup screen image on the display panel 15c; the input unit 15b including a keyboard, a touch-panel or other similar device; and/or a microphone, the setting unit 133 is instructed to accept input signals issued by the inputting operation.

On accepting the setting signals by the input setting unit 133, the finish information generation unit 131 is instructed to update and generate finish information according to accepted setting signals. The expected image finish is then updated and displayed on the display panel 15c.

The input image information generation unit 132 is configured to generate input screen information, thereby creating a display screen to be used for receiving setting inputs again from the user. Based on the updated input screen information, the display screen is updated and displayed on the display panel 15c.

A setting mechanism in the invention comprises the setting unit 133, operation display control section 151, microphone 15a, and the input unit 15b. In addition, a display mechanism also in the invention comprises the operation display control section 151, display panel 15c, and the speaker 15d.

Figures 2A, 2B:
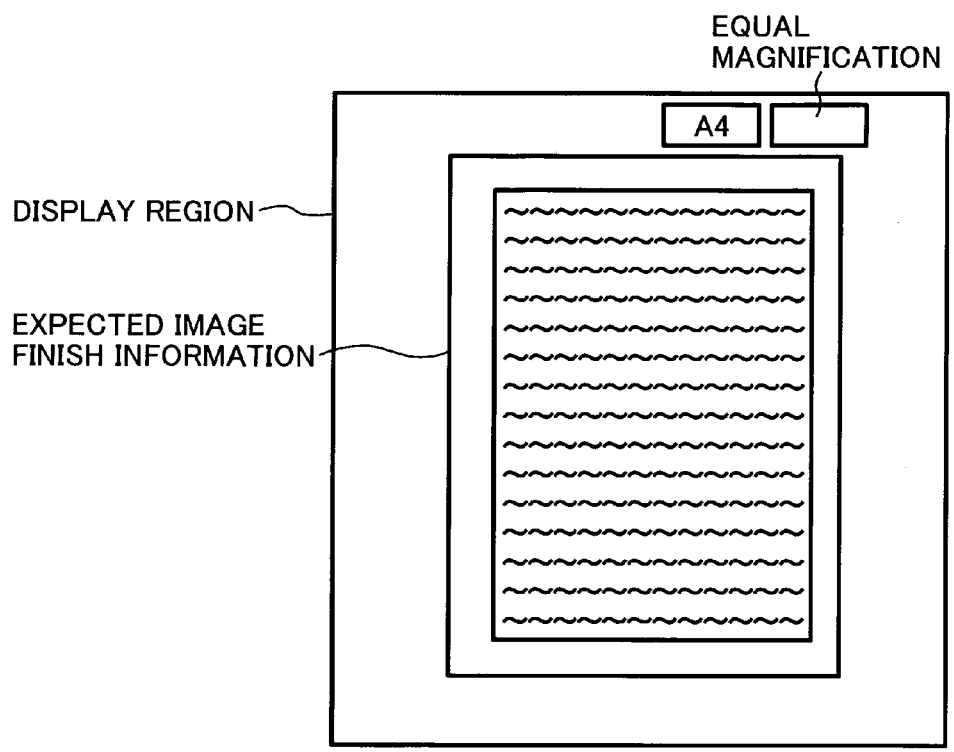
FIG. 2A is an explanatory view illustrating a display image appearing on a display screen during reading step, showing an initial image finish according to the first embodiment of the invention.
FIG. 2B is an explanatory view illustrating a display image appearing on a display screen upon reading a document, showing various items assisting an operator in inputting an initial setup.

FIG. 2A is an explanatory view illustrating a display image appearing on a display screen during reading step, showing an initial expected image finish screen according to one embodiment of the present invention; and FIG. 2B is a view illustrating a display image appearing on a display screen upon reading a document, showing various items assisting an operator in inputting an initial setup (i.e., initial setting screen).

FIG. 3A is a plan view illustrating a display image on the display screen notifying the acceptance of setup input by the operator by way of the display screen of FIG. 2B (i.e., first setting screen); and FIG. 3B is a plan view illustrating a display image showing an image finish which is expected to be formed as instructed by the setup contents currently input by way of the display screen of FIG. 3A (i.e., expected image finish screen).

In a default setting of the initial expected image finish screen shown in FIG. 2A, there displayed are the type of document as "CHARACTER", a copy sheet of the size of A4 lengthwise as "A4", and the magnification as "EQUAL MAGNIFICATION". Also displayed diagrammatically in the screen in the default setting are boundary lines of an expected printout, and character strings to be printed.

While expected image information is essentially shown in graphics, the portions otherwise more understandable are represented by characters, such as "A4" and "EQUAL MAGNIFICATION", as shown just above.

It should noted that a mechanism may further be included such that these items in graphics and characters, which appear in the default setting, be automatically modified according to the document currently read out and image data input.

The display image of FIG. 2B is a display screen in the default for receiving initial setup inputs (i.e., initial setting screen) which is displayed on the display panel 15c together with the initial expected image finish screen of FIG. 2A.

The items to be set on the screen are (1) the type of document, character or photograph, (2) the location of stapling processing on copied sheet, and (3) the location of punched hole(s) on copied sheet. On the display screen or the display panel 15c, a user now performs necessary setting inputs by checking pertinent boxes by a touch panel or a mouse, for example.

FIG. 3A illustrates a display image on the display screen indicating the acceptance of setup input by the operator (i.e., first setting screen), in which pertinent boxes on the screen have been checked by the user's setting inputs indicating (1) the type of document is both character and photograph, (2) the location of stapling to be at the upper left of the copied sheet, and (3) two punched holes to be on the left of the sheet.

Subsequently, the setting shown in FIG. 3A are sent to setting unit 133, the finish information generation unit 131 generates updated finish information according to accepted setting signals, and the expected image finish is displayed on the display panel 15c.

The expected image finish shown in FIG. 3B diagrammatically illustrates a screen image displayed based on the expected finish information which is updated and generated by the finish information generation unit 131.

This expected image finish screen displayed on the display panel 15c indicates that a printout is to be made, containing both characters and photographs, being provided with stapling processing at the upper left (shown, for example, as a short, slant line 32a in FIG. 3B), and with punching processing on the left of the sheet (shown as two circles 32b in FIG. 3B).

Together with the expected image finish screen of FIG. 3B, the first setting screen of FIG. 3A is displayed side by side on the display panel 15c. This facilitates for the user to input a setting change, if any, by way of the input screen.

Figure 4:
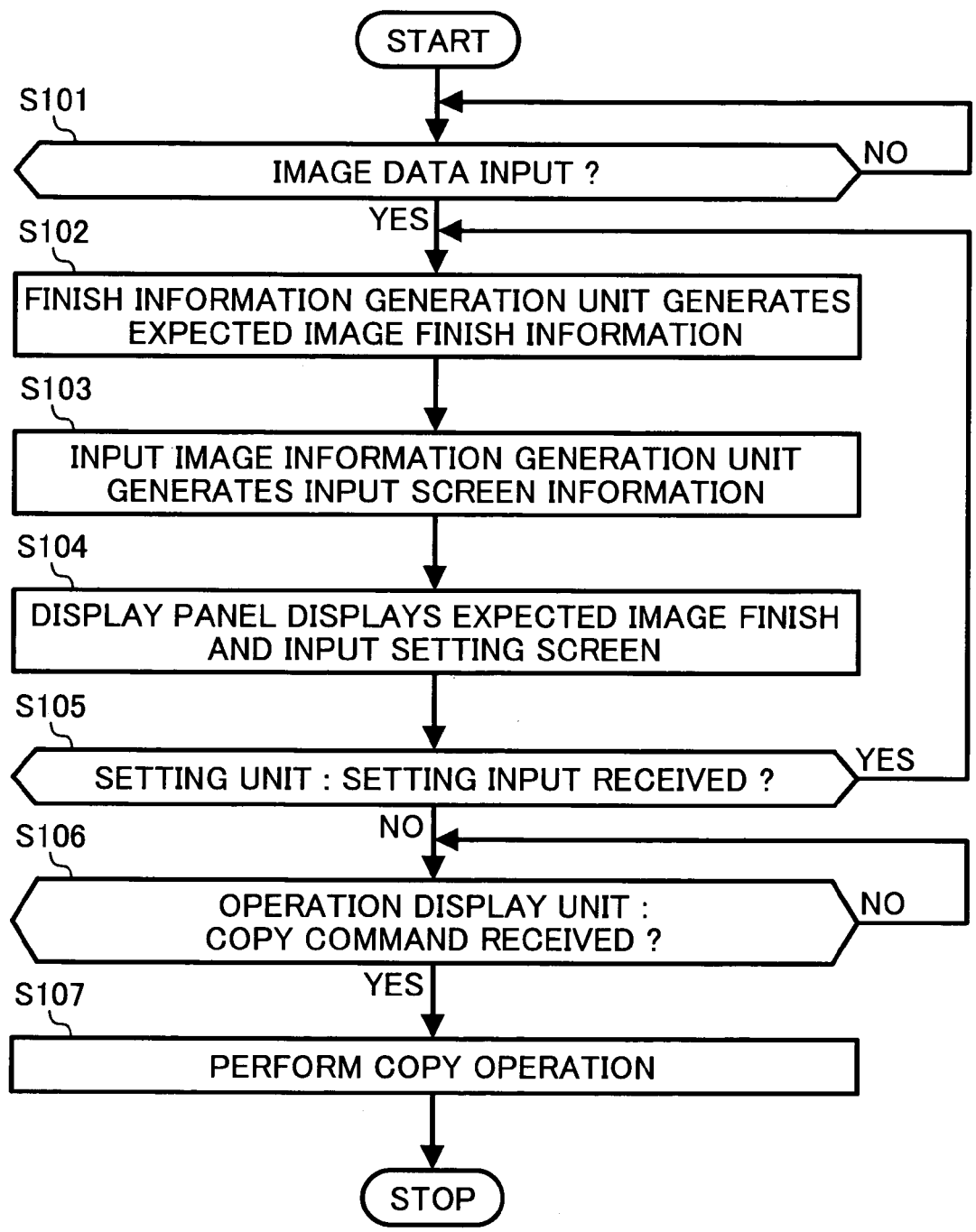
FIG. 4 is a flowchart illustrating an image-forming operation of the image-forming system according to the first embodiment of the invention.

FIG. 4 is a flowchart illustrating a process flow for forming an image by the image-forming system according to the first embodiment of the invention.

Referring to FIG. 4, the process begins at a standby state of the image-forming system, in which the system is standing ready for either reading a document by a scanner, or receiving an image data input by way of a network 18 (step S101).

If an image data input is received (i.e., "YES" in step S101), the finish information generation unit 131 is instructed first to generate initial expected finish information indicative of the result of image processing of document image data and finish treatment of the processed images based on initial setting information (or, default setting values) (step S102).

The input image information generation unit 132 is then instructed to generate input screen information based on the default setting, thereby creating a display screen to be used for receiving setting inputs by a user (step S103).

The information used herein for the default setting may be stored as a default specification in the system control section 16.

The display panel 15c is configured to display an initial expected finish screen and an input setting screen to be used for receiving setting inputs from the user according to the initial expected finish information generated by the finish information generation unit 131 and the input screen information generated by the input image information generation unit 132 (step S104).

Viewing the initial expected finish screen and the input setting screen, the user then inputs necessary setting items, if any.

Thereafter, the setting unit 133 is configured to inquire whether these setting items input by the user are accepted through the input setting screen, microphone 15a, or input unit 15b (step S105).

If the acceptance of the setting input is detected ("YES" in step S105), the finish information generation unit 131 is configured to update and generate expected finish information as a result of image processing of document images and finish treatment of thus processed images based on the setting information currently accepted (step S102).

In addition, the input image information generation unit 132 is configured to generate again input screen information to be used for receiving setting inputs by the user based on the accepted setting information (step S103).

If any change in setting contents has taken place by the user setting, input screen information is generated in use for displaying a renewed input screen containing updated contents.

The display panel 15c is instructed to display again an initial expected finish screen and an input setting screen to be used for receiving setting inputs from the user according to the initial expected finish information generated by the finish information generation unit 131 and the input screen information generated by the input image information generation unit 132 (step S104).

If no acceptance of the setting input is detected by the setting unit 133 ("NO" in step S105), the operation display section 15 is standing ready for detecting a copy operation instruction input through a bottom switch, for example (step S106). If the copy operation command is detected ("YES" in step S106), a copy operation is performed (step S107).

(Example of Image Finish Screen)

In an expected image finish screen in the invention, it is preferable for specific portions in the finish screen, which are likely to change by inputting settings, to be displayed with emphasis.

For example, the portions in the expected image finish screen, which are different from the initial (or previous) expected image finish screen, may be displayed with appropriate emphasis. Alternatively, if setting inputs have been performed by the user and if either image finish or input setting screen is changed by the setting inputs, the portions currently altered are now shown highlighted.

As a result, the changes in the image finish and the input setting screen, which are caused by the setting inputs by the user, can be recognized visually with relative ease.

The signals, which are setting input by way of the input unit 15b of the operation display section 15, are received and setting processed by the input setting unit 133 of image processing section 13.

The setting signals are received by the finish information generation unit 131 which is configured to generate finish information according to accepted setting inputs.

In addition, the thus generated finish information is displayed on the display panel 15c.

FIG. 5 is a drawing illustrating an expected image finish screen indicating the portions in the screen, which are altered and different from those in an initial expected image finish screen caused by user setting, are displayed with emphasis in a predetermined manner.

The user setting has been made as a setting change to be altered from the default setting, as described earlier in reference to FIG. 3A, such as (1) stapling at the upper left of copied sheet, and (2) two punched holes on the left of the sheet.

These altered portions in the expected image finish screen are now shown in a different color and/or with a different background. For example, the locations of the stapling 50c and punched holes 50d may be displayed with red as the different color, each having backgrounds marked with red slant lines in the vicinity thereof.

Alternatively, the emphasis may be placed with a different background color. For example, the current user setting portions (1) and (2) are shown as a red slant line (stapling) and red circles (punched holes), respectively, against orange-color slant lines background, while other unaltered portions remain as shown with the background in the same white color as default portions.

As a result of such emphasized display, the portions in the expected image finish screen, which are different from those in the default setting or caused by the user setting, can be recognized visually with relative ease.

Still in addition, other means for performing the emphasis may alternatively be adoptable, such as the use of colors other than those abovementioned for displaying the results of finish processing and the background thereof, and also the use of blinking portions in the display screen.

Moreover, if the portions are displayed in the form of text by characters by display panel 15c, these characters in the emphasized portions may be shown in a font-type and/or font-size different from others, which facilitates for the user to recognize visually the portions of current interest with relative ease.

The setting input signals are sent to the input setting unit 133 of image processing section 13, and input screen information, which indicates currently updated contents (or menu) to be subsequently displayed, is generated based on the setting inputs.

The display panel 15c is then configured to receive the input screen information indicative of the updated menu, and to display another input setting screen showing this updated menu to be in use for receiving new setting inputs.

With this configuration it becomes feasible to show the operator accurate setting contents.

For example, after a stapling setting has been made, another input screen can be displayed based on the stapling setting, inquiring whether a binding processing is to be performed. Thus, plausible setting content(s) needed in further processing can be presented accurately to the operator.

Alternatively, if a screen is shown for inquiring the selection of a double-side print and this print setting is then made, a further menu may be displayed to instruct the operator to input a number for defining a gutter or binding margin.

When an enough margin on the page cannot be found to be allocated to the gutter after inputting the gutter number, another setting screen may be prepared further in use for readjusting the page margin as a whole.

With such configuration, therefore, new setting items can be accurately shown to the operator for assisting succeeding setting inputs.

Figure 6A:
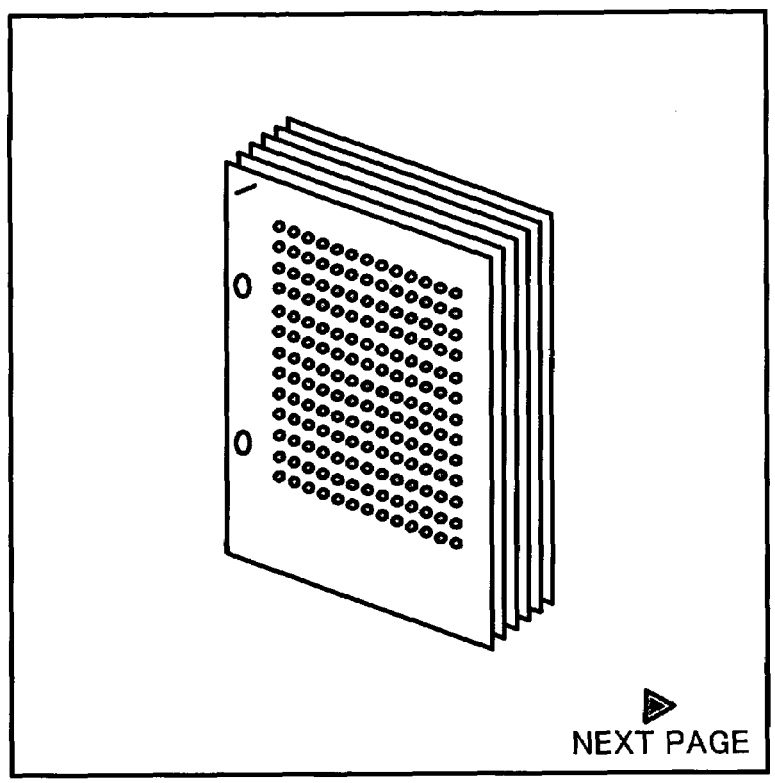
FIG. 6A is a drawing illustrating an expected print image finish in three dimensions.
Figure 6B:
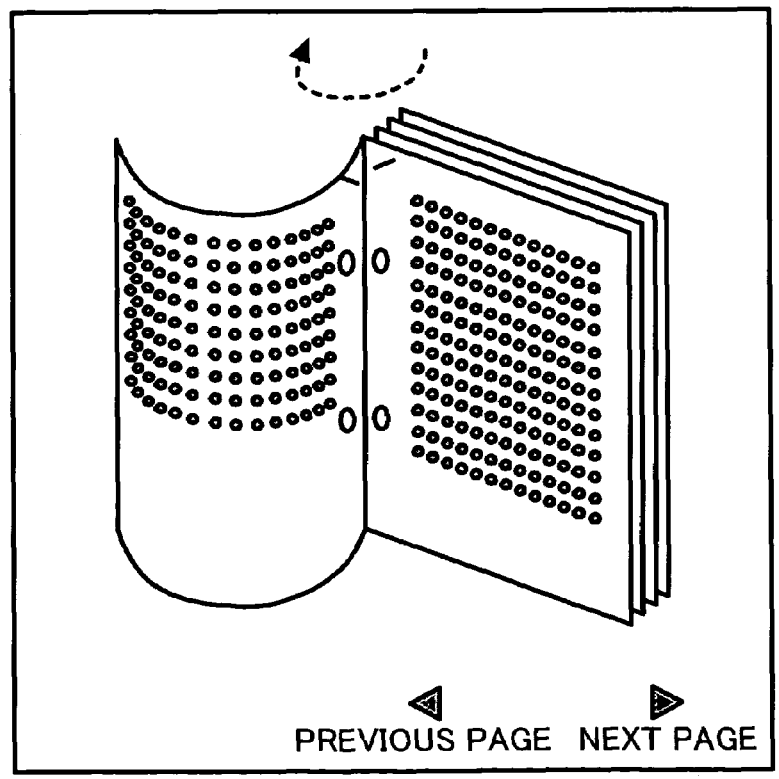
FIG. 6B is a drawing illustrating an expected print image finish in three dimensions in an animated fashion.
Figure 6C:
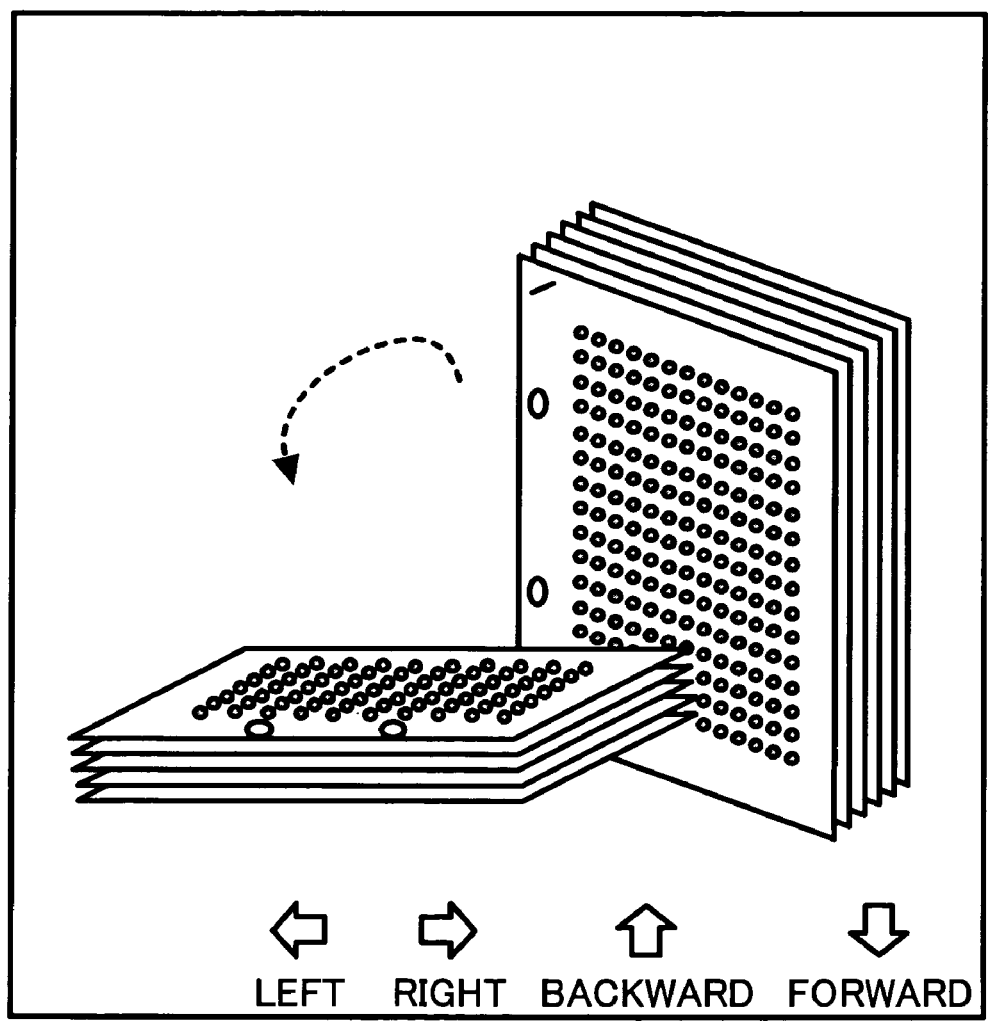
FIG. 6C is a drawing illustrating another expected print image finish in three dimensions in an animated fashion.

FIG. 6A is a drawing illustrating an expected print image finish in three dimensions, while FIG. 6B is a drawing illustrating an expected print image finish in three dimensions in an animated fashion. FIG. 6C is a drawing illustrating another expected print image finish in three dimensions in an animated fashion.

By way of example, a five-page document is read prior to setting inputs through the setting screen and an expected print image finish is displayed in three dimensions, or stereoscopically, on the display panel 15c as shown in FIG. 6A.

In this case, a touch panel is assumed as the display panel 15c. On touching, by a finger or a stylus pen, the triangle mark at bottom right on the screen designated as "NEXT PAGE", the expected print image finish of the document is now shown to the operator stereoscopically on the screen with its first page turned over as shown in FIG. 6B.

On touching further the "NEXT PAGE" triangle, the pages are turned over one by one in the stereoscopic image of the document, the operator can recognize visually the expected print image finish shown in three dimensions on the display panel 15c.

As another example, there shown in FIG. 6C is another image of the document, which is shown as rotated in the expected print image finish in the screen.

In this example, the image of the expected print image finish of the document displayed on the screen can be rotated in an animated fashion by the operator on the axis parallel to the horizontal side of the page by touching either the "BACKWARD" triangle mark or "FORWARD" at the bottom on the screen. Also, by touching either the "LEFT" triangle mark or "RIGHT", the image is rotated on the axis parallel to the vertical side of the page.

By rotating while displacing the expected printed material 20 (FIG. 1) on the screen, therefore, an appearance and condition of expected image of the document finish can be observed from different directions.

In the present case shown in FIG. 6C, the expected print image finish has been obtained after rotating "BACKWARD" by 90° and toward "LEFT" by 90°.

While the touch panel has been used in the above examples as the means for turning the pages over and rotating the document, other means may alternatively be used, such as a keyboard, for example.

Moreover, besides the display on the display panel 15c, voice-output means may alternatively be used to inform the operator, in which text information can be voice-output through known speech transformation techniques such that the expected print image finish and setting items are informed by way of a speaker 15d to the operator.

As described herein above, in the image-forming system according to the first embodiment of the invention, an expected image finish screen is displayed prior to print processing and an input setting screen is also displayed to be used for receiving setting inputs from the operator based on image data which are obtained by reading a document or by way of a network 18. In addition, if setting inputs are made by the operator, another expected image finish screen is generated and displayed, incorporating the setting inputs.

As a result, it becomes feasible for the operator to view the expected image finish and a setting screen containing setting items which are narrowed-down based on the expected image finish. Working efficiency and convenience can therefore be much improved in the image-forming operation.

If some portions in the expected image finish screen are altered by the latest user setting, the portions different from the initial expected image finish screen can be displayed with appropriate emphasis.

These portions can therefore be recognized visually by the operator with more ease. As a result, document print processing can be carried out in line closer to the operator's settings.

Moreover, if the setting screen is altered by user setting, the thus altered setting screen is displayed to receive additional setting inputs. The operator can therefore carry out further input settings so as to bring the image finish asymptotically closer to a desired, and more appropriate image.

In addition, since expected image finish can be displayed on the screen as an image, in either text format, or stereoscopic or animated pictorial fashion, it becomes feasible for the operator to confirm the expected image finish in advance with more ease.

Embodiment 2

Figure 7:
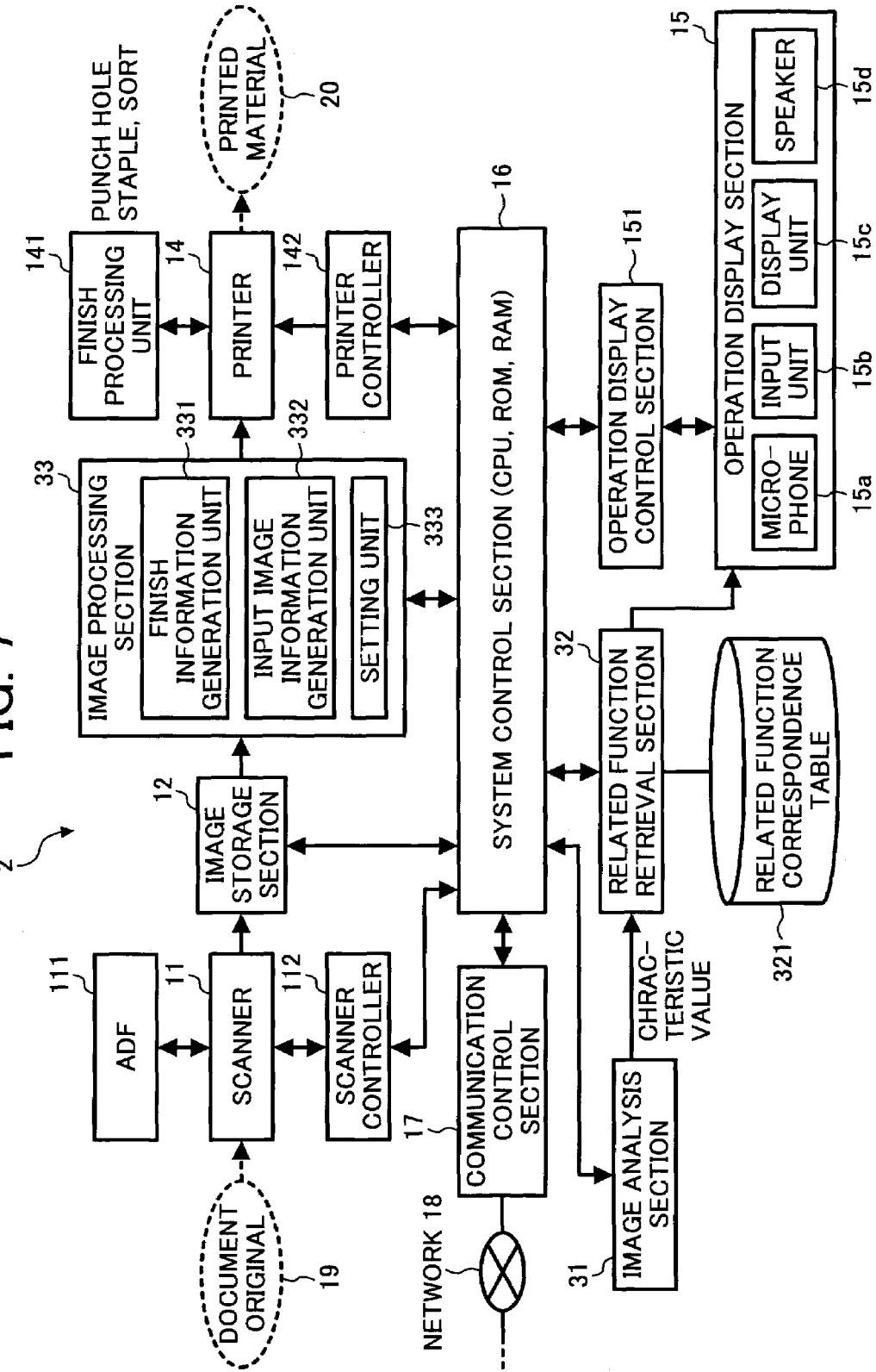
FIG. 7 is a functional block diagram illustrating an image-forming system according to a second embodiment of the invention.

FIG. 7 is a functional block diagram illustrating an image-forming system 2 according to a second embodiment of the invention.

The block diagram of FIG. 7 has a similar configuration as that of FIG. 1, with the exception that the image-forming system 2 further includes an image analysis section 31, a related function retrieval section 32, and a related function correspondence table 321, and that some capabilities of the present image processing section 33 are different from those of the image processing section 31 of the first embodiment.

In the image-forming system 2 according to the present embodiment, the image analysis section 31, related function retrieval section 32, and related function correspondence table 321 are configured to extract document characteristic values, and to make a selection of information related to equivalent setting items based on the document characteristic values. The image processing section 33 then generates an expected image finish information and an input setting information, and the display panel 15c is configured to display an expected image finish and an input setting screen.

The image analysis section 31 is configured to analyze document image data stored in the image storage section 12 and extract the document characteristic values indicative of document characteristics. By "document characteristic values" meant is the size, orientation (lengthwise or widthwise), and margin size of the document, for example.

On receiving a variety of information of the document characteristic values computed by the image analysis section 31, the related function retrieval section 32 is configured to search several related functions necessary to be set for duplicating the document.

The related function retrieval section 32 is provided with the related function correspondence table 321 as a file which contains a table of various functions related to respective document characteristic values.

The related function retrieval section 32 is now configured to retrieve, from the related function correspondence table 321, several related functions corresponding to document characteristic values currently input, and to send narrowed-down related function information to the image processing section 33.

Next, the image processing section 33 in the image-forming system 2 will be described according to the second embodiment of the invention.

As illustrated in FIG. 7, the image analysis section 31 is provided with a finish information generation unit 331, an input image information generation unit 332, and a setting unit 333.

The finish information generation unit 331 in the image processing section 33 according to the second embodiment has similar capabilities as those of the finish information generation unit 131 in image processing section 13 of the first embodiment, with the exception that the generation unit 331 is configured to generate finish information utilizing (1) the document characteristic values based on the results obtained from the analysis by image analysis section 31, and (2) the related function information retrieved and narrowed-down by the related function retrieval section 32 using the input document characteristic values.

In addition, the input image information generation unit 332 in the image processing section 33 according to the second embodiment has similar capabilities as those of the input image information generation unit 132 in the image processing section 13 of the first embodiment, with the exception that the section 33 is configured to generate an input setting screen utilizing the document characteristic values based on the results obtained from the analysis by image analysis section 31, and the related function information retrieved and narrowed-down by the related function retrieval section 32 using the input document characteristic values.

Still in addition, the image processing section 33 in the setting unit 333 according to the second embodiment has similar capabilities as those of the setting unit 133 in the image processing section 13 of the first embodiment, with the exception that the unit 333 is configured to receive setting inputs through setting screen formed based on setting screen information which is generated utilizing the document characteristic values based on the results obtained from the analysis by image analysis section 31, and the related function information retrieved and narrowed-down by the related function retrieval section 32 using the input document characteristic values.

Therefore, the image processing section 33 displays the expected image finish and the setting screen in use for receiving additional user's setting, together with the document characteristic values analyzed by the image analysis section 31, to thereby be able to receive their setting inputs.

Since the expected image finish and the items additionally to be input can be narrowed-down precisely with the present configuration, the image-forming operation can be provided with improved working efficiency and user's convenience.

In a manner similar to the first embodiment, the expected image finish information may be presented by either pictorial images or texts displayed on the display panel 15c, or voice-output by way of speaker 15d.

The image analysis section 31, the related function retrieval section 32, and related function correspondence table 321, therefore, constitute an image analyzing mechanism in the invention.

FIG. 8A is an explanatory view illustrating a display image of an expected image finish which is formed from the data of a document read out by the image-forming system according to the second embodiment of the present invention.

Figure 8B:
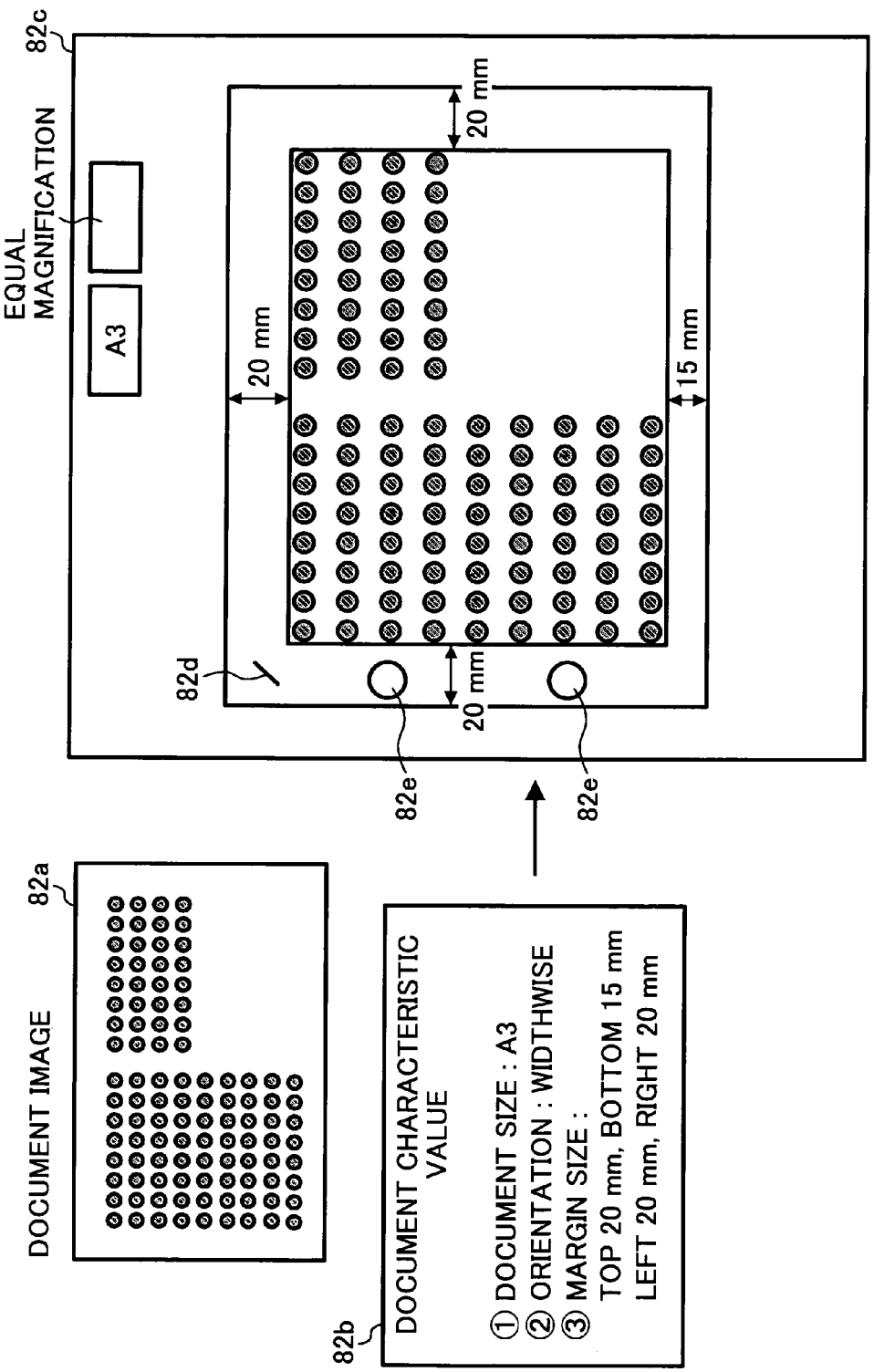
FIG. 8B is another explanatory view illustrating a display image of an expected image finish according to the second embodiment of the invention.

FIG. 8B is another explanatory view illustrating a display image of an expected image finish according to the second embodiment of the present invention.

The finish information generation unit 331 is configured to generate expected finish information indicative of the result of data processing and finish treatment by reflecting (1) the document image data currently input, and (2) the document characteristic values analyzed by the image analysis section 31, to the input setting screen which is formed according to initial setting information (default setting values). Then, the finish information generation unit 331 instructs the expected finish information be displayed on the display panel 15c.

During the above noted process steps, (1) the document image data shown as 81a in FIG. 8A, and (2) the document characteristic values analyzed by the image analysis section 31 shown as 81b in FIG. 8A, are both reflected to the default setting screen. As a result, the expected finish information is then generated and displayed as the expected image finish screen of 81c in FIG. 8A.

The document characteristic values analyzed by the image analysis section 31 herein shown as 81b in FIG. 8A indicate (1) the A3 size, (2) the widthwise orientation, and (3) the margin size of top 20 mm, bottom 15 mm, left 20 mm, and right 20 mm, for the current document.

It is noted that the values, which are difficult to be recognized clearly on the screen, may be shown in the text form as illustrated just above for the margin size.

The user performs renewed setting inputs, if necessary, while visually confirming the expected image finish on the screen.

A current setting input screen is assumed as that of FIG. 3A, for example. When a user performs setting inputs, the finish information generation unit 331 is configured to generate updated expected image finish information incorporating the user's setting, to subsequently be displayed on the display panel 15c.

For example, if the setting inputs are made in a manner similar to those of FIG. 3A, such as (1) stapling on the upper left and (2) two punched holes on the left, the expected image finish is shown as 82c in FIG. 8B, indicating such as a short, slant line 82d and two circles 82e as updated outputs resulting from the user settings of the stapling and hole punching, respectively.

Figure 9:
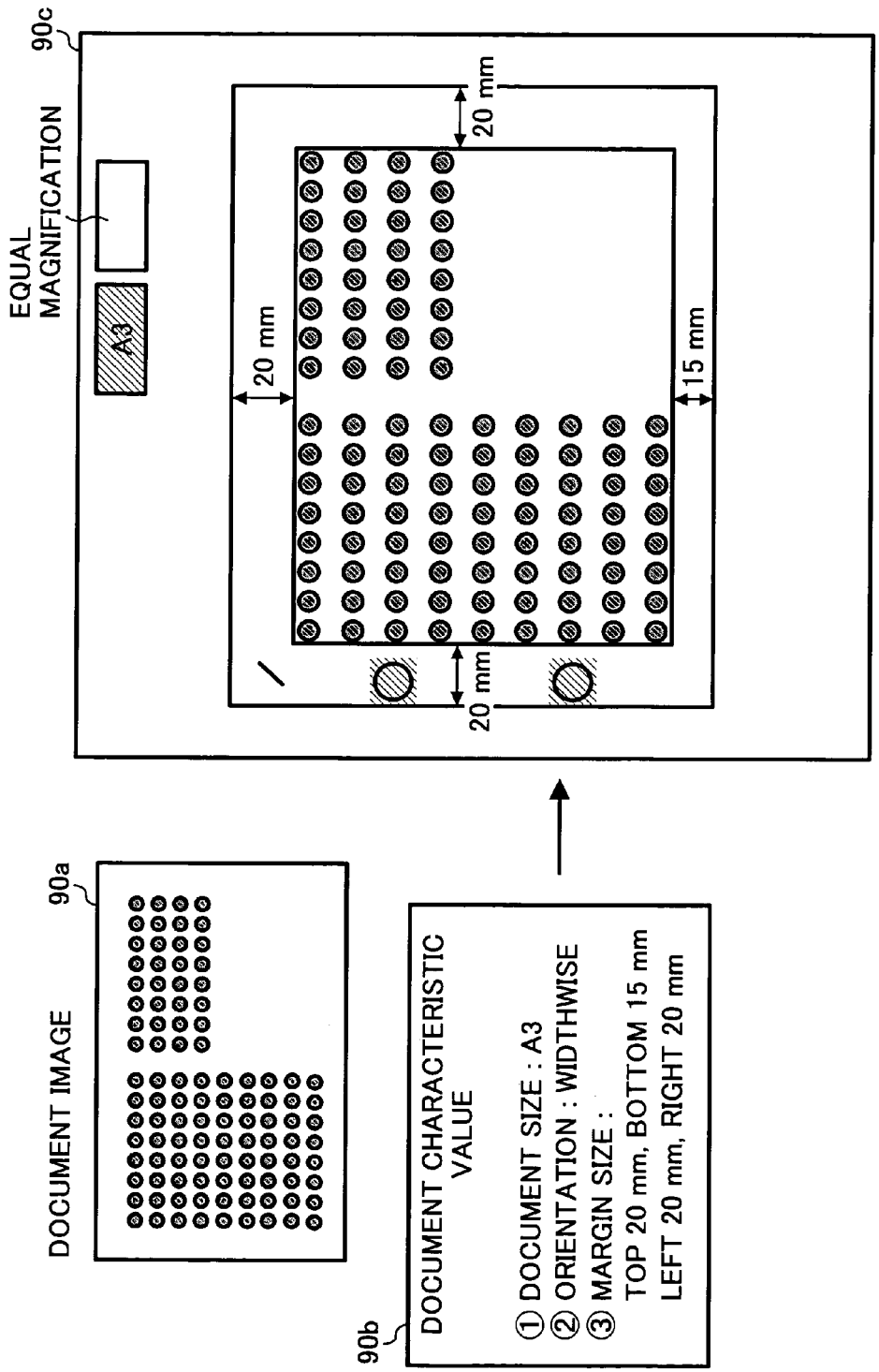
FIG. 9 is a drawing illustrating an expected image finish screen indicating the portions in the screen, which are altered and different from those in an initial expected image finish screen caused by user setting, are displayed with emphasis.

FIG. 9 is a drawing illustrating an expected image finish screen indicating the portions in the screen, which are altered and different from those in an initial expected image finish screen caused by user setting, are displayed with emphasis.

As described above, the user setting has been made as (1) stapling on the upper left and (2) two punched holes on the left. In addition, the following document characteristic values have been extracted; (3) the A3 size, (4) the widthwise orientation, and (5) the margin size of top 20 mm, bottom 15 mm, left 20 mm, and right 20 mm, for the current document These altered portions in the expected image finish screen are now shown in a different color, such as red, for example (the shaded "A3" portion in FIG. 9), while the portions remained unaltered are displayed as before.

In addition, the portions reflecting the document characteristic values (3), (4), and (5) are shown in another color, such as blue. Further, the portions resulting from the user setting (1) and (2), i.e., stapling and two punched holes, are shown as shadowed red marks.

FIG. 10A is a view illustrating a screen image for setting various items for generating the expected image finish screen of FIG. 9, while FIG. 10B is a view illustrating another screen image for setting additional items.

FIG. 10C is a view illustrating a display image of an updated expected image finish which is formed after incorporating renewed user setting inputs.

The input image information generation unit 132 is configured to generate input setting information incorporating the above noted (1) and (2) settings to subsequently be displayed on the display panel 15c (FIG. 10A).

Next, additional setting inputs are assumed to further be made by the user, such as (6) the location of stapling changes to the upper left, and (2) two punched holes to the right (FIG. 10B).

On accepting renewed setting inputs in the image-forming system 2 according to the second embodiment, the finish information generation unit 331 is configured to update and generate expected image finish information according to the accepted setting signals, and the input image information generation unit 332 generates input setting information.

According to the generated expected image finish information and input setting information, respectively, the display panel 15c is configured to display an updated expected image finish screen and an updated input setting screen.

If some portions in the screen are altered and different from those in an initial expected image finish screen by user setting, as shown in FIG. 10C, it is preferable that these altered portions be displayed with emphasis by using the background in different color, such as red or violet, for example (shaded area).

In addition, other means for performing the emphasis may alternatively be adoptable, such as the effects of background smearing or blinking, and characters different in font-type and/or font-size, in a manner similar to the first embodiment.

Figure 11:
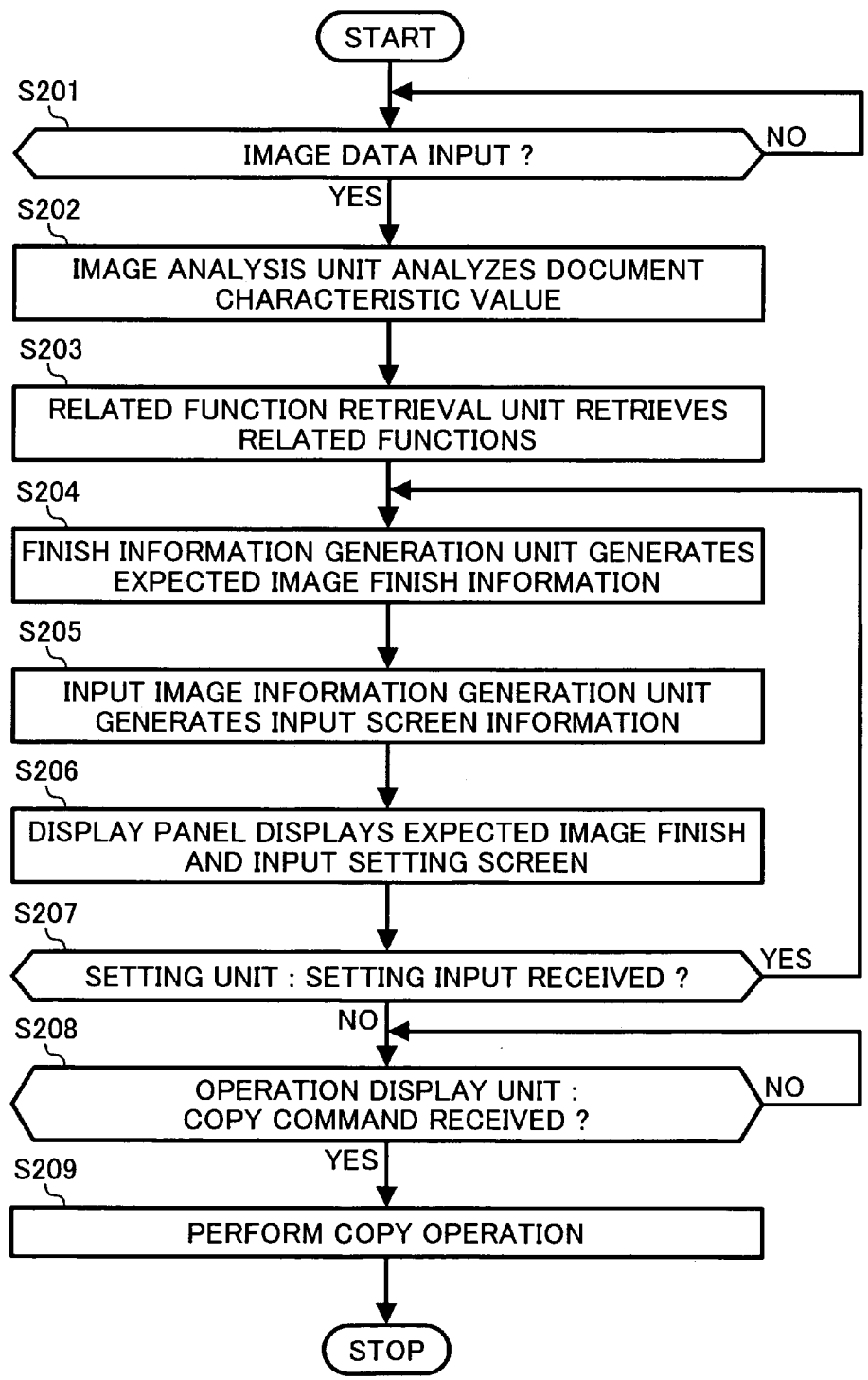
FIG. 11 is a flowchart illustrating a process flow for forming an image by the image-forming system according to the second embodiment of the invention.

FIG. 11 is a flowchart illustrating a process flow for forming an image by the image-forming system according to the second embodiment of the invention.

Referring to FIG. 11, the process begins at a standby state of the image-forming system, in which the system is standing ready for either reading a document by a scanner, or receiving an image data input by way of a network 18 (step S201).

If an image data input is received (i.e., "YES" in step S201), the image analysis section 31 is configured to analyze document image data and to extract the document characteristic values (step S202), and the related function retrieval section 32 is configured to retrieve the related function correspondence table 321 and select setting items in use for receiving users setting inputs (step S203).

The finish information generation unit 331 is instructed to generate initial expected finish information indicative of the result of image processing of document image data and finish treatment of the processed images based on initial setting information (default setting values) and the document characteristic values (step S204).

The input image information generation unit 332 is then instructed to generate input screen information based on the default setting and the setting items selected by the related function retrieval section 32, thereby creating a display screen to be used for receiving setting inputs by the user. In the case of the default setting, the default contents may be configured to be stored by the system control section 16 (step S205).

The display panel 15c is configured to display an initial expected finish screen and an input setting screen to be used for receiving setting inputs from the user according to the initial expected finish information generated by the finish information generation unit 331 and the input screen information generated by the input image information generation unit 332 (step S206).

Viewing the initial expected finish screen and the input setting screen, the user then inputs necessary setting items, if any.

Thereafter, the setting unit 333 is configured to inquire whether these setting items input by the user are accepted through the input setting screen, microphone 15a, or input unit 15b (step S207).

If the acceptance of the setting input is detected ("YES" in step S207), the finish information generation unit 331 is configured to update and generate expected finish information as a result of image processing of document images and finish treatment of thus processed images based on the setting information currently accepted (step S204).

In addition, the input image information generation unit 332 is configured to generate again input screen information to be used for receiving setting inputs by the user based on the accepted setting information (step S205).

If any alteration of setting contents has been made by the user setting, input screen information is generated in use for displaying a renewed input screen containing updated contents.

The display panel 15c is instructed to display again an initial expected finish screen and an input setting screen to be used for receiving setting inputs from the user according to the initial expected finish information generated by the finish information generation unit 331 and the input screen information generated by the input image information generation unit 332 (step S206).

If no acceptance of the setting input is detected by the setting unit 333 ("NO" in step S207), the operation display section 15 is standing ready for detecting a copy operation command input through a bottom switch, for example (step S208). If the copy operation command is detected ("YES" in step S208), a copy operation is performed (step S209).

During the process steps, several measures may be taken in practice as follows such as (1) if a setting for punching holes is made in the setting screen, which is formed on reading the document characteristic values, and if it is found that a wider space margin is necessary, another input screen (not shown) may preferably be displayed in use for setting the space margin; (2) if a setting for changing the location of punched holes is made from the left to the right, or vice versa, this change is preferably shown stereoscopically in the expected image finish; (3) if an un-appropriate setting, such as too large or small margin, is detected by the setting unit 333, this is preferably displayed as a warning in the expected image finish; (4) if the margin portion is found too small, the input image information generation unit 332 is preferably configured to display, in the input screen, an item instructing the reduction in the size of the portions other than the margin, to thereby receiving a further setting for the size reduction by the operator; (5) if the margin portion is found too large, in contrast, the input image information generation unit 332 is preferably configured to display an item instructing the of the portions other than the margin, to thereby receiving a further setting for the enlargement by the operator; and (6) when the density of document image is determined, being in an unappropriate range by the image processing section 33, the input image information generation unit 332 is preferably configured to display an item specifying the density, to thereby receiving a further setting for the density by the operator.

As described herein above, the image-forming system is configured according to the second embodiment of the invention to extract document characteristic values from image data, which are obtained by reading a document or by way of the network, and to display an expected image finish screen and an input setting screen capable of receiving setting inputs by the operator prior to print processing. In addition, if setting inputs are received from the operator, another expected image finish screen is generated and displayed, incorporating the setting inputs.

Embodiment 3

According to a third embodiment of the invention, an image processing apparatus is provided as a subsystem for primarily performing image processing, being incorporated into the image-forming systems 1,2 of the first and second embodiments.

Figure 12:
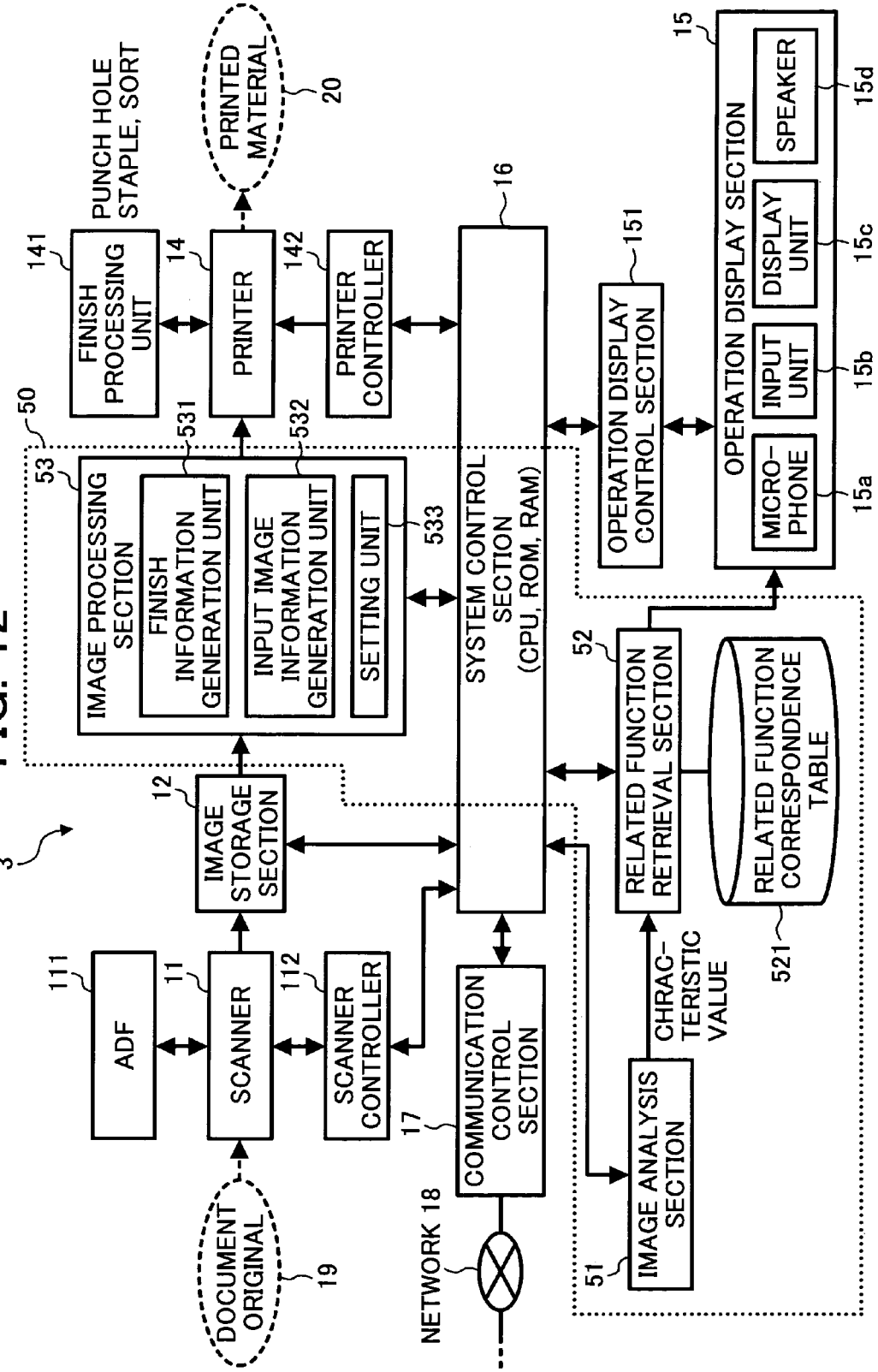
FIG. 12 is a functional block diagram illustrating an image-forming system according to still a third embodiment of the invention.

FIG. 12 is a functional block diagram illustrating an image-forming system 3 according to the third embodiment of the invention, incorporating the image processing apparatus 50.

While the image-forming system 3 is described herein below as the same structure as that of the second embodiment, the system 3 may be also compared to the structure in the first embodiment when the portion therein for performing image processing is excluded.

The image processing apparatus 50 includes an image processing section 53, an image analysis section 51, a related function retrieval section 52, and a related function correspondence table 521.

The image processing section 53 includes a finish information generation unit 531, an input image information generation unit 532, and a setting unit 533.

The structure and functional capabilities of the image processing section 53, image analysis section 51, related function retrieval section 52, and related function correspondence table 521 included in the image processing apparatus 50 are similar to those of the image processing section 33, image analysis section 31, related function retrieval section 32, and related function correspondence table 321 included in the image-forming system 2; and the details thereof are herein abbreviated.

In the image-forming system 3 according to the third embodiment of the invention, an expected image finish screen is displayed prior to print processing and an input setting screen is also displayed to be used for receiving setting inputs from the operator based on image data which are obtained by reading a document or by way of a network. In addition, if setting inputs are made by an operator, another expected image finish screen is generated and displayed, incorporating the setting inputs.

In addition, the image-forming system 3 is configured to extract document characteristic values from image data, which are obtained by reading a document or by way of the network, and to display an expected image finish screen and an input setting screen capable of receiving setting inputs by the operator are displayed prior to print processing. Also, if setting inputs are received from the operator, another expected image finish screen is generated and displayed, incorporating the setting inputs.

Embodiment 4

Figure 13:
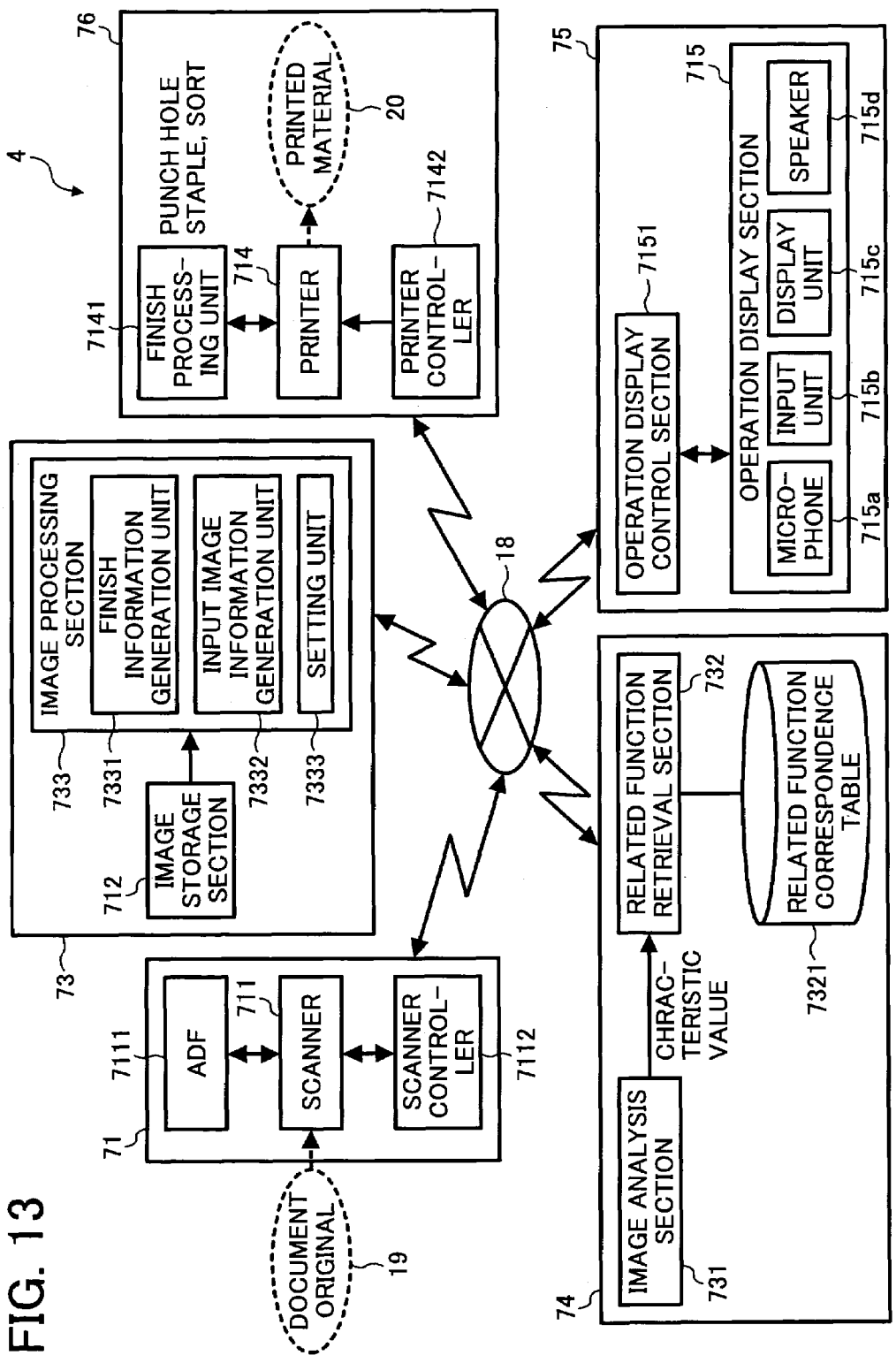
FIG. 13 is a functional block diagram illustrating an image-forming system 70 according to a fourth embodiment of the invention.

FIG. 13 is a functional block diagram illustrating an image-forming system 4 according to a fourth embodiment of the invention, incorporating a first and second image processing apparatus 73,74.

This image-forming system 4 is constructed by incorporating the image processing apparatus 50 and other units included in the image-forming system for performing image processing in third embodiment.

The image-forming system 4 has a similar configuration to the image-forming system 3 of the third embodiment, with the exception that several apparatuses and units are interconnected by way of a network 18.

The image-forming system 4 according to the fourth embodiment includes a document reading section 71, a first image processing apparatus 73, a second image processing apparatus 74, an operation display apparatus 75, and a printing apparatus 76, which are interconnected by way of the network 18.

Since the structure and functional capabilities of the document reading section 71, first image processing apparatus 73, second image processing apparatus 74, operation display apparatus 75, and printing apparatus 76 included in the present image-forming system 4 are similar to those of the document reading functioning portion, image processing section 53, image analysis functioning portion, operation display functioning portion, print functioning portion of FIG. 12; the details thereof are herein abbreviated.

Respective sections and apparatuses in the image-forming system 4 are interconnected by way of the network 18 so as to perform transmission/reception operations of various pieces of information. With this construction deploying these sections and apparatuses in a distributed fashion, image processing functions can be achieved, having capabilities similar to the case in which they all are gathered into one location for integral processing.

In the image-forming system 4 according to the fourth embodiment of the invention, an expected image finish screen is displayed prior to print processing and an input setting screen is also displayed to be used for receiving setting inputs from the operator based on image data which are obtained by way of the network. In addition, if setting inputs are made by an operator, another expected image finish screen is generated and displayed, incorporating the setting inputs.

In addition, the image-forming system 4 is configured to extract document characteristic values from image data, which are obtained by way of the network, and to display an expected image finish screen and an input setting screen capable of receiving setting inputs by the operator are displayed prior to print processing. Also, if setting inputs are received from the operator, another expected image finish screen is generated and displayed, incorporating the setting inputs.

As a result, it becomes feasible for the operator to look at the expected image finish and a setting screen containing setting items which are narrowed-down based on the expected image finish, and the image-forming system 4 can be constructed, having improved working efficiency and convenience.

(Hardware Configuration)

Figure 14:
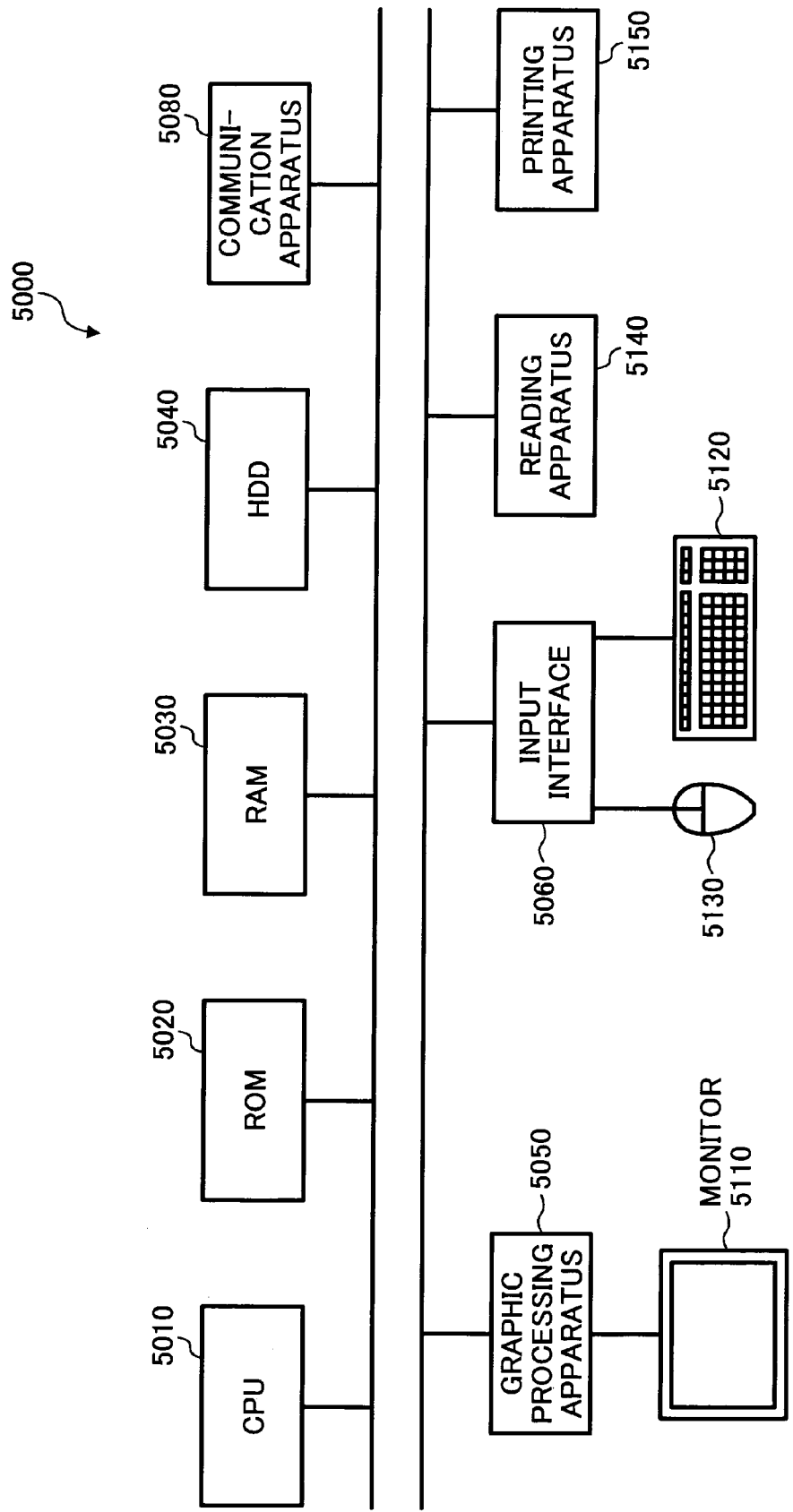
FIG. 14 is a block diagram diagrammatically illustrating a hardware configuration of the image-forming system of the invention.

FIG. 14 is a block diagram diagrammatically illustrating a hardware configuration of the image-forming system 5000 of the present invention.

The image-forming system 5000 according to the invention includes at least control units, such as CPU (central processing unit) 5010; storage units, such as ROM (read only memory) 5020 and RAM (random access memory) 5030; external storage units, such as HDD (hard disc drive) 5040 and CD (compact disc) drive (not shown); display units, such as a monitor 5110, which may be connected through a graphic processing apparatus 5050; input units, such as a keyboard 5120, a mouse 5130, both of which may be connected through an input interface 5060; a reading apparatus 5140, which may include a scanner (not shown); and a printing apparatus 5150, which may include a laser printer (not shown), thereby assuming a conventional configuration of the computer system.

A computer program for use with the image-forming system 5000 of the invention is provided with files in the format installable or executable, which are stored in a computer usable storage medium, such as CD-ROM, FD (flexible disc), CD-R (CD recordable), DVD (digital versatile disc) and other similar discs.

The computer program may alternatively be provided by first storing in, and then downloading from a computer connected to a network 18, such as, for example, the internet. Alternatively, a computer program for forming images executable in the image-forming system of the present invention may be transmitted or distributed by way of the network.

In addition, a computer program for forming images may alternatively be provided by ROM and other similar storage devices by storing the program therein beforehand.

The computer program in use for forming images in the image-forming system of the invention assumes a module configuration with the aforementioned sections and units, such as the image processing section 13, operation display control section 151, system control section 16, communication control section 17, image analysis section 31, and related function retrieval section 32.

That is, for the computer program being read out from the storage device, and subsequently being executed by CPU 5010, the abovementioned sections are loaded practically in a main storage section such that the image processing section 13,33,53, operation display control section 151, system control section 16, communication control section 17, image analysis section 31,51, and related function retrieval section 32,52, are generated in the main storage unit.

The following embodiments 5 through 11 primarily relate to image-forming systems of the invention, configured to utilize a contact operation or an utterance for performing a print setting and representing an image finish.

Specifically, the spatial item identification unit included in the system acquires spatial information on the expected image finish by contacting to a touch panel with a material, such as a finger of an operator or a stylus, and identifies a spatial instruction item as a spatial setting; and the language item identification unit receives voice information, and identifies a language instruction item as a setting mediated by language based on the voice information.

Embodiment 5

Figure 15:
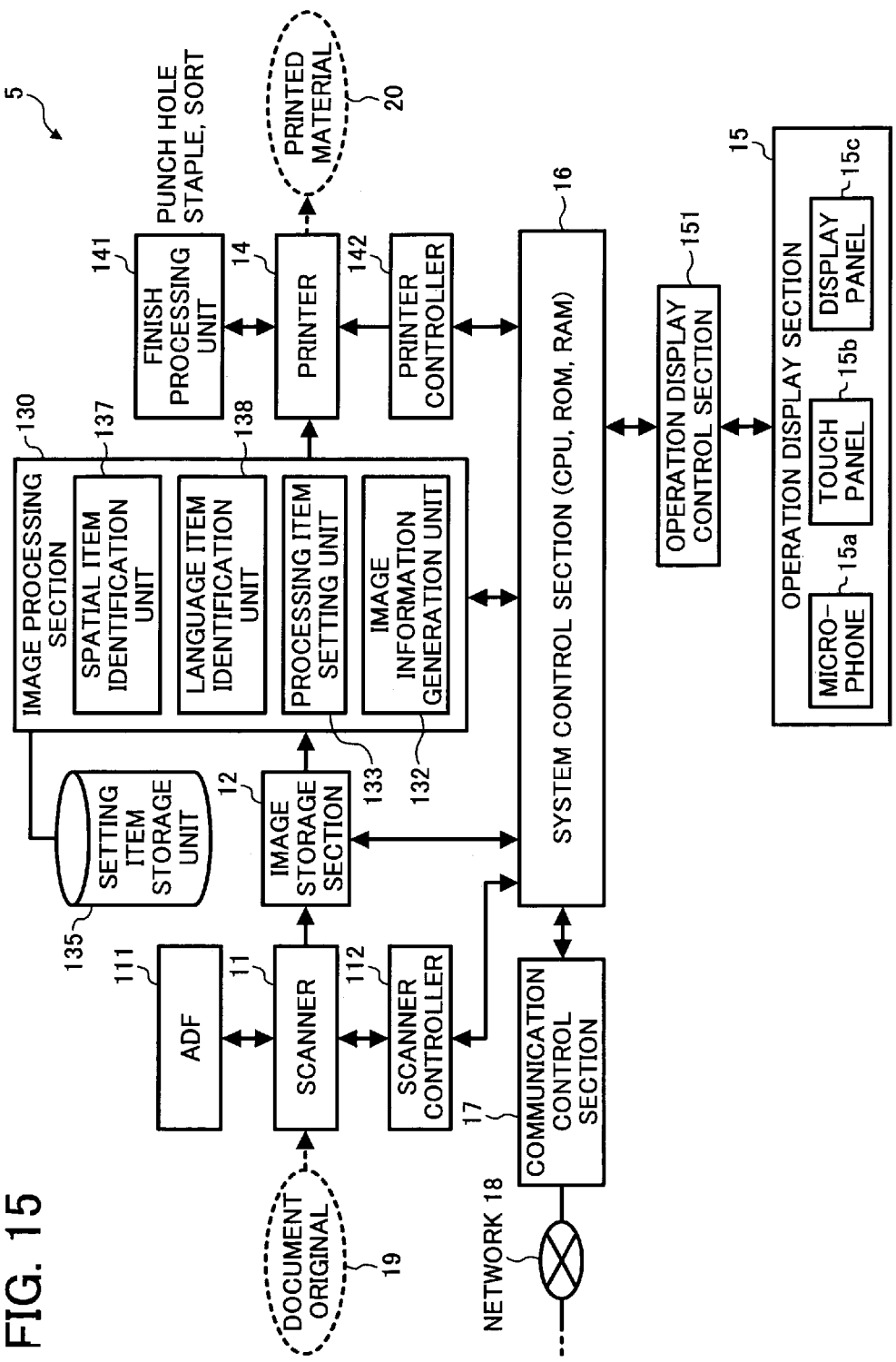
FIG. 15 is a functional block diagram illustrating an image-forming system according to a fifth embodiment of the invention.

FIG. 15 is a functional block diagram illustrating an image-forming system according to a fifth embodiment of the invention.

Referring to FIG. 15, the image-forming system 5 includes a scanner 11, ADF 111, a scanner controller 112, an image storage section 12, an image processing section 130, a printer 14, a printer controller 142, a finish processing unit 141, an operation display section 15, an operation display control section 151, a system control section 16, and a communication control section 17.

The image-forming system 5 is connected to a network 18 by way of the communication control section 17. And, the image-forming system 5 is configured to read an image on a document original 19, process image data read out, and reproduce an image on a sheet of paper so as to output the image in the form of a printed material 20 after printing and finish processing.

The scanner 11 is configured to convert the thus readout image of the document original 19 into digital image data.

In addition, the scanner 11 is provided with ADF 111 which is capable of, upon plural sheets of the document original 19 being loaded on a document tray, feeding the sheets forward one by one to a predetermined platen location for reading, and performing repetitive reading steps automatically. The scanner 11 is also capable of reading the document sheet printed not only on one (single) side of the document sheet but also on both (double) sides after reversing the sides thereof by an appropriate transport switching means.

The scanner controller 112 assumes overall control of the scanner 11 in response to an instruction issued by the system control section 16.

The image storage section 12 is a buffer memory for temporarily storing digital image data and other similar data which are read out by the scanner 11 or externally input.

Onto the multivalued data, which are sent from the scanner 11 and temporarily stored in the image storage section 12, the image processing section 130 is configured to perform gamma correction, MTF (modulation transfer function) correction, and gradation processing such as slicing or dither treatment, and thereafter binarization (or multi-valued) processing.

The image processing section 130 also performs several image processing steps to meet the conditions and priorities currently set by a user, such as image enlargement/reduction and density/color adjustment; and layout improvement processing such as double/single-sided print, collective print, or margin adjustment.

The image processing section 130 includes a spatial item identification unit 137, a language item identification unit 138, a processing item setting unit 133, an image information generation unit 132, and a setting item storage unit 135.

The image information generation unit 132 is configured to generate expected image finish information for forming an expected image finish to be displayed on a display panel 15c based on image data input. Since the image processing section 130 constitutes the portion characteristic to the present invention, further details thereof will be given later on.

The printer 14 is configured to perform several steps utilizing electrophotographic techniques, such as deflective scanning of a light beam, based on the image data suitably processed by the image processing section 130; forming an electrostatic latent image on the surface of a photosensitive drum; developing the electrostatic latent image with toner to be visualized as a toner image; and transferring and subsequently fixing the toner image onto a sheet.

The printer controller 142 conducts the control of the printer 14 in response to instructions from the system control section 16.

The printer 14 is provided with the finish processing unit 141. This processing section 141 is configured to perform various finish processing according to user setting, such as sorting out printed materials like printed material 20 by the number of copy or pages, arranging and stapling plural pages of the printed materials, and punching proper punch holes for use in filing in a binder or file.

Being provided with a microphone 15a, a touch panel 15b, and a display panel 15c, the operation display section 15 is configured to input setting contents by voice through a microphone 15a; input such contents by the input unit 15b through a keyboard, a touch-panel 15b or other similar device; and to display menu items of contents on a display panel 15c.

In addition, the display panel 15c is designed so as to make voice outputs by speaker (not shown) in addition to visual displays.

The operation display section 15 is adapted for a user to select and input items from a menu to preferably be executed by the image-forming apparatus.

The contents of the menu includes various conditions and priorities such as, for example, for reading an image by the scanner 11 corresponding to document conditions, processing the data of the image read out as above by image processing section 130, printing the processed image data by the printer 14, and/or performing finish processing such as sorting, stapling, or punching printed materials succeeding to printing by the finish processing unit 141.

The operation display section 15 may be embodied as a touch panel 15b, for example.

The touch panel 15b is instructed to show the user the information regarding expected image finish which is generated by a finish information generation unit 131 in addition to display menu items for setting operation.

The expected image information is shown on the touch panel 15b, if the information is in the form of pictorial images and texts, while the expected image information is voice output using the speaker (not shown) when it is generated in the form of voice.

The display panel 15c may be provided integrally with the touch panel 15b, or alternatively be provided separately as a display device for exclusive use.

The operation display control section 151 is configured to assume input/output controls of the operation display section 15 such as, for example, an output control of image data, which are processed by the image processing section 130, to the touch panel 15b and speaker (not shown) of the operation display section 15. In addition, the operation display control section 151 assumes input controls for the microphone 15a and touch panel 15b.

Being connected to the sections, units, and devices in the image-forming system 5, the system control section 16 assumes overall control thereof. The system control section 16 includes several devices (not shown), including at least CPU, ROM, and RAM, in which CPU is configured to perform various necessary processing based on fundamental programs stored in ROM.

The communication control section 17 is connected to a network 18, such as a LAN and the Internet so as to exchange image data and control data each other with other apparatuses connected by way of the network 18 according to the communication protocol.

Next, the image processing section 130 as the characteristic portion in the invention is detailed herein below.

The image processing section 130 includes the finish information generation unit 131, an input image information generation unit 132, and a setting unit 133.

As aforementioned, the image information generation unit 134 is configured to generate expected image finish information for forming an expected image finish to be displayed on a display panel 15c based on image data input.

The operation display control section 151 instructs the display panel 15c to display an expected image finish according to the expected image finish information generated earlier.

While the display panel 15c and touch panel 15b are shown separately on the drawing, they may be constructed integrally. Therefore, a contact by an operator's finger onto the display panel 15c is equivalent to receiving a contact input onto the touch panel 15b.

The touch panel 15b is adapted to receive an input of spatial position information at a finished state of printed material 20 on the expected image finish screen currently displayed through a contact with a finger or a stylus (hereinafter referred to as "pointer") by an operator, while viewing an expected image finish screen currently displayed on the display panel 15c.

The spatial item identification unit 137 is configured to analyze the spatial position information received by the touch panel 15b, and identify a spatial setting item, such as a margin width, for example.

The microphone 15a of the operation display section 15 is configured to receive a voice information input by the operator's utterance.

The language item identification unit 138 is configured to recognize a language instruction item as a setting mediated by the language information by performing the voice recognition, and subsequently the language analysis, of the voice information input by way of the microphone 15a.

The processing item setting unit 133 is configured to set up a setting item to apply during image formation by properly selecting among the spatial setting items identified by the spatial item identification unit 137 and the language setting items recognized by the language item identification unit 138.

The spatial setting items currently selected is stored in the setting item storage unit 135, which are subsequently acquired by the spatial item identification unit 137 as the candidates for spatial instruction items.

The processing item setting unit 133 is adapted to identify proper spatial instruction items out of the candidates selected by the spatial item identification unit 137.

For example, the spatial item identification unit 137 makes the identification by computing an aberration between the spatial information actually acquired and that of the spatial instruction item stored in the setting item storage unit 135, and by arranging the thus computed values of the aberration in descending order.

In addition, setting items concerning language are stored in the setting item storage unit 135, which are subsequently acquired by language item identification unit 138 as the candidates for language instruction items.

The processing item setting unit 133 is adapted to identify proper language instruction items out of the candidates selected by the language item identification unit 138.

For example, the language item identification unit 138 makes the identification by computing an aberration between the voice information actually acquired and that of the language instruction item stored in the setting item storage unit 135, and by arranging the thus computed values of the aberration in descending order.

The processing item setting unit 133 sets up setting items for forming an image by properly correlating the spatial and language instruction items identified as above.

The image information generation unit 132 is configured to anther expected image finish information based on the setting items set up by the processing item setting unit 133, and instruct to display on the display panel 15c.

As a specific example of the setting inputs, a user can perform an input by means of a pointer, such as a finger of the user or an exclusive stylus, with respect to a certain location, direction, region, and/or shape over the expected image finish screen currently displayed on the display panel 15c.

As to the location of contact, for example, the spatial item identification unit 137 is adapted to identify a location of printing a stamp or punching a hole out of several candidates therefor as the location closest to the contact point.

As to the direction, the spatial item identification unit 137 identifies a direction of opening a page after double-sided printing, or of providing a staple out of several candidates therefor as the direction closest to that of the pointer movement from the moment of contact through detachment.

Further, as to the region, the spatial item identification unit 137 identifies a region of blank space or erasure by recognizing the locus of pointer movement from the moment of contact through detachment as a rectangular area and by selecting the value closest to that of the rectangular area recognized above.

If the user specifies the format for printing a date, such as "2004/2/23", the spatial item identification unit 137 is adapted to recognize from a contacted form of a pair of slash marks, "/ /", based on a locus of pointer movement from the moment of contact through detachment.

While, if the user specifies another format, such as "2004.2.23", the spatial item identification unit 137 recognizes a pair of period marks, ". .", generated from the pointer contact.

The language item identification unit 138 is adapted to recognize a voice by the voice recognition means, and also to recognize the language instruction item as candidates out of setting item information stored in the setting item storage unit 135. By "language instruction item" is meant herein the types of processing performed by the duplication apparatus pronounced by user's voice, such as, for example, printing a stamp, punching, direction of setting a document original, stapling, space margin, erasure, and printing a date.

The processing item setting unit 133 is adapted to set up setting items instructed by the user in the image-forming system after complementarily identifying proper setting items through combining complementarily the setting items identified by the spatial item identification unit 137 and the language item identification unit 138.

The setting item storage unit 135 is configured to store several setting change items capable of being combined each other, such as processing, location, direction, region, and shape items.

On receiving an input for changing the setting by way of the display panel 15c, the processing item setting unit 133 performs a setting change by selecting a proper combination out of the abovementioned items stored in the setting item storage unit 135.

FIG. 16 is a plan view of an expected image finish shown diagrammatically illustrating the steps for setting image processing items by contact operation or utterance onto a touch panel by a user according to the fifth embodiment of the invention.

FIG. 17 is another view of the expected image finish in which image processing items are set by contact operation or utterance onto a touch panel by the user to receive further setting inputs by way of the screen.

Figure 18:
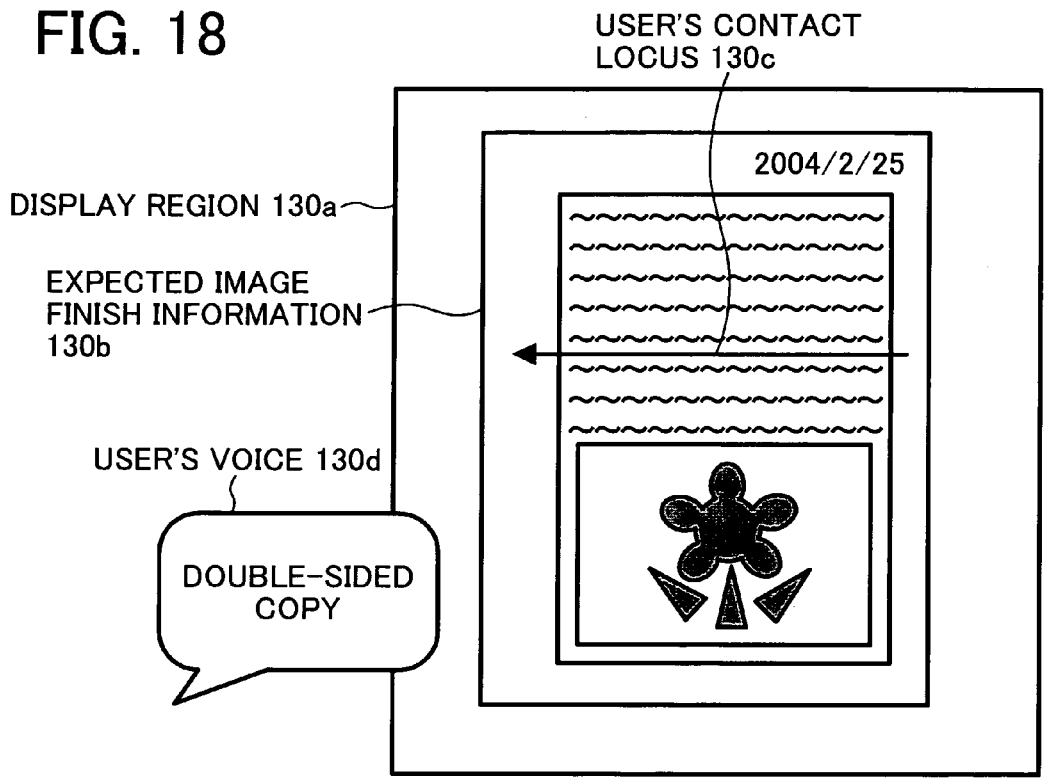
FIG. 18 is still another plan view of the expected image finish in which image processing items are set by contact operation or utterance onto a touch panel by the user to receive further an input for setting a double-sided print.

FIG. 18 is still another view of the expected image finish in which image processing items are set by contact operation or utterance onto a touch panel by the user to receive further an input for setting a double-sided print.

In the case when the user instructs to print a date in a specified format, "2004/2/25", an expected image finish screen is first displayed, in which an expected image finish 110b appears as an image formed on reading a document original reflecting the default setting prior to a setting operation by a user (FIG. 16).

Thereafter, the user performs a contact operation such that a pointer forms the contact locus 110c (FIG. 16) of pointer movement from the moment of contact through detachment. The touch panel 15b then acquires spatial information through the contact operation.

Subsequently, the user utters a voice, "PRINT DATE" (user's utterance or voice 110d). The microphone acquires voice information from the utterance.

The spatial item identification unit 137 then recognizes the slash marks for printing a date based on the location information of the marks, while the language item identification unit 138 recognizes as "date" from the uttered voice, "PRINT DATE", and select a corresponding language instruction item.

By combining the items selected above, the processing item setting unit 133 is adapted to set up a setting for printing a date in the format, such as "2004/2/25", at the upper left of the expected image finish 110b (FIG. 16), which is subsequently displayed as another expected image finish 120b (FIG. 17) on the display panel 15c.

The expected image finish 120b shown in FIG. 17 is therefore an image reflecting several items set up during the abovementioned operation steps.

Table 1 illustrates a correlation table for identifying a processing item for use in image formation out of the spatial instruction, and language instruction items.

TABLE 1

| Language item | Spatial item | | | |
|---|---|---|---|---|
| | Position item | | | |
| Processing item | Location item | Direction item | Region item | Shape item |
| Print date | Upper right | | | YYYY/MM/DD |
| Print date | Upper left | | | YYYY/MM/DD |
| Print date | . . . | | | YYYY/MM/DD |
| Print date | Upper right | | | YYYY/MM/DD |
| Print date | Upper left | | | YYYY/MM/DD |
| Print date | . . . | | | YYYY/MM/DD |
| Opening direction | | Left and right | | |
| Opening direction | | Up and down | | |
| Left margin | | | Width | |

After recognizing the slash marks for printing a date from the contact by the pointer, and also recognizing "PRINT DATE" from the voice among the language instruction items, a concrete date information, YYYY/MM/DD, is fixed as a shape item by means of the dating capability of the image processing section 130.

The user then makes another contact operation with one's finger such that the pointer forms the contact locus 120c (FIG. 17) of pointer movement, and pronounces a voice, "MARGIN" (user's voice 120d).

The spatial item identification unit 137 analyzes and identifies the contact locus as a rectangular information, the language item identification unit 138 recognizes a margin setting from the uttered voice among the language instruction items, the processing item setting unit 133 recognizes and sets up the width in the horizontal direction of the contact locus as a margin width from the thus recognized rectangular information and margin setting instruction, the image information generation unit 134 generates expected image finish information for displaying an expected image finish which is formed as an image (130*b*) having a wider space margin after displacing the entire image toward right (FIG. 18), and the display panel 15*c* displays the expected image finish screen currently updated (130*b* of FIG. 18).

The user then specifies the direction of opening the first page after a double-sided printing on the expected image finish (130*b*) displayed on the display panel 15*c*. This is performed for the user to make a contact operation with one's finger such that the pointer forms the contact locus 130*c* (FIG. 18) of pointer movement, and pronounces a voice, "DOUBLE-SIDED COPY" (user's voice 130*d*).

From the two inputs from the finger's contact operation and user's utterance, the spatial item identification unit 137 and the language item identification unit 138 are adapted to recognize the direction of the contact locus 130*c* as that for opening the page. And, the processing item setting unit 133 receives a setting as a double-sided copy having a page opening to left and right.

From the setting now received, the image information generation unit 132 generates expected image finish information for forming an expected image finish. This expected image finish information is preferably formed to display the expected image finish in three dimensions (or stereoscopically).

Figure 19:
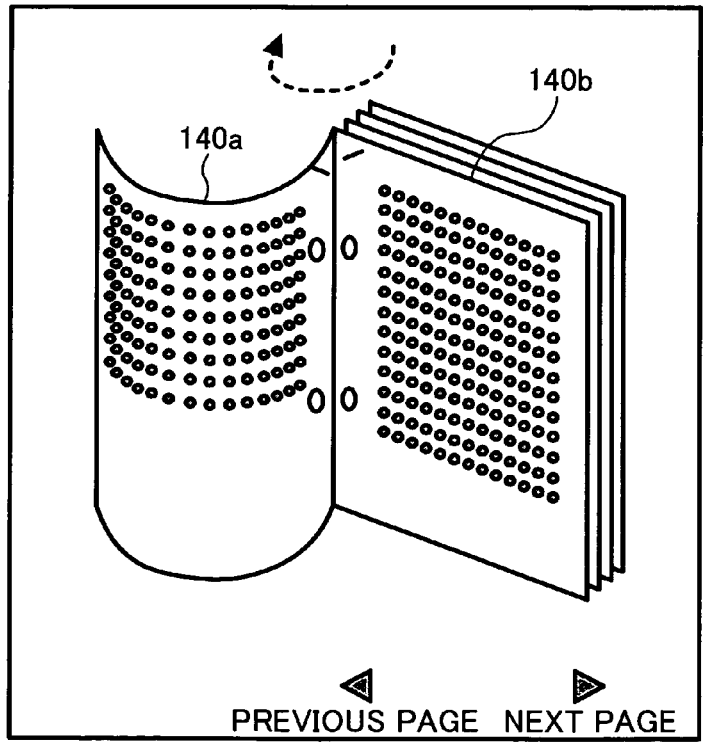
FIG. 19 is a perspective view illustrating an expected print image finish after the setting for forming a double-sided copy.

FIG. 19 is a perspective view illustrating an expected print image finish after the setting for forming a double-sided copy.

Referring to FIG. 19, the expected print image finish is shown in three dimensions as the image of multiple pages of double-sided copies, which have page openings to the left and right with the same top and bottom direction throughout the pages.

Figure 20:
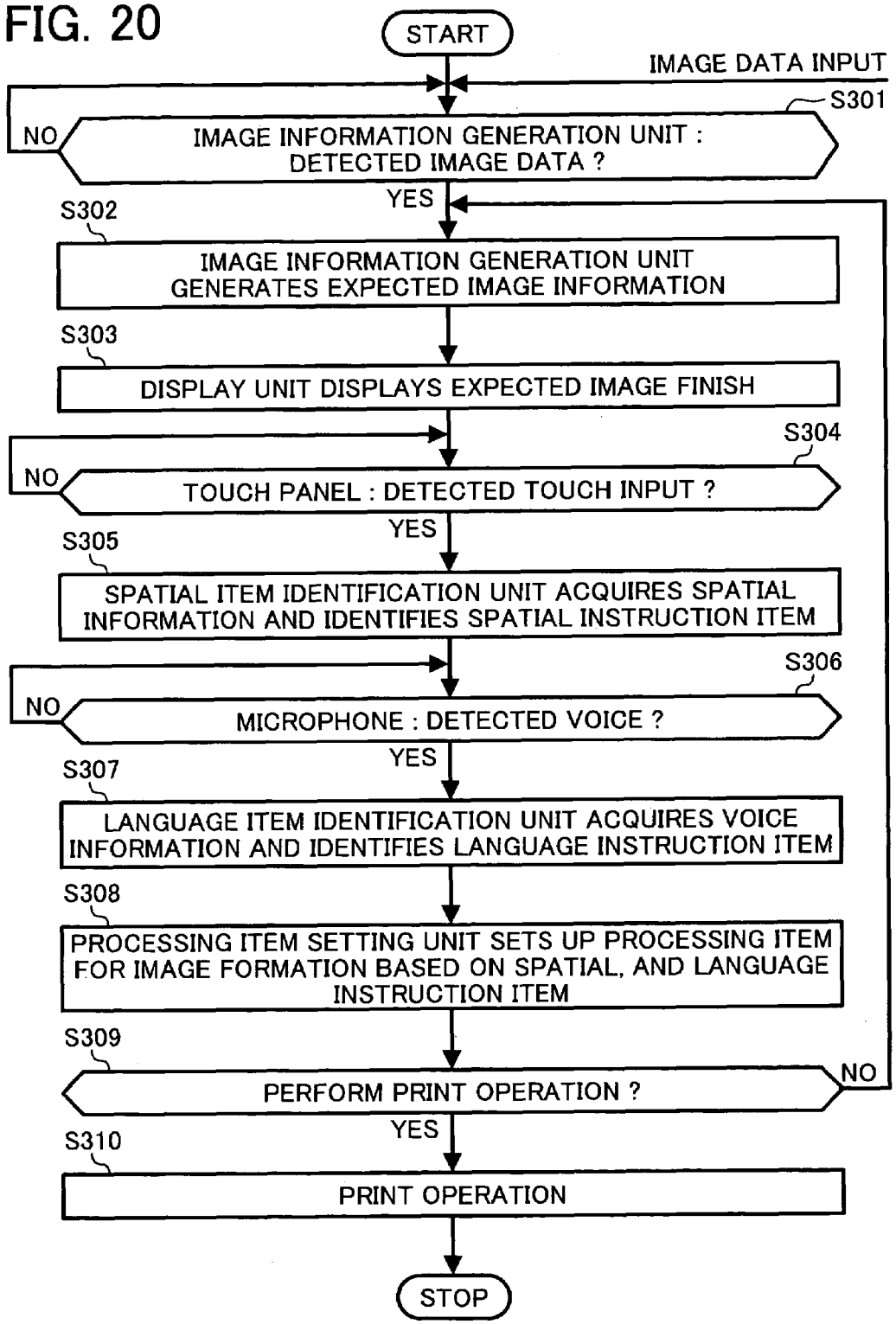
FIG. 20 is a flowchart illustrating a process flow for forming an image by the image-forming system according to the fifth embodiment of the invention.

FIG. 20 is a flowchart illustrating a process flow for forming an image by the image-forming system according to the fifth embodiment of the invention.

Referring to FIG. 20, the process begins at a standby state of the image-forming system, in which the image information generation unit 132 is standing ready for detecting an image data (step S301).

If an image data input is received (i.e., "YES" in step S301), the image information generation unit 132 generates expected image finish information (step S302). The operation display section 15 instructs to display an expected image finish screen based on the expected image finish information (step S303).

The touch panel 15*b* is here ready for detecting an input from a contact operation (step S304). If the input from the contact is received (i.e., "YES" in step S304), the spatial item identification unit 137 acquires spatial information from the contact input and identifies a spatial instruction item (step S305).

The microphone 15*a* is here ready for detecting an input from a voice (step S306). If the input from the voice is received (i.e., "YES" in step S306), the language item identification unit 138 acquires voice information and identifies a language instruction item (step S307).

The processing item setting unit 133 sets up a setting for image-forming processing from the combination of the spatial instruction items and language instruction items (step S308).

In the case when no printing is performed ("NO" in step S309), the image information generation unit 132 generates an expected image finish information again based on the setting item set up in step S308 (step S302), the display panel 15*c* displays another expected image finish screen (step S303), and repeats routine steps, such as receiving a contact input with a pointer, if necessary.

If an instruction for image-forming processing, such as printing is received ("YES" in step S309), the image-forming processing is performed (step S310).

As described herein above, the image-forming system according to the fifth embodiment of the invention is configured to display an expected image finish on the display panel 15*c*, select a spatial instruction item by the input with the pointer and a language instruction item by voice input, set up an image-forming processing item by combining the spatial and language instruction items. As a result, the image-forming system can be materialized as a highly convenient and reliable system.

Embodiment 6

Figure 21:
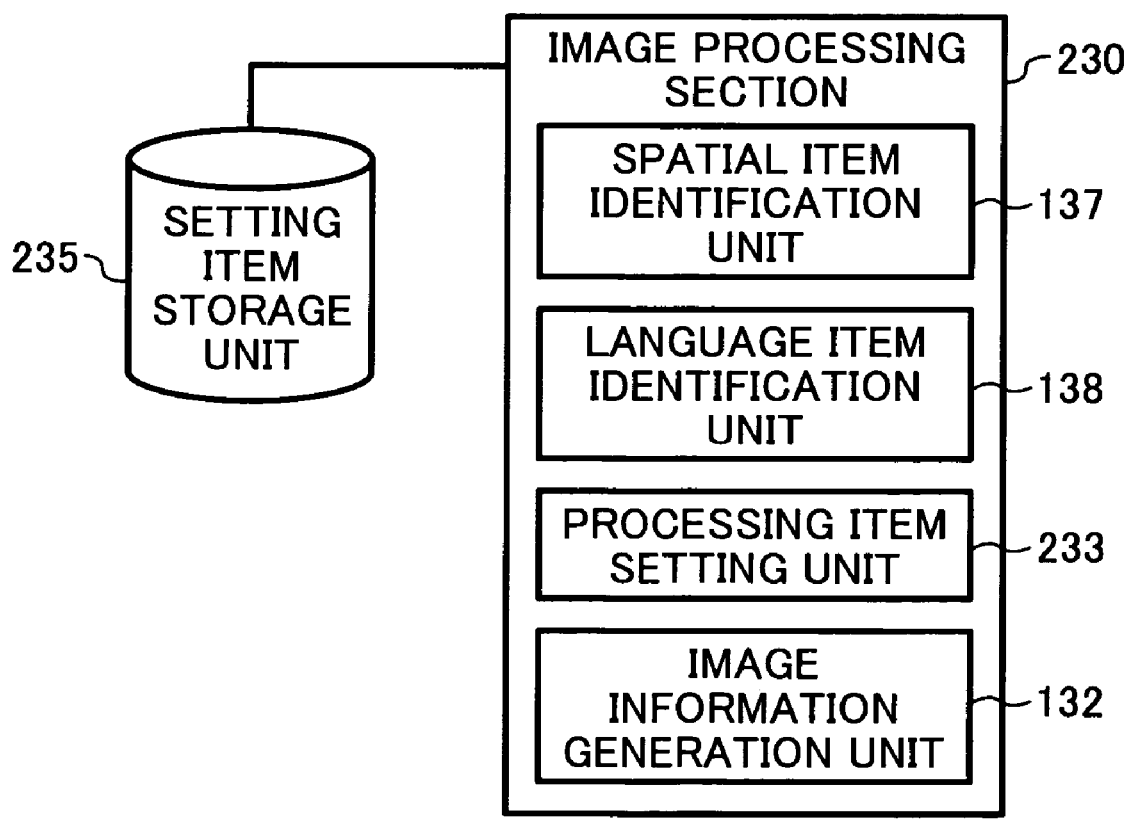
FIG. 21 is a functional block diagram primarily illustrating an image processing section as a major portion of the image-forming system according to a sixth embodiment of the invention.

FIG. 21 is a functional block diagram primarily illustrating an image processing section 230 as a major portion of the image-forming system according to a sixth embodiment of the invention.

The block diagram of FIG. 21 has a similar configuration as that of FIG. 15, with the exception that the capability of a processing item setting unit 233 included in an image processing section 230 is different from that of the processing item setting unit 133 included in the image processing section 130 in the fifth embodiment of the invention.

For purposes of clarity, the following detailed description will be made primarily on the portions unique to the sixth embodiment.

The processing item setting unit 233 according to the sixth embodiment is configured to set up processing items for image formation as follows.

In the case when instruction items are recognized from one of the spatial item identification unit 137 and the language item identification unit 138 (i.e., first instruction items from the first unit), the processing item setting unit 233 selects first candidates from the first setting items, and then outputs the first candidates to the other one of the unit 137 and the unit 138 (i.e., the second unit).

On receiving the first candidates, the second unit is adapted to select second candidates for instruction item by putting restrictions on the first candidates. The processing item setting unit 233 is then able to set up the processing items for image formation by combining the first candidates selected by the first unit and the second candidates possibly restricted by the second unit. With this configuration, processing items for image formation can be narrowed down properly.

By way of example, a description will be given of the case where instruction items from the spatial item identification unit 137 are first recognized.

Specifically, the processing item setting unit 233 extracts spatial instruction items from setting items stored in the setting item storage unit 135 according to spatial instruction item information recognized by the spatial item identification unit 137, and output the spatial instruction items extracted as above to the language item identification unit 138 as candidates for selecting processing items.

The language item identification unit 138 makes selections of corresponding language instruction items based on the spatial instruction item information currently input.

The language item identification unit 138 makes selections of candidates for language instruction items corresponding to the candidates for language instruction items received from the processing item setting unit 233 through the identification referring to the language instruction items obtained from the language analysis of user's utterance.

Subsequently, the language item identification unit 138 sends the candidates for language instruction items to the processing item setting unit 233.

The processing item setting unit 233 determines processing items corresponding to the setting input from the user by combining the language instruction items received now as above and the spatial instruction items acquired previously. The thus determined processing items are set up into the image-forming system.

Figure 22:
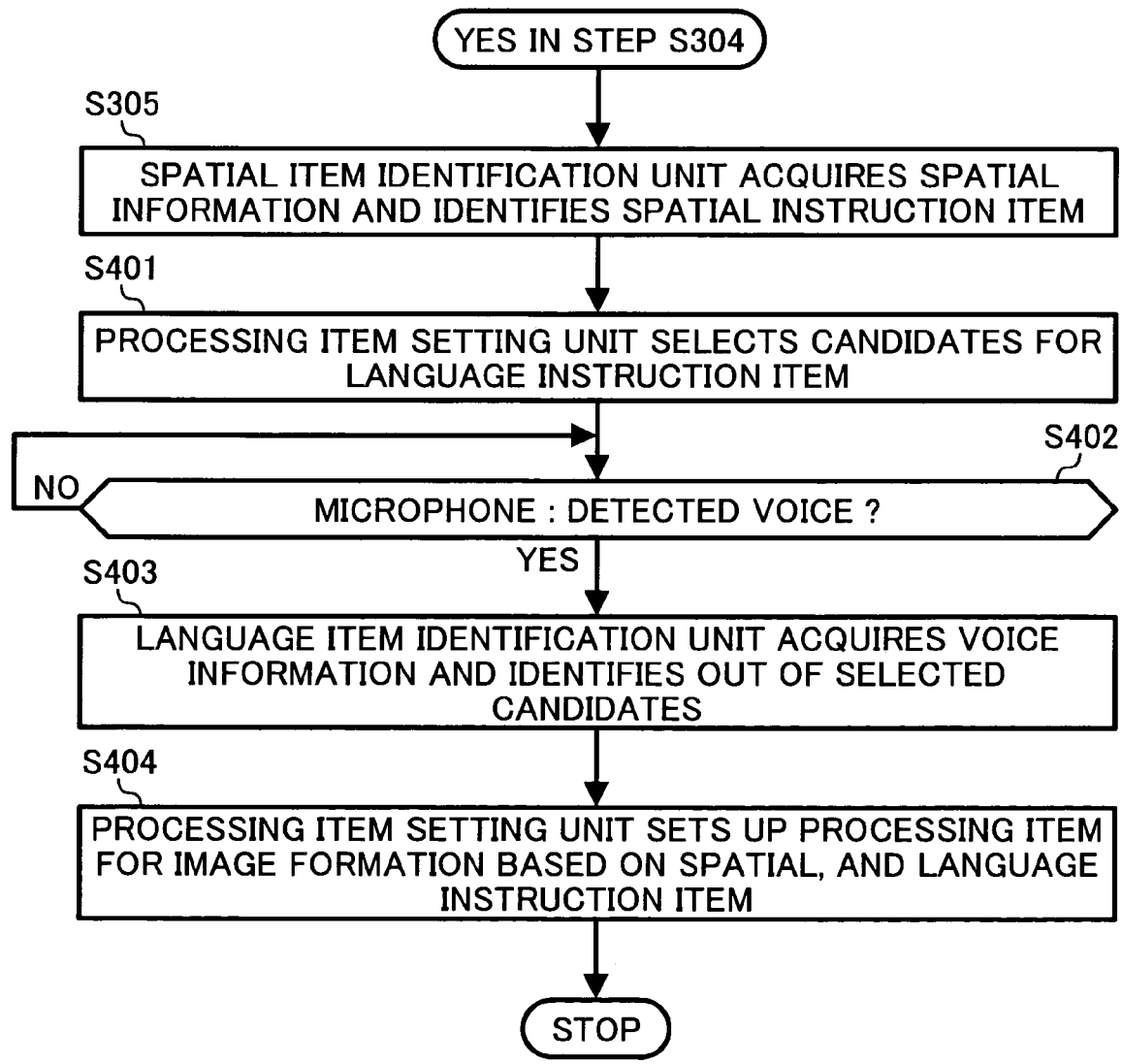
FIG. 22 is a flowchart illustrating a process flow for forming an image by the image-forming system according to the sixth embodiment of the invention.

FIG. 22 is a flowchart illustrating a process flow for forming an image by the image-forming system according to the sixth embodiment of the invention.

The steps up to S305, where the spatial instruction items are recognized, are similar to the steps S301 through S305 of the fifth embodiment.

The operation display section 15 instructs the display panel 15c to display an expected image finish screen based on the expected image finish information (step S303 of FIG. 20). On receiving the input from the contact by the touch panel 15b (i.e., "YES" in step S304), the spatial item identification unit 137 acquires spatial information and identifies a spatial instruction item (step S305).

The processing item setting unit 233 makes selections of candidates for language instruction items and outputs to the language item identification unit 138 (step S401).

The microphone 15a is ready for detecting a voice input (step S402). If the voice input is received (i.e., "YES" in step S402), the language item identification unit 138 acquires voice information detected by the microphone 15a, identifies candidates for language instruction items corresponding to the candidates for spatial instruction item input previously, and outputs to the processing item setting unit 233 after making selections (step S403).

The processing item setting unit 233 sets up processing items for image formation according to the spatial instruction items input previously and the language instruction items input from the language item identification unit 138 (step S404).

In the sixth embodiment of the invention described herein above, the processing item setting unit 233 is adapted to recognize instruction items from the spatial item identification unit 137 and select the candidates for the setting items, and output the candidates to the language item identification unit 138.

Subsequently, the language item identification unit 138 selects candidates corresponding to abovementioned candidates. The processing item setting unit 233 then sets up processing items for image formation by combining thus selected spatial instruction, and language instruction items.

A Modification to Embodiment 6

Figure 23:
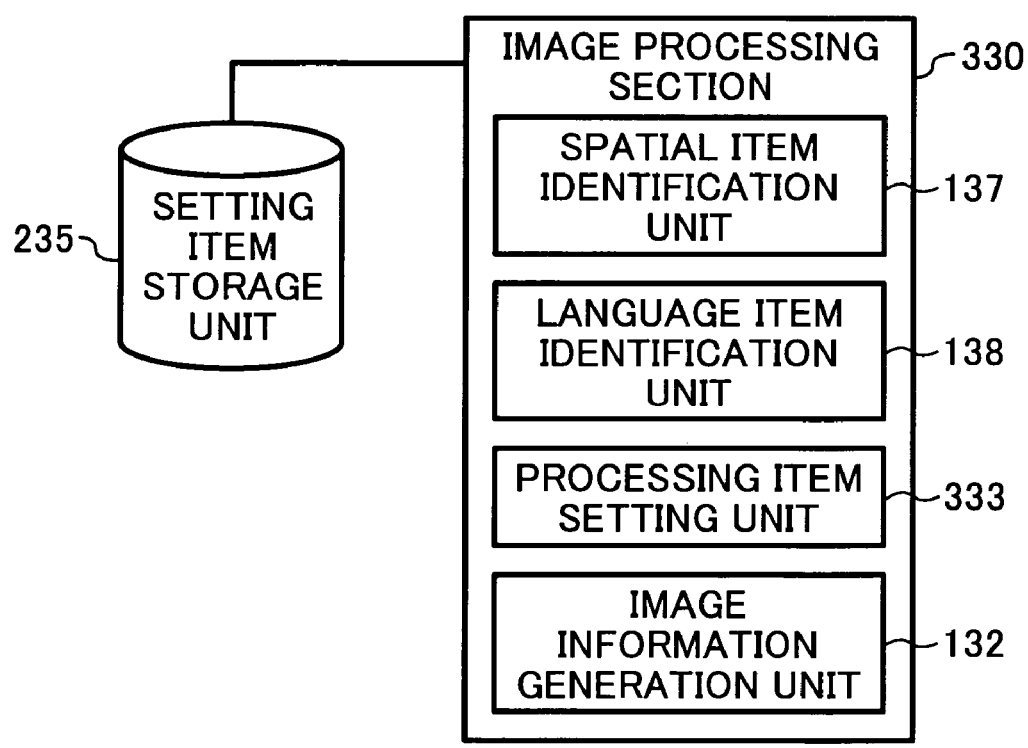
FIG. 23 is a functional block diagram illustrating the image processing section as a major portion of the image-forming system as a modification to the sixth embodiment of the invention.

FIG. 23 is a functional block diagram illustrating the image processing section 330 as a major portion of the image-forming system as a modification to the sixth embodiment of the invention.

The block diagram of FIG. 23 has a similar configuration as that of FIG. 21, with the exception that the processing steps performed by the image processing section 330 are different from those by the image processing section 230 of the sixth embodiment.

The processing item setting unit 333 in the image processing section 330 recognizes first the instruction items from the language item identification unit 138 and selects the candidates for the setting items, and output the candidates to the spatial item identification unit 137.

Subsequently, the spatial item identification unit 137 selects candidates corresponding to abovementioned candidates sent from the language item identification unit 138. The processing item setting unit 333 then sets up processing items for image formation by combining thus selected spatial instruction, and language instruction items. With this configuration, processing items for image formation can be narrowed down properly.

Specifically, the processing item setting unit 333 extracts language instruction items from setting items stored in the setting item storage unit 235 according to language instruction item information recognized by the language item identification unit 138, and output language instruction items extracted as above to the spatial item identification unit 137 as candidates for selecting processing items.

The spatial item identification unit 137 makes selections of corresponding spatial instruction items based on the language instruction item information currently input. Subsequently, the spatial item identification unit 137 sends the candidates for spatial instruction items to the processing item setting unit 333.

The processing item setting unit 333 determines processing items corresponding to the setting input from the user by combining the spatial instruction items received now as above and the language instruction items acquired previously. The thus determined processing items are set up into the image-forming system.

Figure 24:
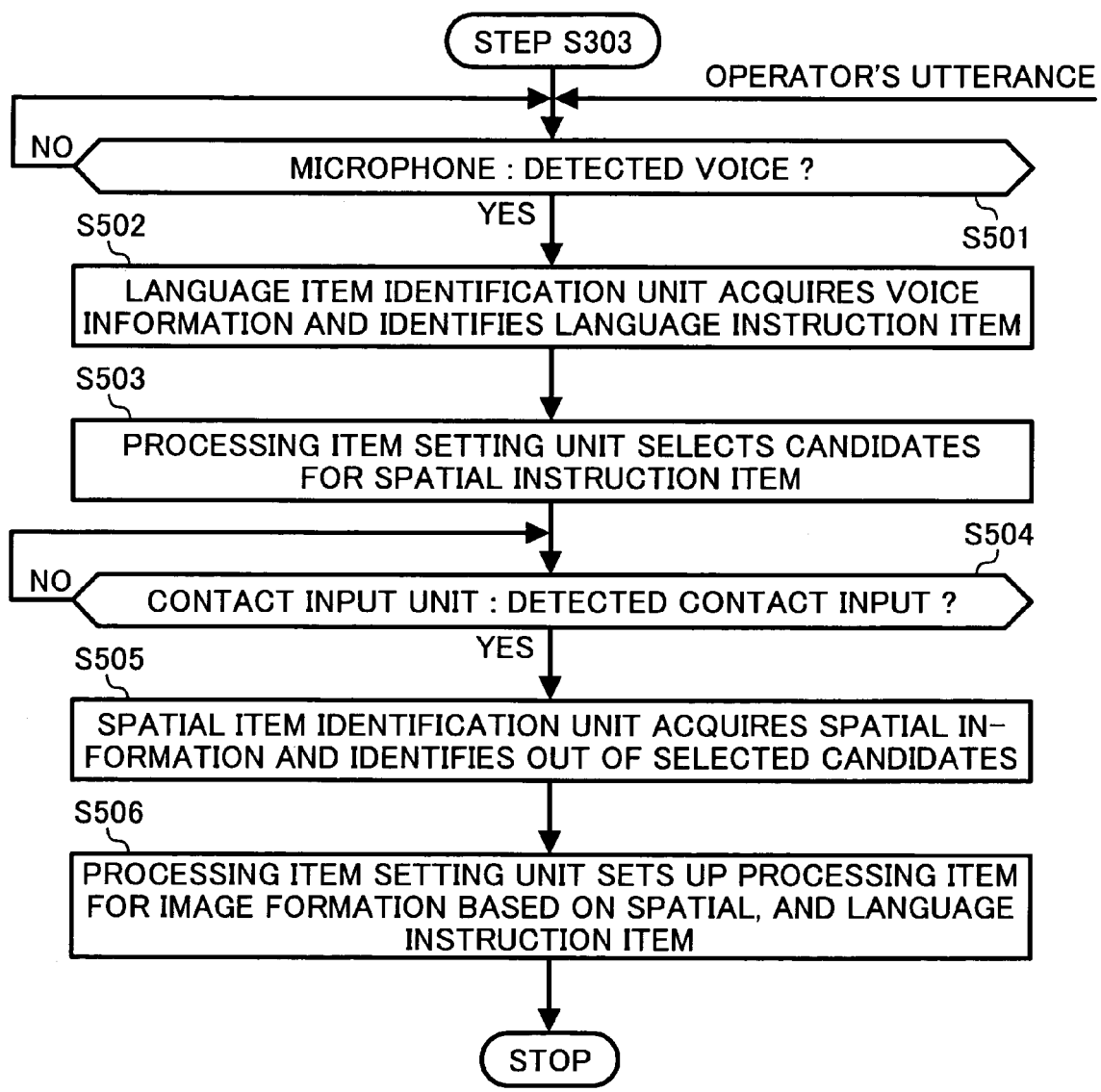
FIG. 24 is a flowchart illustrating a process flow for forming an image by the image-forming system according to the modification to the sixth embodiment of the invention.

FIG. 24 is a flowchart illustrating a process flow for forming an image by the image-forming system according to the modification to the sixth embodiment of the invention.

The process here starts from step S303, where the display panel 15c displays an expected image finish screen based on the expected image finish information.

The microphone 15a is ready for detecting a voice input (step S501). If the voice input is received (i.e., "YES" in step S501), the language item identification unit 138 acquires voice information detected by the microphone 15a, identifies candidates for language instruction items, and outputs to the spatial item identification unit 137 after making selections (step S503).

The touch panel 15b is ready for detecting a pointer contact (step S504). On receiving the input from the pointer contact by the touch panel 15b (i.e., "YES" in step S504), the spatial item identification unit 137 acquires spatial information and identifies a spatial instruction item corresponding to the candidates for language instruction item input previously (step S505).

The processing item setting unit 333 sets up processing items for image formation through identifying the correspondence between the language instruction items input previously and the spatial instruction items input currently (step S506).

In the modification to the sixth embodiment of the invention described herein above, the processing item setting unit 333 is adapted to recognize instruction items from the language item identification unit 138 and select the candidates for the setting items, and output the candidates to the spatial item identification unit 137.

Subsequently, the spatial item identification unit 137 selects candidates corresponding to abovementioned candidates. The processing item setting unit 333 then sets up processing items for image formation by properly correlating thus selected language instruction, and spatial instruction items.

As a result, the processing items can be selected efficiently and reliably by selecting candidates out of language instruction, and spatial instruction items in proper sequence, and item setting operation can be performed efficiently.

Embodiment 7

Figure 25:
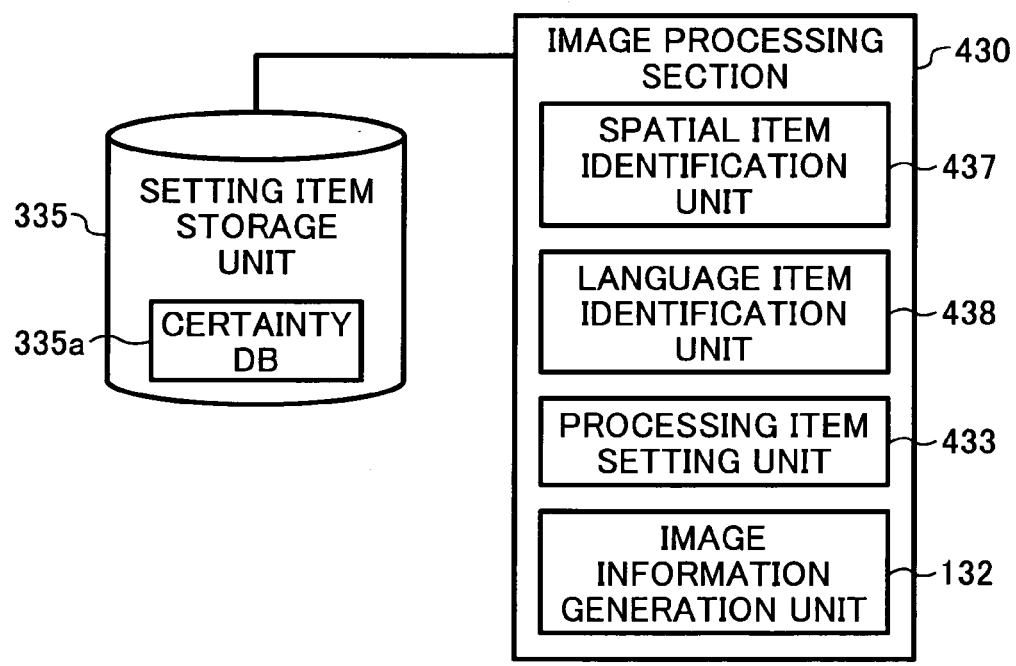
FIG. 25 is a functional block diagram primarily illustrating an image processing section as a major portion of the image-forming system according to a seventh embodiment of the invention.

FIG. 25 is a functional block diagram primarily illustrating an image processing section 430 as a major portion of the image-forming system according to a seventh embodiment of the invention.

The block diagram of FIG. 25 has a similar configuration as that of FIG. 23, with the exception that the setting item storage unit 335 in the image processing section 430 is further provided with a certainty DB 335a so that a spatial item identification unit 437 and a language item identification unit 438 recognize certainty information appended to instruction items, and that a processing item setting unit 433 performs process setting for image formation by making selections from instruction items appended with the certainty information.

For purposes of clarity, the following detailed description will be made primarily of the portions unique to the seventh embodiment.

The spatial item identification unit 437 is configured to append spatial certainty information, which is retrieved from the certainty DB 335a, to instruction item information stored in the setting item storage unit 335, and identifies the instruction item information, to output subsequently to the processing item setting unit 433.

The language item identification unit 438 is configured to append language certainty information, which is retrieved from the certainty DB 335a, to instruction item information stored in the setting item storage unit 335, and identifies the instruction item information, to output subsequently to the processing item setting unit 433.

The processing item setting unit 433 is configured to set up processing items for image formation by properly correlating the spatial instruction item information appending spatial certainty information and the language instruction item information appending language certainty information.

The certainty of a spatial instruction item is defined, for example, to be in inverse proportion to an error of spatial information currently read out and that stored in relation to the spatial instruction item beforehand in the setting item storage unit 335.

The certainty of a language instruction item is defined to be in inverse proportion to an error of language information currently input by voice and voice information stored beforehand in relation to the language instruction item in the setting item storage unit 335.

The certainty DB 335a may be constituted, for example, by containing at least a table of the error and the certainty of spatial, and voice information.

Using the table of error and certainty, the spatial item identification unit 437 and the language item identification unit 438 retrieve and append certainty information to each instruction item.

The processing item setting unit 433 sets up processing items for image formation by selecting proper spatial instruction, and language instruction items according to the appended certainty.

Figure 26:
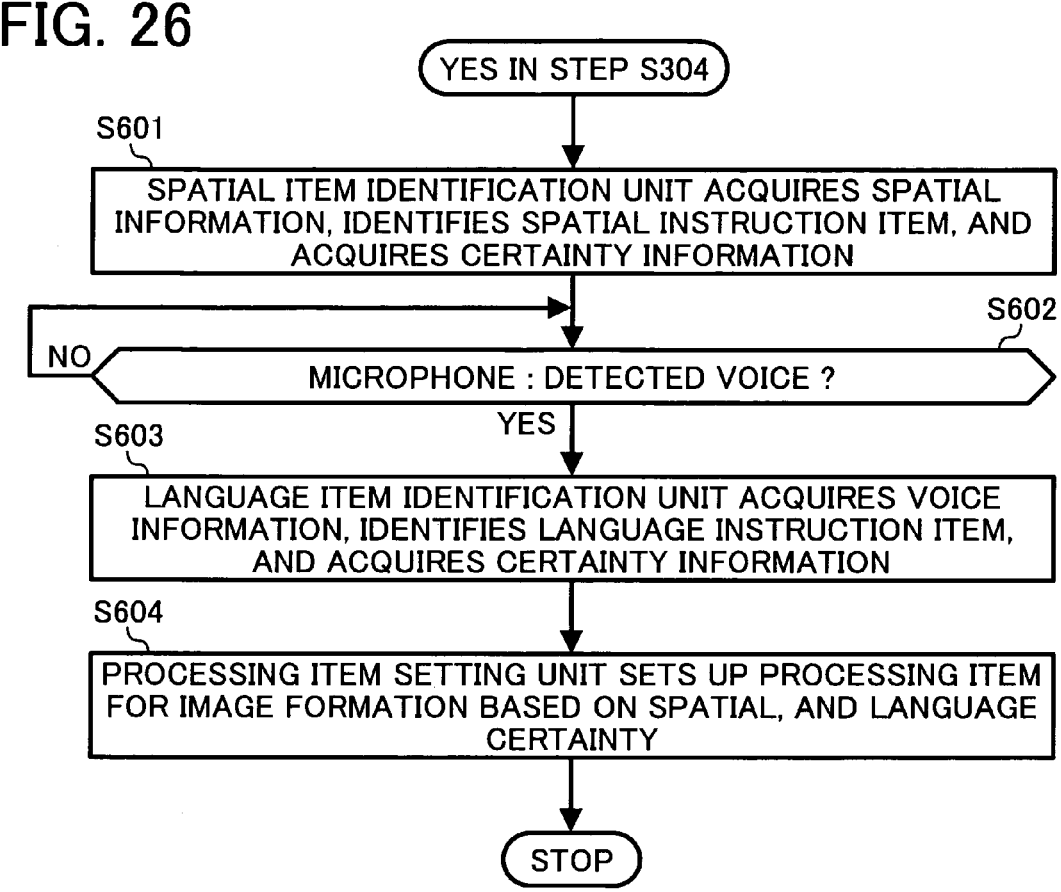
FIG. 26 is a flowchart illustrating a process flow for forming an image by the image-forming system according to the seventh embodiment of the invention.

FIG. 26 is a flowchart illustrating a process flow for forming an image by the image-forming system according to the seventh embodiment of the invention.

Since the steps up to S304 are similar to the steps S301 through S304 of the fifth embodiment, the description thereof is herein abbreviated and the steps unique to the present embodiment are primarily described.

If the touch panel 15b detects a contact input by user's finger (i.e., "YES" in step S304), the spatial item identification unit 437 is adapted to identify a spatial instruction item from the spatial information and to acquire related spatial certainty information (step S601).

The microphone 15a is ready for detecting a voice input (step S602). If the voice input is received (i.e., "YES" in step S602), the language item identification unit 438 identifies a language instruction item from the voice information, and acquires related language certainty information (step S603).

Utilizing the spatial certainty and language certainty, the processing item setting unit 433 sets up processing items for image formation by properly correlating the spatial instruction, and language instruction items (step S604).

In the seventh embodiment of the invention described herein above, the spatial item identification unit 437 identifies the spatial instruction items appending spatial certainty information, the language item identification unit 432 identifies the language instruction items appending language certainty information, and the processing item setting unit 433 performs process setting for image formation by properly correlating the spatial instruction, and the language instruction items using the certainty information.

Embodiment 8

Figure 27:
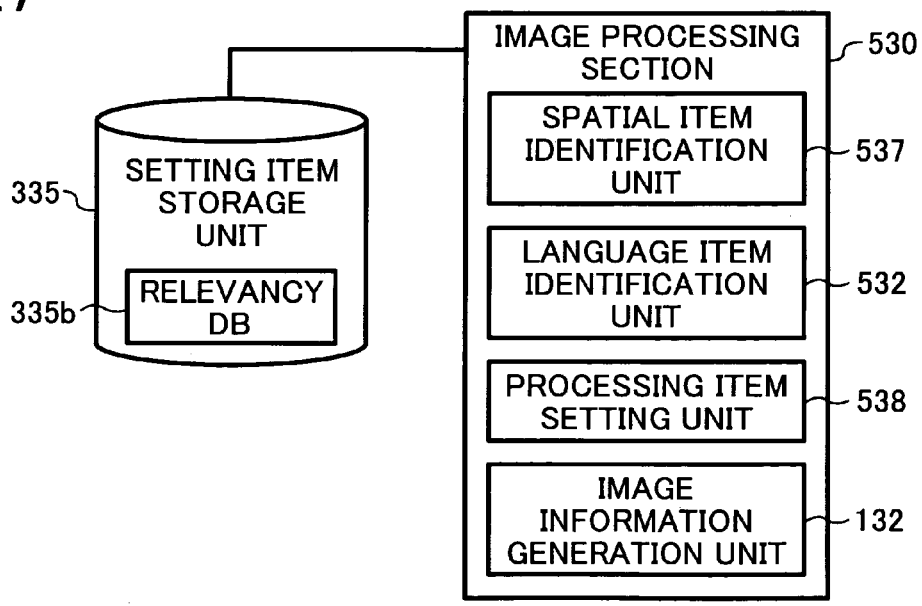
FIG. 27 is a functional block diagram primarily illustrating an image processing section as a major portion of the image-forming system according to an eighth embodiment of the invention.

FIG. 27 is a functional block diagram primarily illustrating an image processing section 530 as a major portion of the image-forming system according to an eighth embodiment of the invention.

The block diagram of FIG. 27 has a similar configuration as that of FIG. 23, with the exception that the setting item storage unit 335 in the image processing section 530 is further provided with a relevancy DB 335b so that the processing item setting unit 538 acquires relevancy which represents the degree of mutual connection between spatial instruction items identified by the spatial item identification unit 537 and language instruction items identified by the language item identification unit 532, and that the processing item setting unit 538 performs process setting for image formation by making selections of processing items for image formation according to thus acquired relevancy.

For purposes of clarity, the following detailed description will be made primarily on the portions unique to the eighth embodiment.

The relevancy DB 335b is configured to store relevancy with respect to every combination of spatial instruction, and language instruction items.

Referring again to FIG. 16 in the fifth embodiment, for example, if the user's contact locus 110c is detected, the possibility of the processing of printing date can be assumed quite high.

Accordingly, the relevancy of the spatial instruction item indicated by the contact locus of the aforementioned pair of slashes and the language instruction item of printing date is also high, and this may be represented numerically as 0.9, for example. By contrast, the relevancy of the spatial instruction of the pair of slashes and the language instruction item of punching-hole processing is defined as low as 0.1, for example.

Thus defined values for the relevancy are stored in the relevancy DB 335b of the setting item storage unit 335.

The processing item setting unit 533 sets up processing items for image formation by acquiring relevancy for each of the spatial instruction, and language instruction items, and by selecting the combination of the instruction items to yield the highest value of relevancy.

Figure 28:
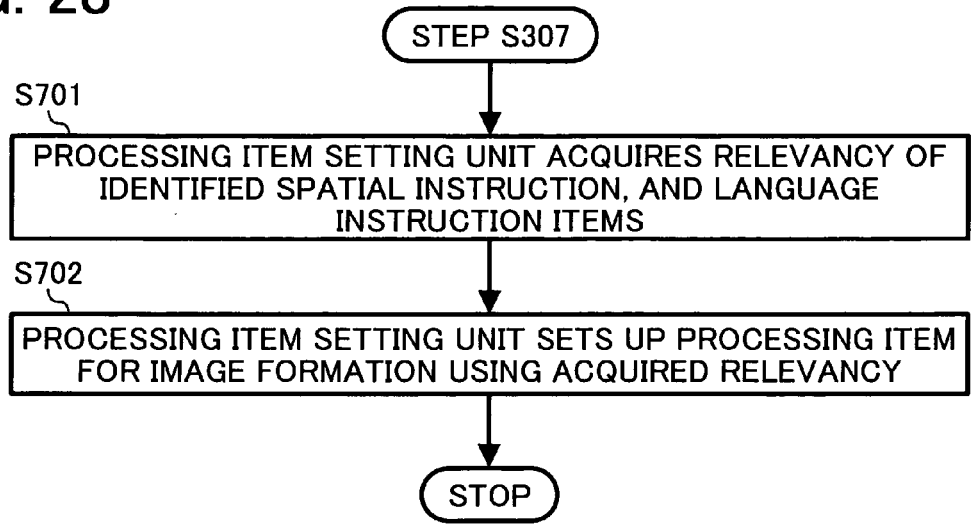
FIG. 28 is a flowchart illustrating a process flow for forming an image by the image-forming system according to the eighth embodiment of the invention.

FIG. 28 is a flowchart illustrating a process flow for forming an image by the image-forming system according to the eighth embodiment of the invention.

Since the steps up to S307 are similar to the steps S301 through S307 of the fifth embodiment, the description thereof is herein abbreviated and the steps unique to the present embodiment are primarily described.

The language item identification unit 438 acquires voice information, and identifies language instruction items by performing language analysis (step S307).

The processing item setting unit 538 then acquires relevancy of spatial instruction items identified by the spatial item identification unit 537 and language instruction items identified by the language item identification unit 532 (step S701), and performs process setting for image formation by properly correlating the spatial instruction, and language instruction items according to the relevancy acquired above (step S702).

In the eighth embodiment of the invention described herein above, the spatial item identification unit 537 identifies the spatial instruction items, and the language item identification unit 532 identifies the language instruction items.

And, the processing item setting unit 538 acquires relevancy of each of spatial instruction, and language instruction items, and performs process setting for image formation according to the relevancy acquired above.

A Modification to Embodiment 8

Figure 29:
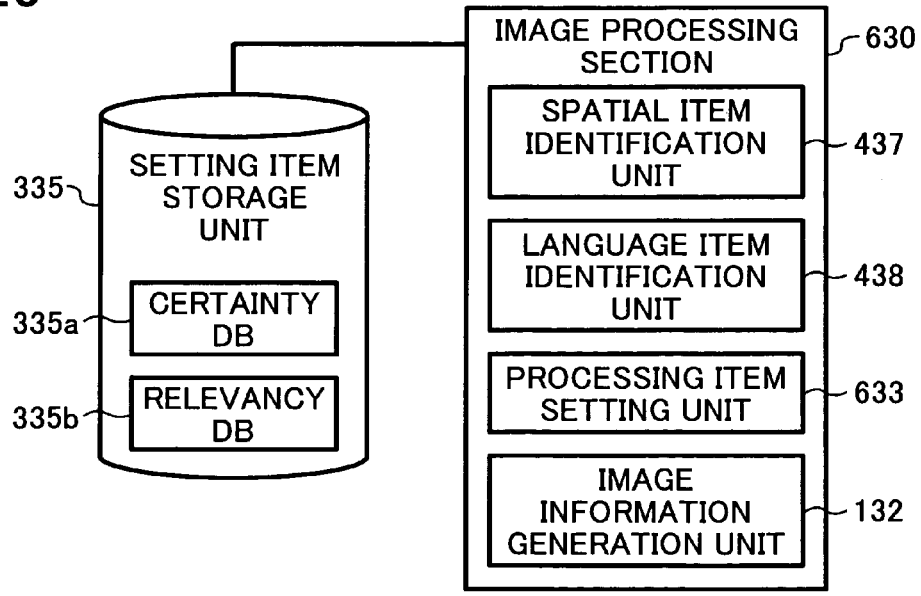
FIG. 29 is a functional block diagram illustrating the image processing section in the image-forming system as a modification to the eighth embodiment of the invention.

FIG. 29 is a functional block diagram illustrating the image processing section 630 in the image-forming system as a modification to the eighth embodiment of the invention.

A processing item setting unit 633 sets up processing items for image formation based on spatial instruction items appending certainty information currently acquired, language instruction items appending the certainty, and relevancy of spatial instruction, and language instruction items.

This item setting is carried out, for example, according to the results of the weighting addition.

Specifically, the setting item is identified by (1) performing the weighting addition of the certainty and relevancy of each of the spatial instruction, and language instruction items, (2) acquiring a maximum value from the addition, and (3) identifying the combination of the spatial instruction, and language instruction items, which yields the maximum value. And, the processing item setting unit 633 performs the set up by selecting the abovementioned combination as the setting item.

Specifically, for the spatial instruction, and language instruction items related to the candidate for the setting items, there assumed are a certainty value Si for i-th spatial instruction item candidate, a further certainty value Lj for j-th language instruction item candidate, a relevancy value Rij for the combination of the i-th spatial instruction item candidate and the j-th language instruction item candidate, a weighting factor Sc for spatial instruction items, a further weighting factor Lc for language instruction items, and a still further weighting factor Rc for the relevancy.

The processing item setting unit 633 then sets up processing items by (1) computing an equation $$Pij = ScSi + LcLj + RcRij,$$

(2) finding, from the result of the computation, the combination of the spatial instruction, and language instruction items, which yields the maximum Pij value, and (3) identifying the spatial instruction, and language instruction items corresponding to the i-th and j-th instruction item candidates.

Figure 30:
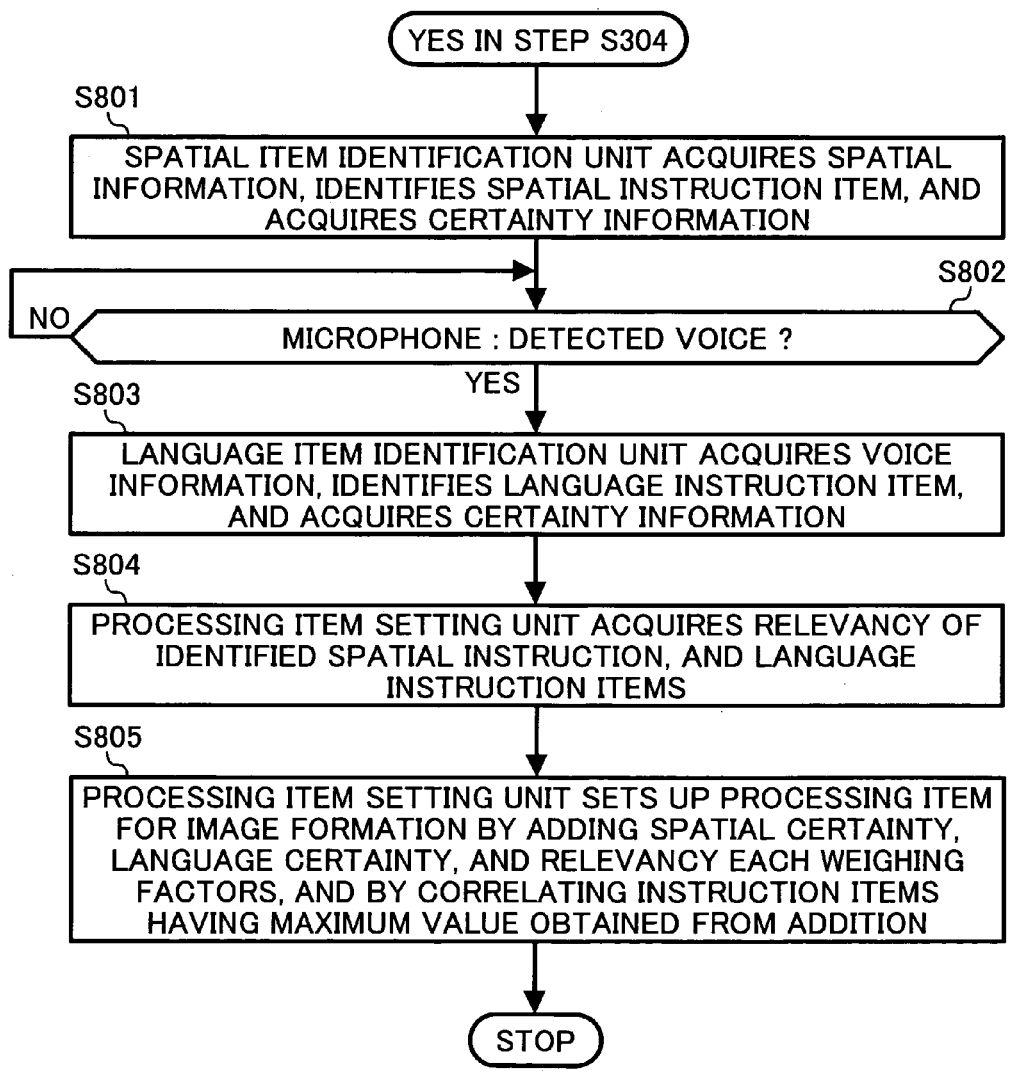
FIG. 30 is a flowchart illustrating a process flow for forming an image by the image-forming system according to the ninth embodiment of the invention.

FIG. 30 is a flowchart illustrating a process flow for forming an image by the image-forming system according to the eighth embodiment of the invention.

Since the steps up to S304 are similar to the steps S301 through S304 of the fifth embodiment, the description thereof is herein abbreviated and the steps unique to the present embodiment are primarily described.

If the touch panel 15b detects a contact input by user's finger (i.e., "YES" in step S304), the spatial item identification unit 437 acquires spatial information and corresponding certainty information (step S801).

The microphone 15a is ready for detecting a voice input (step S802). If the voice input is received (i.e., "YES" in step S802), the language item identification unit 438 acquires voice information, identifies language instruction items, and acquires related language certainty information (step S803).

The processing item setting unit 633 acquires relevancy information of the spatial instruction, and language instruction items (step S804).

The processing item setting unit 633 performs the addition of the spatial certainty, language certainty, and relevancy, each appending weighting factors; properly correlates instruction items having the maximum value obtained from the addition; and sets up processing items for image formation (step S805).

In the modification to the eighth embodiment of the invention described herein above, the processing item setting unit 633 makes the addition of the certainty of spatial instruction item, certainty of language instruction item, and relevancy of these instruction items, each appending weighting factors; properly correlates instruction items having the maximum value obtained from the addition; and sets up processing items for image formation.

Embodiment 9

Figure 31:
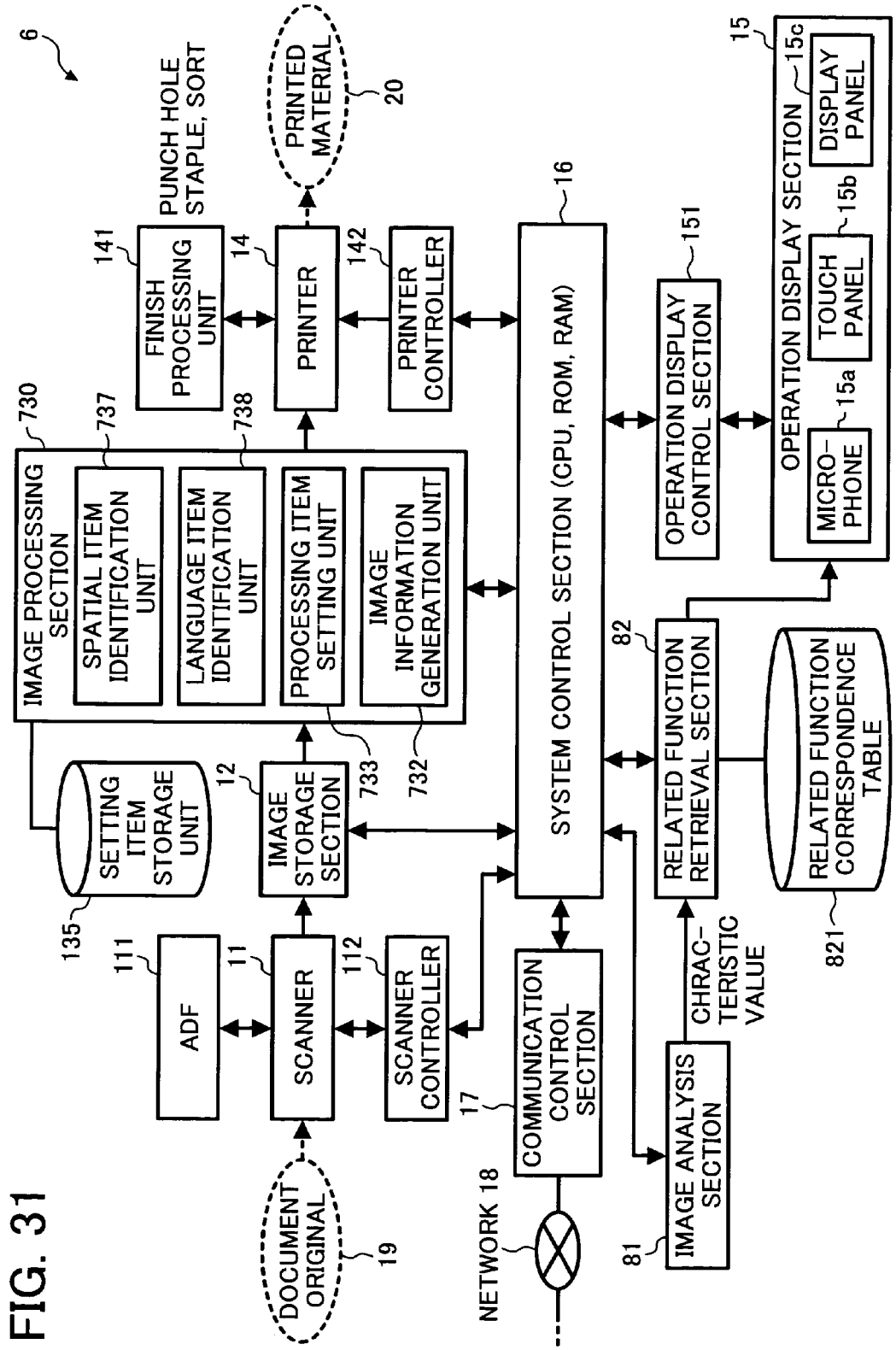
FIG. 31 is a functional block diagram illustrating an image-forming system according to the ninth embodiment of the invention.

FIG. 31 is a functional block diagram illustrating an image-forming system 6 according to a ninth embodiment of the invention.

The block diagram of FIG. 31 has a similar configuration as that of FIG. 15, with the exception that the image-forming system 6 further includes an image analysis section 81, a related function retrieval section 82, and a related function correspondence table 821, and that some capabilities of the present image processing section 730 are different from those of the image processing section 130 of the fifth embodiment.

In addition, the image processing section 730 includes a spatial item identification unit 737, a language item identification unit 738, a processing item setting unit 733, and an image information generation unit 732.

In the image-forming system 6 according to the fifth embodiment, the image analysis section 81, related function retrieval section 82, and related function correspondence table 821 are configured to extract document characteristic values.

The image information generation unit 732 generates expected image finish information from input image data based on the document characteristic value currently extracted, and the display panel 15c is configured to display an expected image finish and an input setting screen.

The image analysis section 81 is configured to analyze document image data stored in the image storage section 12 and extract the document characteristic values indicative of document characteristics. "Document characteristic values" means the size, orientation, and margin size of the document original 19, for example.

On receiving a variety of information of the document characteristic values computed by the image analysis section 81, the related function retrieval section 82 is configured to search several related functions necessary to be set for duplicating the document original 19.

The related function retrieval section 32 is provided with the related function correspondence table 821 as a file which contains a table of various functions related to respective document characteristic values.

The related function retrieval section 82 retrieves, from the related function correspondence table 821, several related functions corresponding to document characteristic values currently input, and to send narrowed-down related function information to the image processing section 730.

The related function information received by the image processing section 730 is used for generating expected image finish information by the image information generation unit 732.

The image information generation unit 734 included in the image processing section 730 according to the ninth embodiment is configured to generate finish information and input image information using (1) document characteristic values based on the results obtained from the analysis by image analysis section 81 and (2) the related function information extracted and narrowed-down by the related function retrieval section 82 using the input document characteristic values.

In addition, setting inputs may be received through an input screen displayed on the display panel 15c based on the input image information in a similar manner to the fifth embodiment.

The image analysis section 81, the related function retrieval section 82, and related function correspondence table 821, therefore, constitute an image analyzing mechanism in the invention.

Based on the document characteristic values obtained from the analysis by image analysis section 81 and document image data, the processing item setting unit 733 then performs the setup for the current document, such as (1) the A3 size, (2) the widthwise orientation, and (3) the margin size of top 20 mm, bottom 15 mm, left 20 mm, and right 20 mm.

The user performs additional settings by way of a touch panel 15b and/or a microphone 15a, if necessary, while visually confirming the expected image finish on the screen. Since process steps following the settings are similar to those of the fifth embodiment, the description thereof is herein abbreviated.

Figure 32:
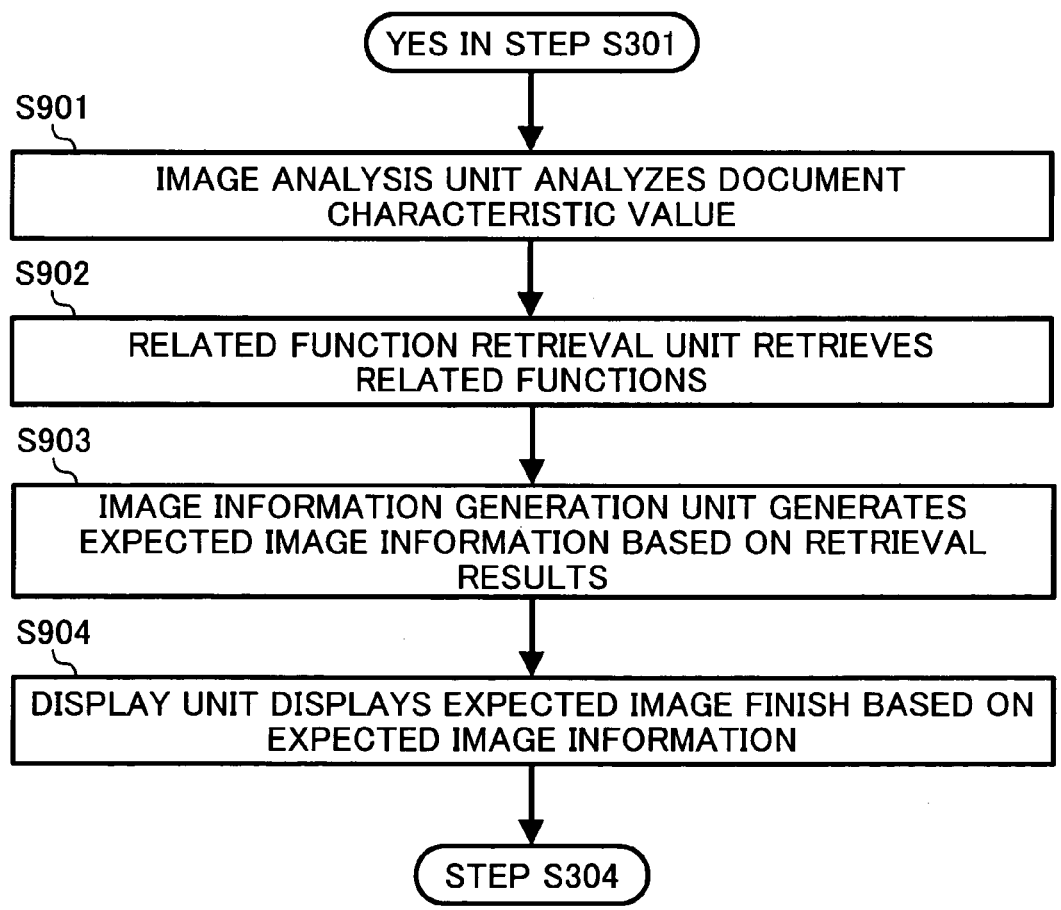
FIG. 32 is a flowchart illustrating a process flow for forming an image by the image-forming system according to the ninth embodiment of the invention.

FIG. 32 is a flowchart illustrating a process flow for forming an image by the image-forming system according to the ninth embodiment of the invention.

If an image data input is received by the image information generation unit 732 (i.e., "YES" in step S301 in the fifth embodiment), the image analysis section 81 analyses input document image data and extracts document characteristic values (step S901), the related function retrieval section 82 retrieves the related function correspondence table 821 based on the document characteristic values extracted by the image analysis section 81, and the results obtained from the retrieval are sent to the image processing section 730 (step S902).

The image information generation unit 732 generates another expected image finish information taking the abovementioned results into account (step S903) and the display panel 15c is instructed to display an expected image finish (step S904).

Since process steps following displaying the expected image finish are similar to those of the fifth embodiment, the description thereof is herein abbreviated.

In the modification to the ninth embodiment of the invention described herein above, the image information generation unit 732 instructs to display the expected image finish and the setting screen in use for receiving additional user's setting, taking into account the document characteristic values analyzed by the image analysis section 31, and the setting inputs can be received by way of the display.

Therefore, the expected image finish and the items additionally to be input can be narrowed-down precisely with the present structure. The processing items can be selected with high certainty and precision, and item setting operation can be performed efficiently and reliably.

Embodiment 10

An image processing apparatus according to a tenth embodiment of the invention is provided as a subsystem for primarily performing image processing, being incorporated into the image-forming system of the fifth embodiment.

Figure 33:
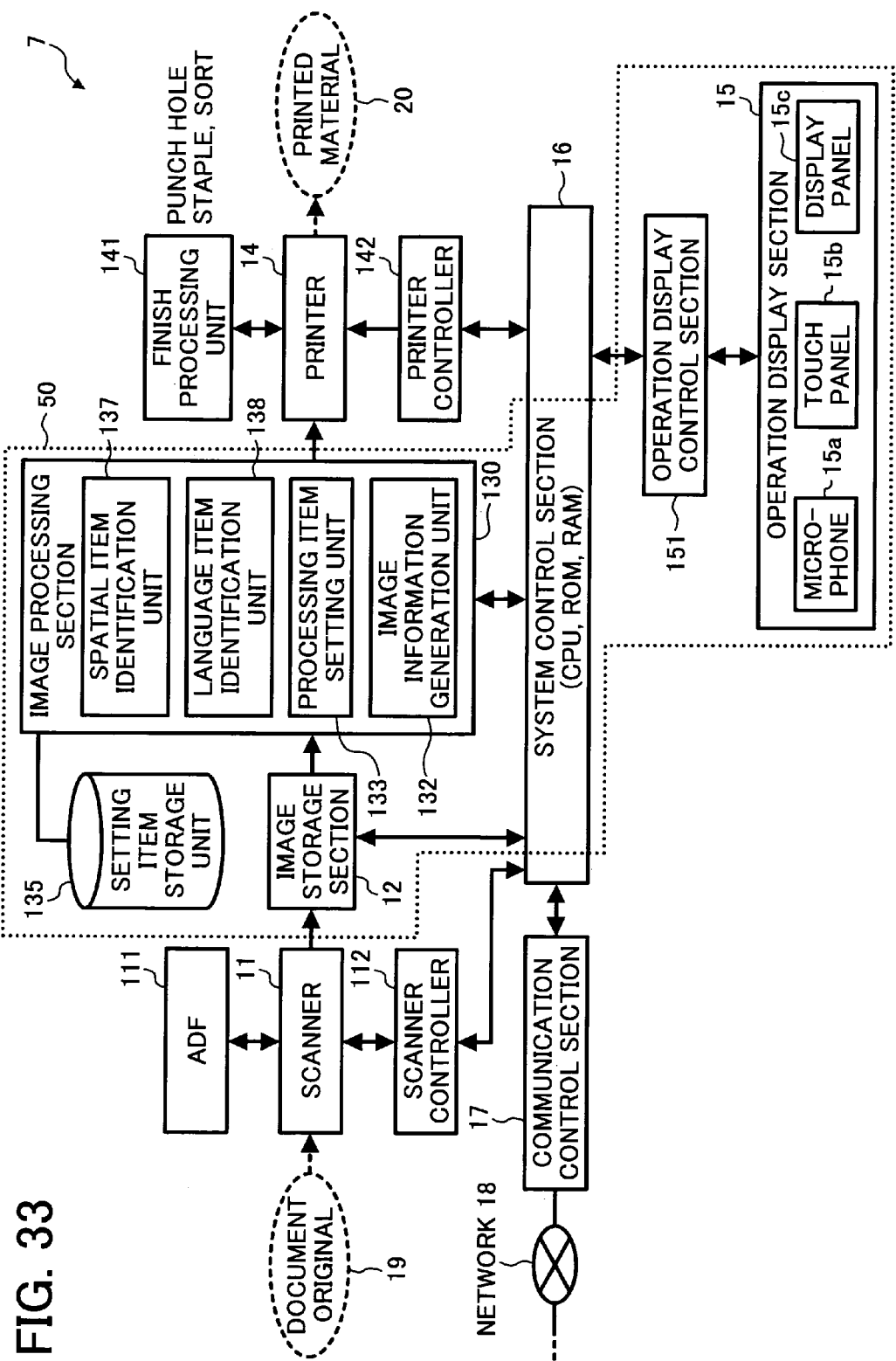
FIG. 33 is a functional block diagram illustrating an image-forming system, incorporating the image processing apparatus.

FIG. 33 is a functional block diagram illustrating an image-forming system 7, incorporating the image processing apparatus 50. The image processing apparatus 50 is configured to have the same image processing capabilities as those of the image-forming system 7. Therefore, description of these image processing capabilities is herein abbreviated.

In the image-forming system according to the tenth embodiment of the invention, an expected image finish screen is displayed prior to print processing and an input setting screen is also displayed to be used for receiving setting inputs from the operator based on image data which are obtained by reading a document or by way of a network.

Thus, the expected image finish is displayed on the display panel 15c, suitably selecting spatial instruction items are suitably selected by pointer input, language instruction items are identified by voice input, and image processing items are set after properly correlating the spatial instruction items and language instruction items.

Embodiment 11

Figure 34:
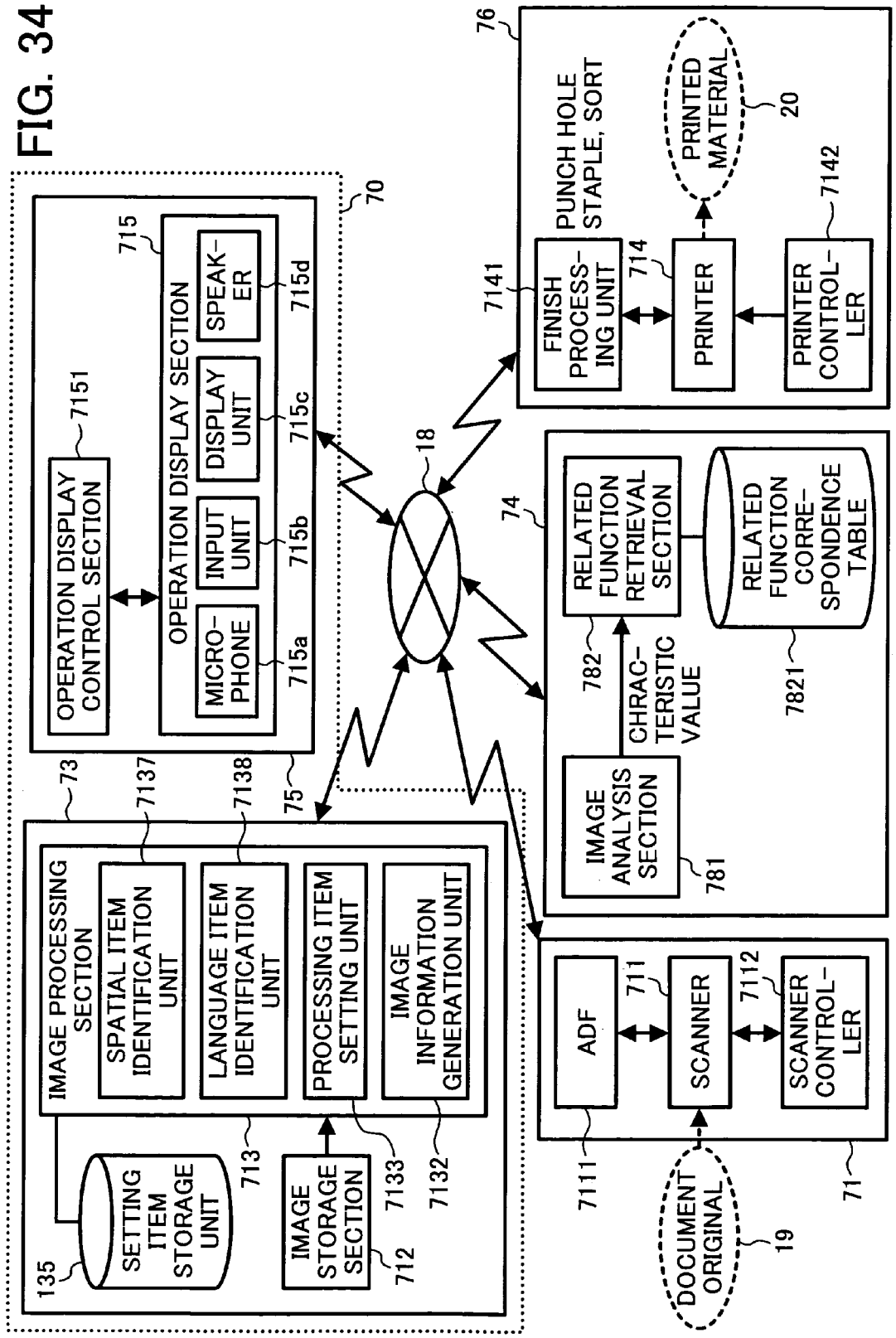
FIG. 34 is a functional block diagram illustrating an image processing system according to an eleventh embodiment of the invention.

FIG. 34 is a functional block diagram illustrating an image processing system according to an eleventh embodiment of the invention.

This image processing system is constructed, incorporating the abovementioned image processing apparatus 70 and other units for performing the same image processing as in the fifth embodiment.

The present image-forming system has a similar configuration to the image-forming system 7 of the tenth embodiment, with the exception that several apparatuses and units are interconnected by way of a network.

The image processing system 70, a document reading section 71, and a printer section 76 are interconnected by way of the network, thereby constituting an imaging system.

The image processing system 70 includes an image processing apparatus 73 and an operation display apparatus 75. In addition, the units included in the image processing section 73 may alternatively be formed separately, being interconnected by way of the network.

Further, an image analysis apparatus 74 may further be included for analyzing document characteristic values, as shown also in FIG. 34.

In the image-forming system according to the eleventh embodiment of the invention, an expected image finish screen is displayed prior to print processing and an input setting screen is also displayed to be used for receiving setting inputs from the operator, based on image data which are read out or acquired by way of the network. Working efficiency and convenience for the user can therefore be much improved, and reliability of the system increases in the image-forming system of the invention.

The following embodiments 12 through 17 primarily relate to the location acquisition unit and the execution determination unit included in the image-forming systems of the invention.

The location acquisition unit is configured to receive a touch input by an operator onto the display unit displaying the expected image finish information and acquire information on the location of the touch input. The execution determination unit is configured to determine whether a processing item set by the setting unit is executable, and also determine the reason for being non-executable of the processing item.

Embodiment 12

Figure 35:
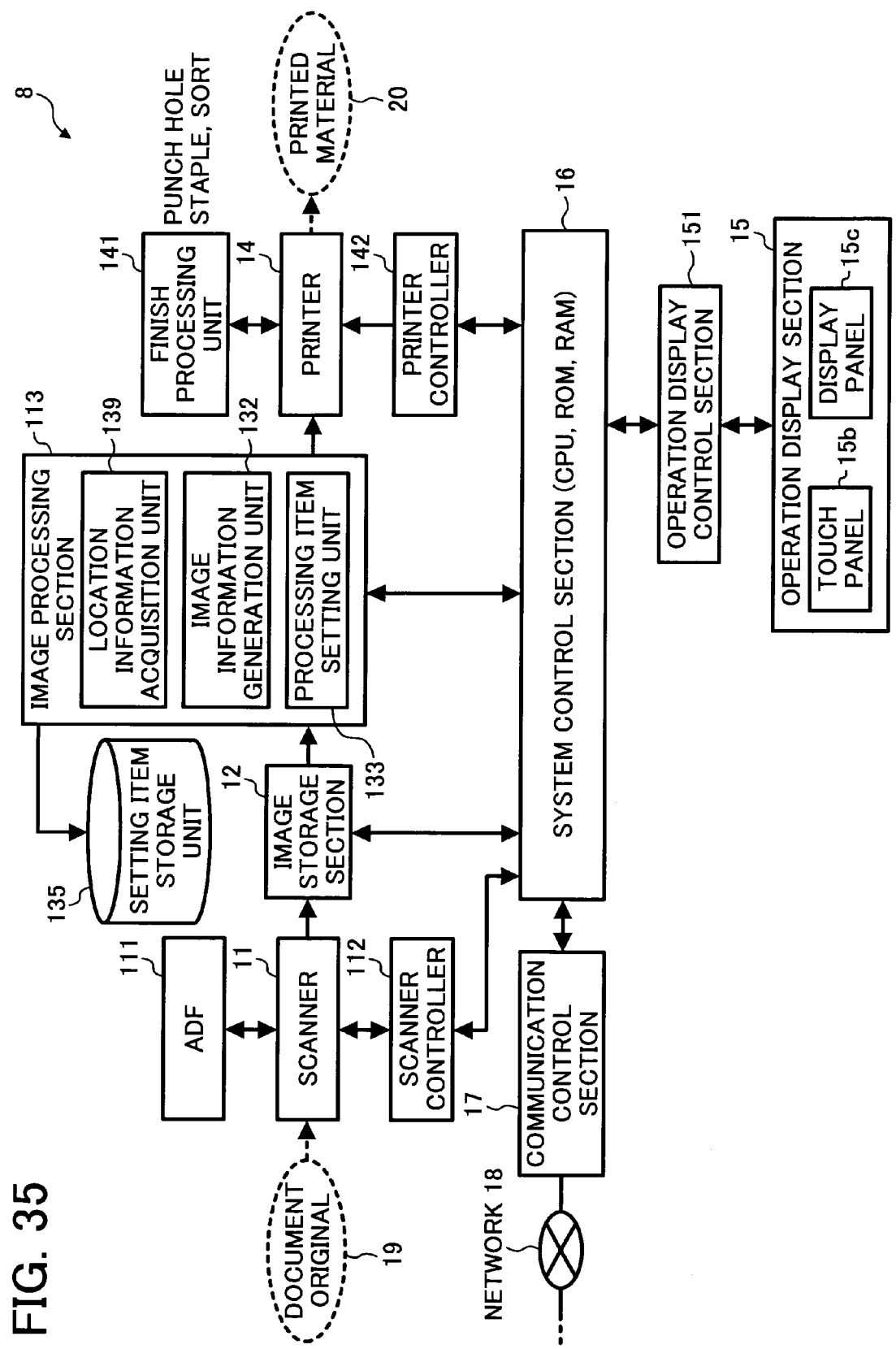
FIG. 35 is a functional block diagram illustrating an image-forming system according to a twelfth embodiment of the invention.

FIG. 35 is a functional block diagram illustrating an image-forming system 8 according to a twelfth embodiment of the invention.

Referring to FIG. 35, the image-forming system 8 includes a scanner 11, an ADF 111, a scanner controller 112, an image storage section 12, an image processing section 113, a printer 14, a printer controller 142, a finish processing unit 141, an operation display section 15, an operation display control section 151, a system control section 16, and a communication control section 17.

The image-forming system 8 is connected to a network 18 by way of the communication control section 17. And, the image-forming system 8 is configured to read an image on a document original 19, process data of the image thus read out, and reproduce an image on a sheet of paper so as to output the image in the form of a printed material 20 after printing and finish processing.

The scanner 11 is configured to convert the readout image of the document original 19 into digital image data.

In addition, the scanner 11 is provided with ADF 111 which is capable of, upon plural sheets of the document original 19 being loaded on a document tray, feeding the sheets forward one by one to a predetermined platen location for reading, and performing repetitive reading steps automatically. The scanner is also capable of reading the document sheet printed not only on single side of the document sheet but also on both sides after reversing the sides thereof by an appropriate transport switching means.

The scanner controller 112 assumes overall control of the scanner 11 in response to an instruction issued by the system control section 16.

The image storage section 12 is a buffer memory for temporarily storing digital image data and other similar data which are read out by the scanner 11 or externally input.

The image-forming system of the present embodiment is configured to perform an image data processing and image formation of image data not only readout by the scanner 11 but also externally input, as well.

Onto the multivalued data which are sent from the scanner and temporarily stored in the image storage section 12, the image processing section 113 is configured to perform gamma correction or MTF correction, gradation processing such as slicing or dither treatment, and thereafter binarization (or multi-valued) processing.

The image processing section 113 also performs several image processing steps to meet the conditions and priorities currently set by a user, such as image enlargement/reduction and density/color adjustment; and layout improvement processing such as double/single-sided print, collective print, or margin adjustment.

The image processing section 113 includes a location information acquisition unit 139, an image finish information generation unit 132, a processing item setting unit 133, and a setting item storage unit 135.

The location information acquisition unit 139 is configured to acquire coordinate information on the image input stored in the setting item storage unit 135.

The image finish information generation unit 132 is configured to generate expected image finish information from image data input, which is used for forming an expected image finish according to the image input to be displayed on a display panel 15b.

Since the image processing section 113 constitutes the portion characteristic to the present invention, further details thereof will be given later on.

The printer 14 is configured to perform several steps utilizing electrophotographic techniques, such as deflective scanning of a light beam, based on the image data suitably processed by the image processing section 113; forming an electrostatic latent image on the surface of a photosensitive drum; developing the electrostatic latent image with toner to be visualized as a toner image; and transferring and subsequently fixing the toner image onto a sheet.

The printer controller 142 conducts the control of the printer 14 in response to instructions from the system control section 16.

The printer 14 is provided with the finish processing unit 141. This section 141 is configured to perform various finish processing according to an automatic, or user setting, such as sorting out printed materials like printed material 20 by a number of copy or pages, arranging and stapling the plural pages of the printed materials, and punching proper punch holes for use in filing in a binder or file.

Being provided with a touch panel 15a and a display panel 15b, the operation display section 15 is configured to input setting contents by way of the touch panel 15b and display menu items of contents on a display panel 15c, which are used for setting an expected image finish and an image finish.

In addition, the display panel 15c may alternatively be designed to make voice outputs by speaker (not shown) in addition to visual displays.

The operation display section 15 is adapted to display the capabilities preferably be executed by the image-forming apparatus as menu items on a setting screen, and to receive a setting input by an operator selected from the menu items.

The contents of the menu includes various conditions and priorities such as, for example, for reading an image by the scanner 11 corresponding to document conditions, processing the data of the image read out as above by image processing section 113, printing the processed image data by the printer 14, and/or performing finish processing such as sorting, stapling, or punching printed materials following printing by the finish processing unit 141.

The display panel 15b may be provided integrally with the touch panel 15b, or alternatively be provided separately as a display device for exclusive use.

The operation display control section 151 is configured to assume input/output controls of the operation display section 15 such as, for example, an output control of image data, which are processed by the image processing section 113, to the touch panel 15b and the display panel 15c. In addition, the operation display control section 151 assumes input control from a touch panel 15b.

Being connected to the sections, units, and devices in the image-forming system 8, the system control section 16 assumes overall control thereof. The system control section 16 includes several devices (not shown), including at least a CPU, ROM, and RAM, in which the CPU is configured to perform various necessary processing using working areas of RAM based on fundamental programs stored in ROM.

The communication control section 17 is connected to a network 18, such as a LAN and the Internet, so as to exchange image data and control data each other with other apparatuses connected by way of the network according to the communication protocol.

The image processing section 113 is further detailed as the characteristic portion in the present invention.

The image finish information generation unit 132 generates expected image finish information from image data input, which is used for forming an expected image finish according to the image input to be displayed on a display panel 15c.

The operation display control section 151 instructs the display panel 15c to display an expected image finish according to the expected image finish information generated earlier.

Incidentally, it is noted that the image finish information generation unit 132 generates the information on (1) an expected image finish to be printed, and (2) an input setting screen for receiving processing items related to the expected image finish, as will be described later on, which is herein referred to as "expected image finish information".

While the display panel 15c and touch panel 15b are illustrated separately in the drawing, they are formed herein below as an integral device.

When the display panel 15c is touched by a finger or a stylus (hereinafter referred to as a pointer), the touch panel 15b is adapted to receive a contacting input, in which the location of the touching on the panel 15b can be detected electrically or magnetically.

Figure 36:
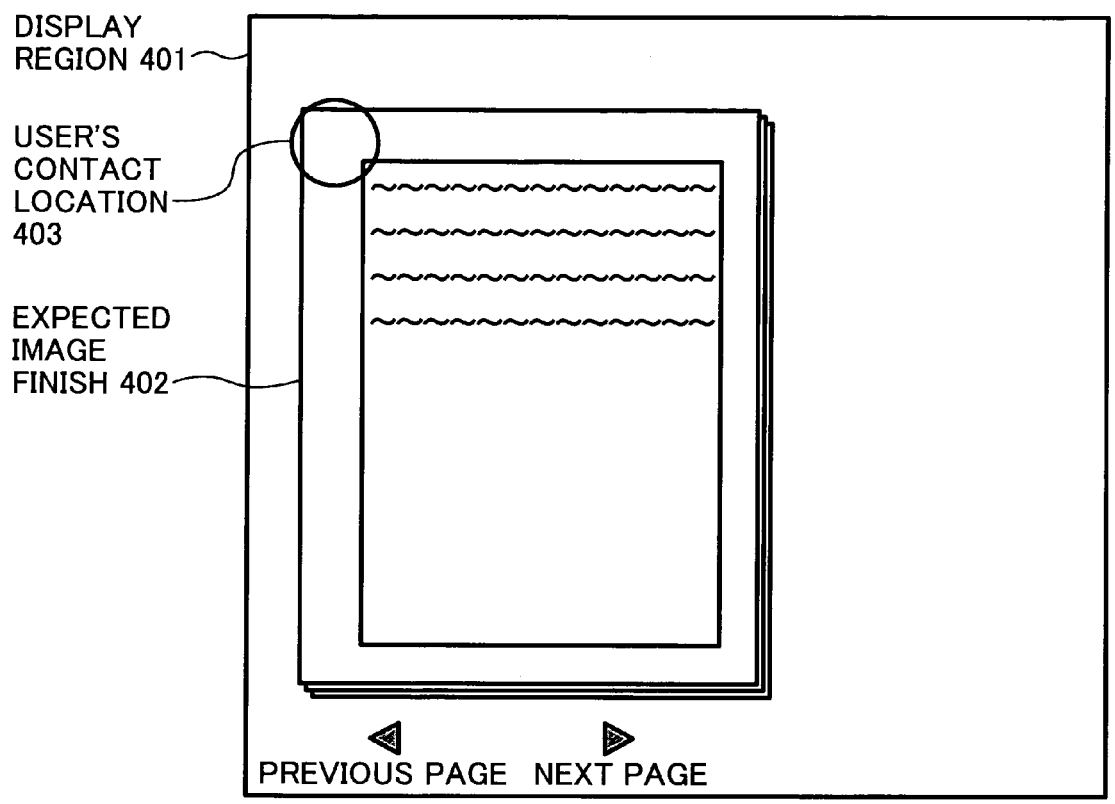
FIG. 36 is a plan view diagrammatically illustrating an expected image finish generated from image data input in the image-forming system according to the twelfth embodiment of the invention.

FIG. 36 is a plan view diagrammatically illustrating an expected image finish generated from image data input in the image-forming system according to the twelfth embodiment of the invention.

Referring to FIG. 36, the expected image finish is shown as a finished image 402 in the display region 401 in the touch panel 15b. There assumed herein is that a user makes a contact onto the area portion 403 of a touch panel 15b using a pointer.

On making a contact by the user onto the touch panel 15b with the pointer while viewing an expected image finish screen currently displayed on the display panel 15c, the touch panel 15b is adapted to receive an input of location information as that on spatial position at a finished state of printed material 20 on the expected image finish screen currently displayed.

The location information acquisition unit 139 analyzes the location information received by the touch panel 15b, and acquires coordinate information on pointer's contact onto the image displayed.

The processing item setting unit 133 is configured to determine a processing item to be displayed on the operation display section 15 by accessing the setting item storage unit 135 and correlating the coordinate information acquired by the location information acquisition unit 139 to an item for image, or finish processing (hereinafter referred to as processing item).

Figure 37A:
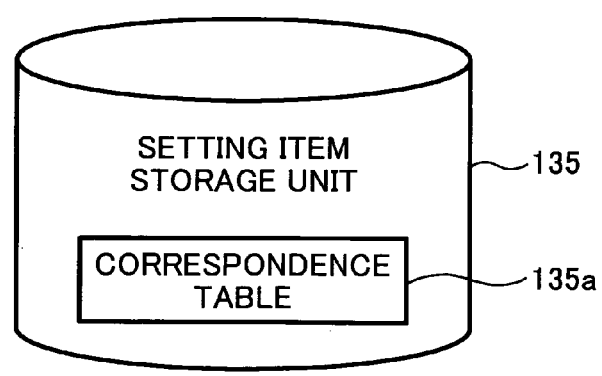
FIG. 37A is a functional block diagram illustrating a setting item storage unit included in the image processing section.

FIG. 37A is a functional block diagram illustrating a setting item storage unit included in the image processing section 113. The setting item storage unit 135 is provided with a coordinate-processing item correspondence table (or, correspondence table) 135a, which is configured to store the coordinate information and processing item as a correspondence table.

The processing item setting unit 133 is adapted to select a processing item by referring the coordinate of pointer's contact acquired by the location information acquisition unit 139 to the correspondence table 135a.

FIG. 37B includes a table illustrating the correspondence table 135a, in which the correspondence is shown between the coordinate values in the display image, which are acquired by the contact onto the touch panel, and setting items.

As previously assumed, the area portion 403 of user's contact has coordinate values ranging from 0 to 10% in the x- and y-axis directions. From the table 135a, these coordinate values are found to correspond to three items as the candidates, a stapling, punched hole, and stamp each at the upper left, in the column of processing item (1).

In reference to the table of FIG. 37B, the processing item setting unit 133 instructs the image finish information generation unit 132 to generate image information, and the display panel 15c to display a screen image of the candidates for setting items.

Figure 38:
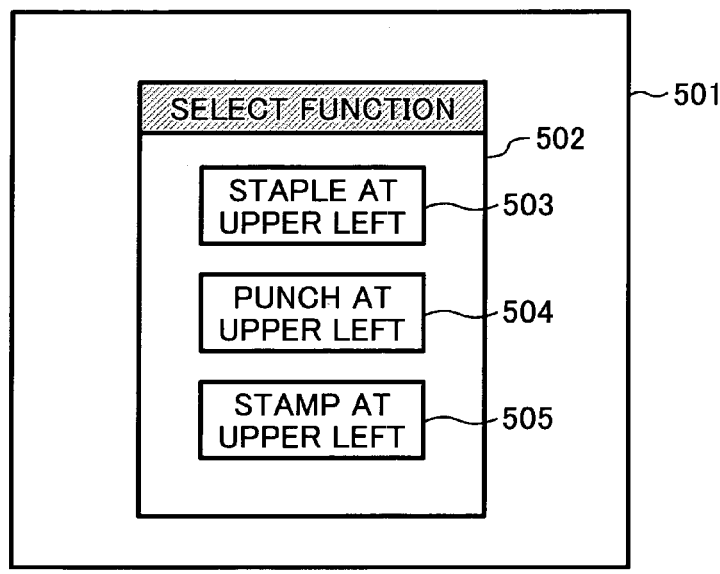
FIG. 38 is a plan view illustrating a display image of the candidates for the processing items acquired by the contact onto the touch panel 15b.

FIG. 38 is a plan view illustrating a display image of the candidates for the processing items acquired by the contact onto the touch panel 15b.

Referring to FIG. 38, the display image is shown in a frame 502 as the display region 501 on the display panel 15c, indicating three processing items, a stapling 503, punched hole 504, and stamp 505 each at the upper left. When the operator intends to select the staple, the selection is achieved by, for example, contacting onto the portion, stapling at the upper left 503, with a pointer such as a finger.

The image finish information generation unit 132 is then instructed to generate display image information indicative of the item, stapling at the upper left 503, selected by the contact, to be displayed on the display panel 15c.

Figure 39A:
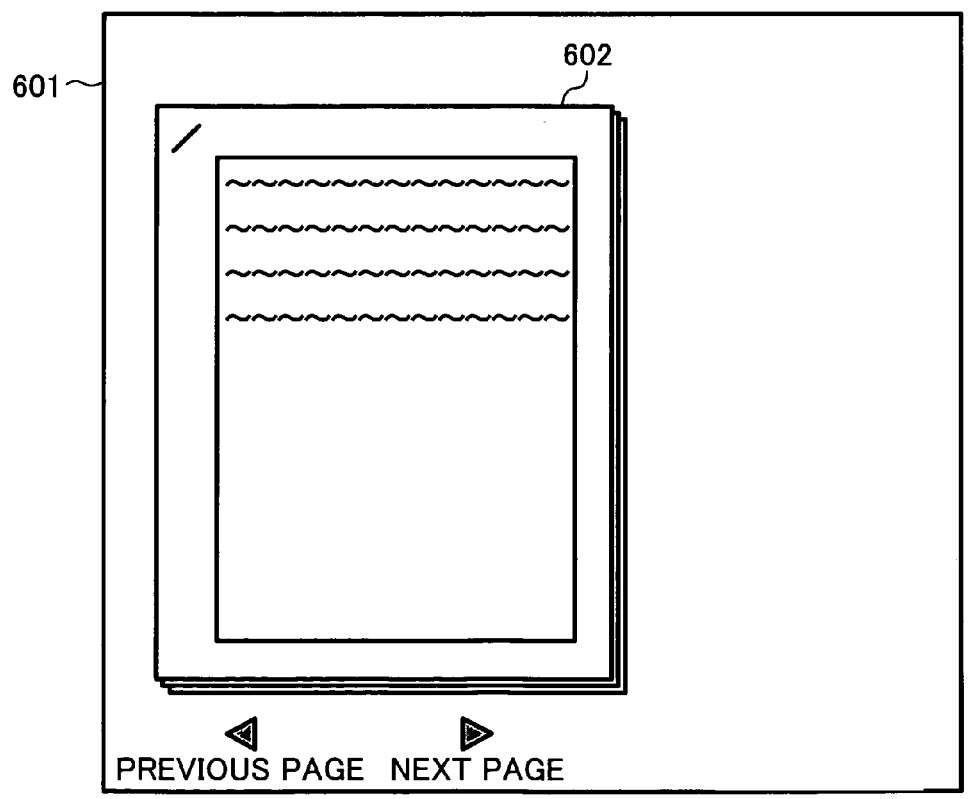
FIG. 39A is a plan view illustrating an expected image finish indicative a staple provided at the upper left of the printed material.

FIG. 39A is a plan view illustrating an expected image finish indicative a staple provided at the upper left of the printed material 20 (FIG. 35). While viewing the image, if the operator decides to perform printing as of the image displayed, the print process is initiated by pressing a print button (not shown).

Figure 39B:
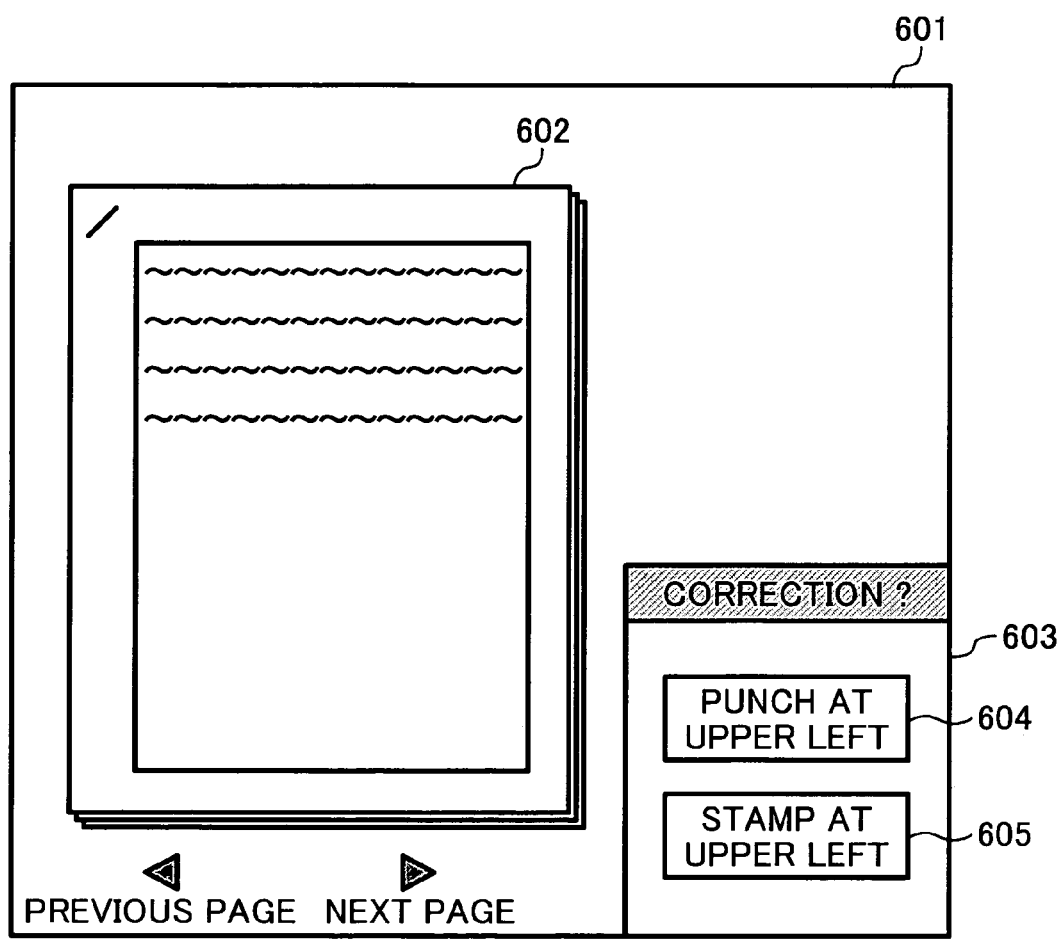
FIG. 39B is a plan view illustrating another expected image finish indicating an image of the state of a printed material which is provided at the upper left with stapling.

FIG. 39B is a plan view illustrating another expected image finish indicating an image of the state of a printed material 20 (FIG. 35) which is provided at the upper left with stapling. In addition to the expected image finish 602 displayed in the display region 601 of the touch panel 15a, a synoptic table 603 of setting items is also shown in use for altering the contents thereof.

There displayed in the synoptic table 603 are a marking "CORRECTION?" together with a punched hole 604 and stamp 605 each at the upper left.

If the operator intends to select the punch processing at the upper left in place of the staple, the selection is achieved by contacting onto the portion 604 indicative of the punch at the upper left on the touch panel 15b with the pointer.

After the alteration input, the processing is set for performing not the staple but a hole punch, which is subsequently displayed on the display panel 15c (not shown).

Figure 40A:
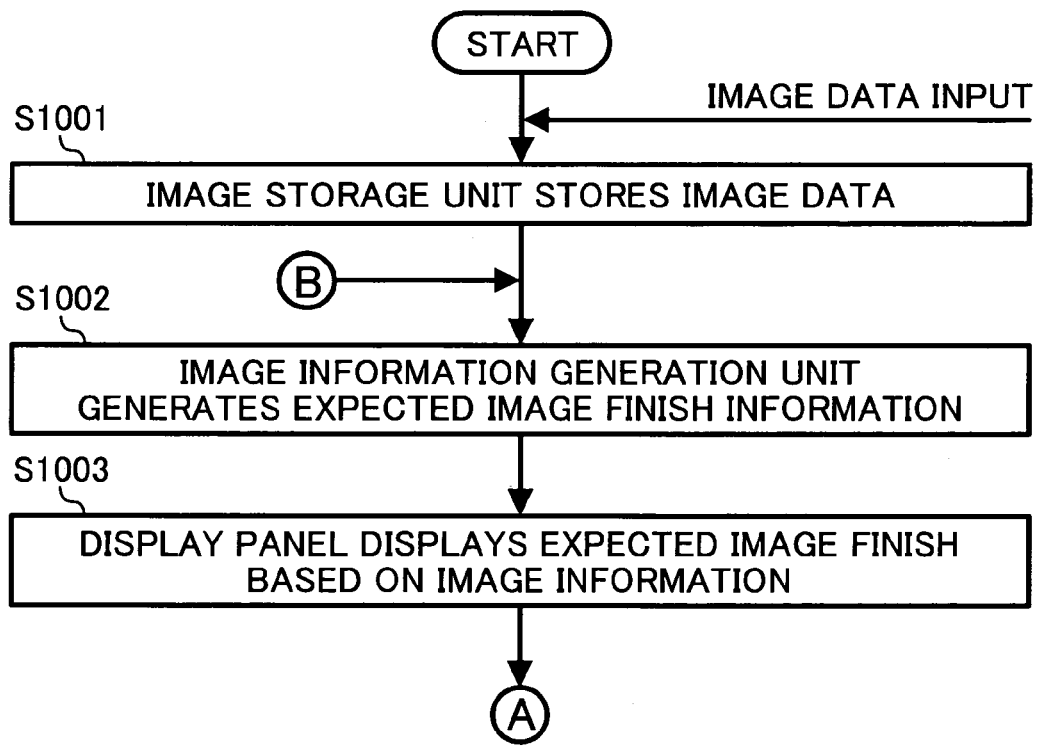
FIG. 40 is a flowchart illustrating a process flow for forming an image by the image-forming system according to the twelfth embodiment of the invention.
Figure 40B:
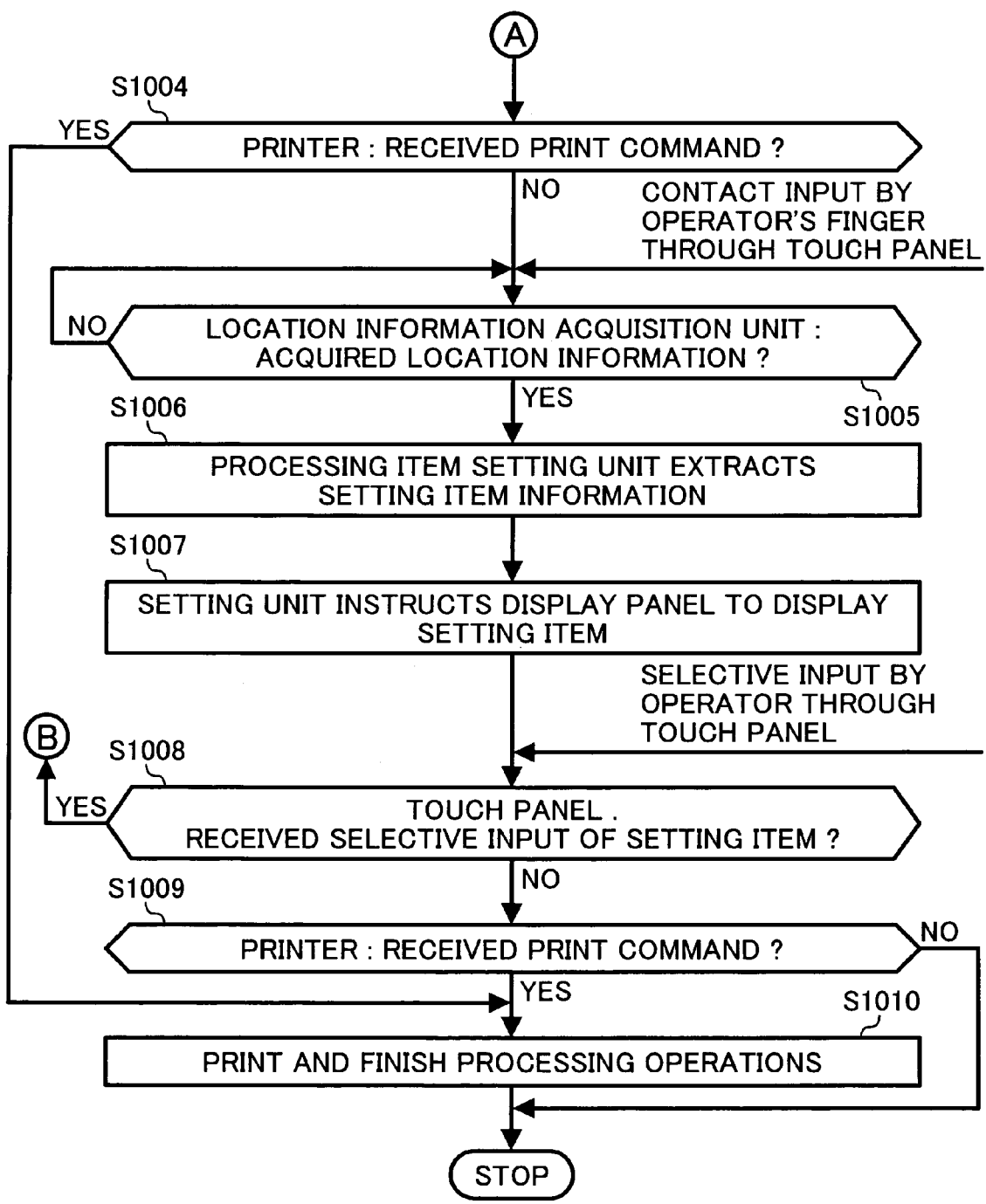

FIG. 40 is a flowchart illustrating a process flow for forming an image by the image-forming system according to the twelfth embodiment of the invention.

Referring to FIG. 40, the process begins at storing image data input in the image storage section 12 (step S1001). The image information generation unit 132 generates expected image finish information to be displayed on the display panel 15c (step S1002) and the panel 15c displays an expected image finish based on expected image finish information (step S1003).

If the operator determines at this time to perform a print operation and invokes a print command by pressing a print execution button ("YES" in step S1004), the copy operation is performed (step S1010).

By contrast, if the printer does not receive a print command ("NO" in step S1004), the operator makes a contact onto the touch panel 15b so as to perform a contact input and the location information acquisition unit 139 acquires coordinate information ("YES" in step S1005).

The processing item setting unit 133 is adapted to refer to the correspondence table included in the image storage section 12, extract setting item information (step S1006), and instruct the display panel 15c to display the setting item (step S1007).

In the case when the operator has made setting item inputs while viewing the expected image finish through the touch panel ("YES" in step S1008), the image information generation unit 132 generates expected image finish information reflecting the processing performed according to selected setting items (step S1002). The steps down to S108 are repeated subsequently.

In the case when the operator has made no further setting inputs ("NO" in step S1008), and if a print command is received by the printer ("YES" in step S1009), the printer 14 performs printing and the finish processing unit 141 provides finish processing (step S1010). If no print command is received ("NO" in step S1009), the process ends.

During the abovementioned steps the processing item setting unit 133 may generate processing item information based on selected processing items and instruct the display 15 to display the processing item information. Alternatively, the processing item setting unit 133 may send the processing item information to the image finish information generation unit 132 so as to be formed as image information and displayed on the display panel 15c.

As described herein above, the image-forming system according to the twelfth embodiment of the invention is configured to display, based on the image data which are obtained by reading a document or by way of a network, an expected image finish screen prior to print processing and an input setting screen to be used for receiving setting inputs.

Then, processing items can be selected through the pointer contact by the operator, and another expected image finish screen and input setting screen are displayed reflecting the selected processing items, to thereby be able improve print setting capabilities among others. As a result, the image-forming system can be made to be highly convenient for the operator and reliable as a system.

A Modification to Embodiment 12

According to a modification to the twelfth embodiment of the invention, the processing item setting unit 133 included in the image-forming system is configured, if the processing item setting unit 133 has set a first processing item, to be provided with second processing item(s) of a lower hierarchized level on the premise of the first processing item, and to instruct to display the second processing item(s) together with an expected image finish generated based on the first processing item set as above.

By displaying the processing items in hierarchized fashion, it becomes feasible to display an abbreviated list of processing items sequentially followed by further lists of proceeding items of the lower level. As a result, ordered and detailed setting of processing items can be achieved by sequentially displaying the items in the hierarchized fashion notwithstanding simple structure of the display screens.

Figure 41:
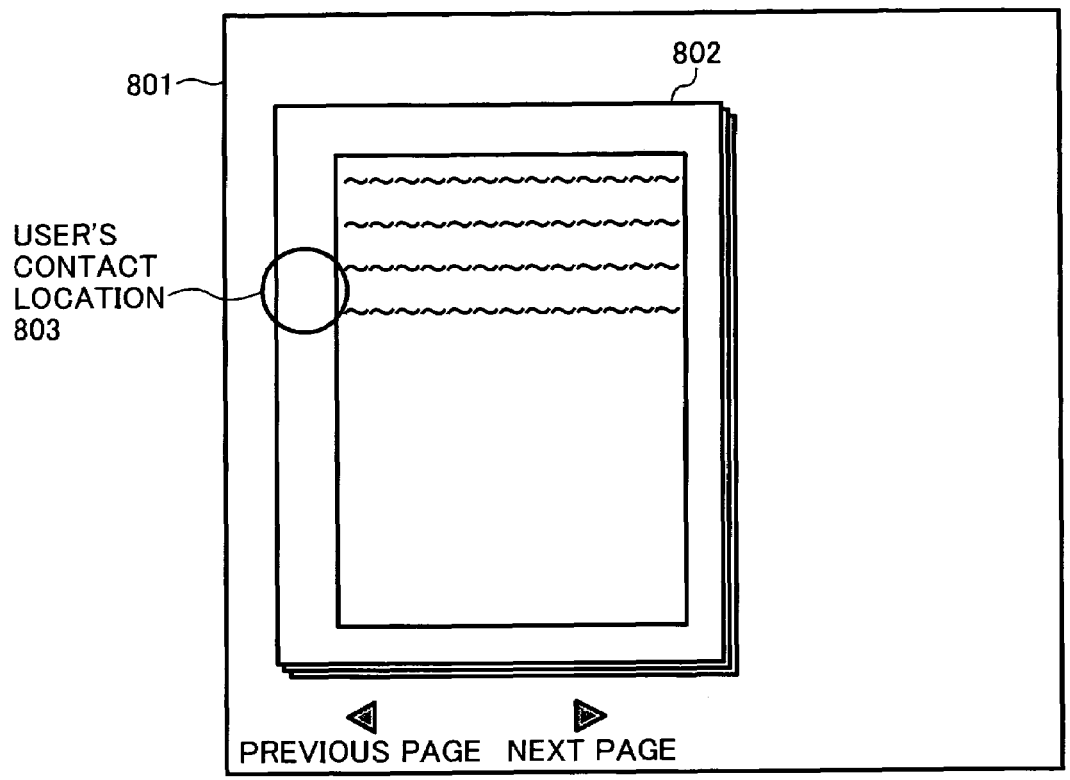
FIG. 41 is a plan view illustrating an expected image finish displayed by the image-forming system according to the modification to the twelfth embodiment of the invention.

FIG. 41 is a plan view illustrating a first expected image finish displayed by the image-forming system according to the modification to the twelfth embodiment of the invention.

Referring to FIG. 41, the expected image finish 802 is shown in the display region 801 on the display panel 15c. On making contact onto the portion 803 by an operator, the processing item setting unit 133 is adapted to refer to the correspondence table and instruct to display on the display screen the candidates of processing items to subsequently be set.

Figure 42:
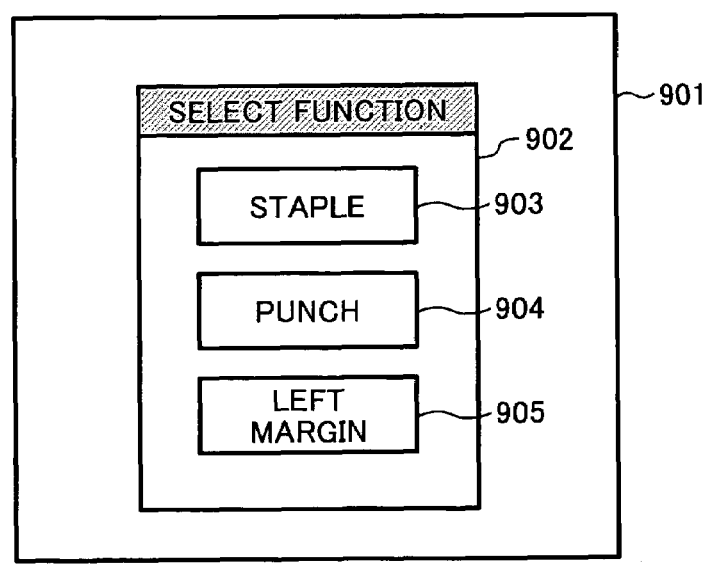
FIG. 42 is a plan view illustrating a display image of the candidates for processing items according to the modification to the twelfth embodiment of the invention.

FIG. 42 is a plan view illustrating a display image of the candidates for processing items according to the modification to the twelfth embodiment of the invention.

Referring to FIG. 42, the display image is shown in a frame 902 as the display region 901 on the display panel 15c, indicating the three processing items, a stapling 903, punched hole 904, and left margin 905, as the candidates acquired from the coordinate information.

If the operator makes contact onto the portion indicative of punched hole 904, the processing item setting unit 133 retrieves, from the corresponding table (not shown), further two candidates, two and three of the punched holes on the left, to be subsequently displayed on the display panel 15c.

Figure 43:
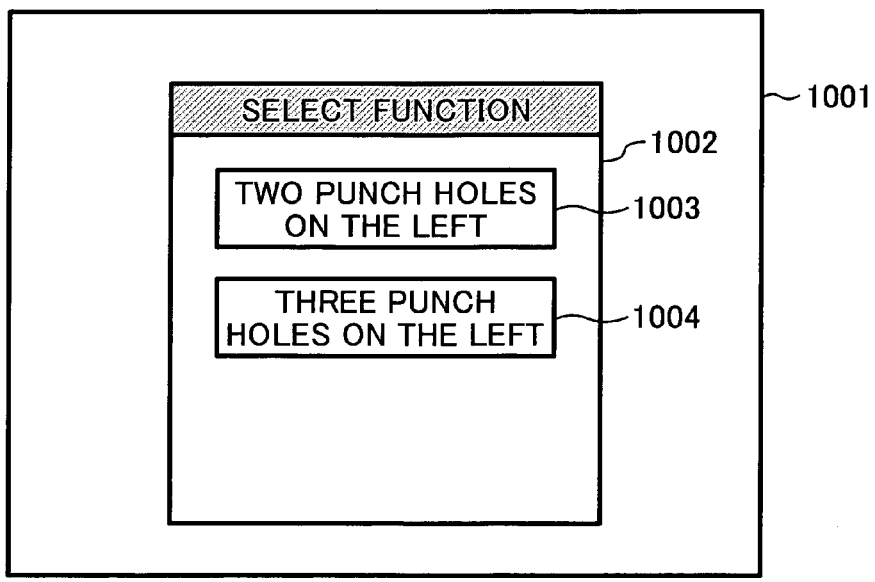
FIG. 43 is a plan view illustrating a display image of the candidates for selecting a processing item related to the punched holes.

FIG. 43 is a plan view illustrating a display image of the candidates for selecting a processing item related to the punched holes.

Referring to FIG. 43, a further display image is shown in the frame 1002 for displaying processing items in the display region 1001 on the display panel 15c, indicating two processing items, two punched holes on the left 1003 and three punched holes on the left 1004, as the processing items of the lower hierarchical level.

In the case when the operator makes contact onto the portion indicative of two punched holes on the left 1003, a further expected image finish is displayed, which is provided with two punched holes on the left.

Figure 44:
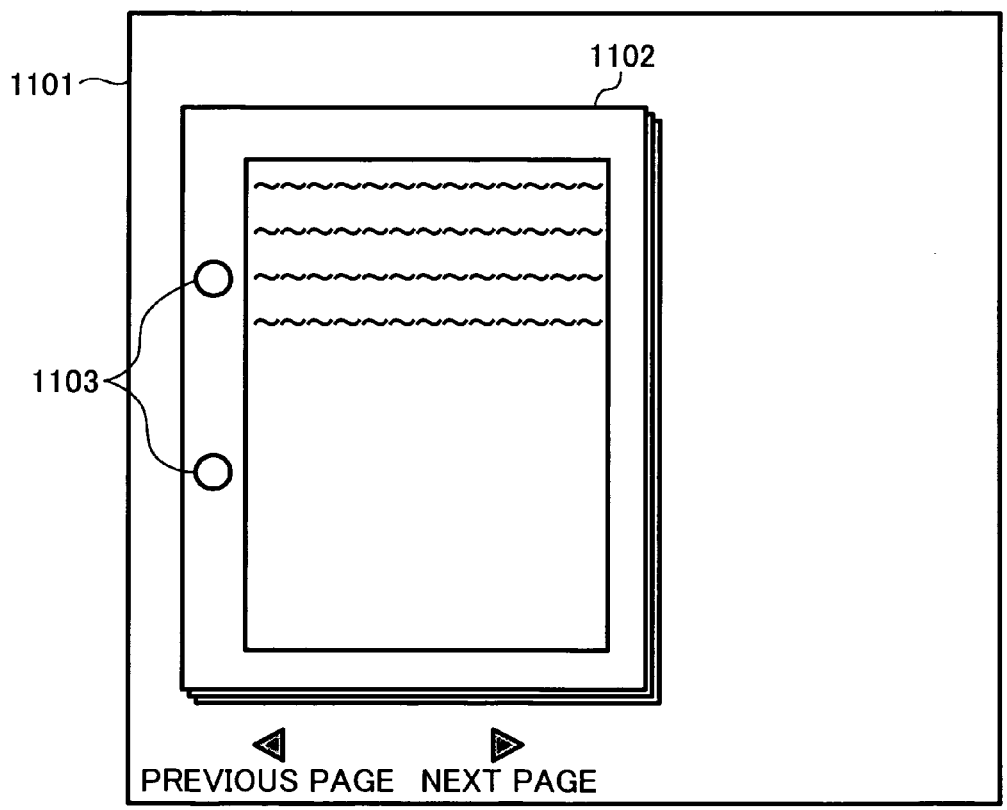
FIG. 44 is a plan view illustrating another expected image finish displayed by the image-forming system.

FIG. 44 is a plan view illustrating another expected image finish displayed by the image-forming system, in which the image finish 1102 is shown in the display region 1101 in response to the aforementioned selection of two punched holes on the left 1003 (FIG. 43).

Another method of setting inputs should be mentioned herein, in that an operator performs a contact operation in a manner such as, for example, first touching the center portion of the image of document original on the display then moving over the display image so as to form an outward locus. This results an input for setting the enlargement and an enlargement rate of the document image (not shown).

Alternatively, an operator may perform a contact operation in a manner such as first touching the edge portion of the document image on the display then moving over the display image toward the center so as to form an inward locus, to thereby result an input for setting the reduction and a reduction rate (not shown).

It may be added that the setting of enlargement/reduction processing exemplify the method of processing item setting using the aforementioned hierarchical construction of the item in the present invention.

Figure 45:
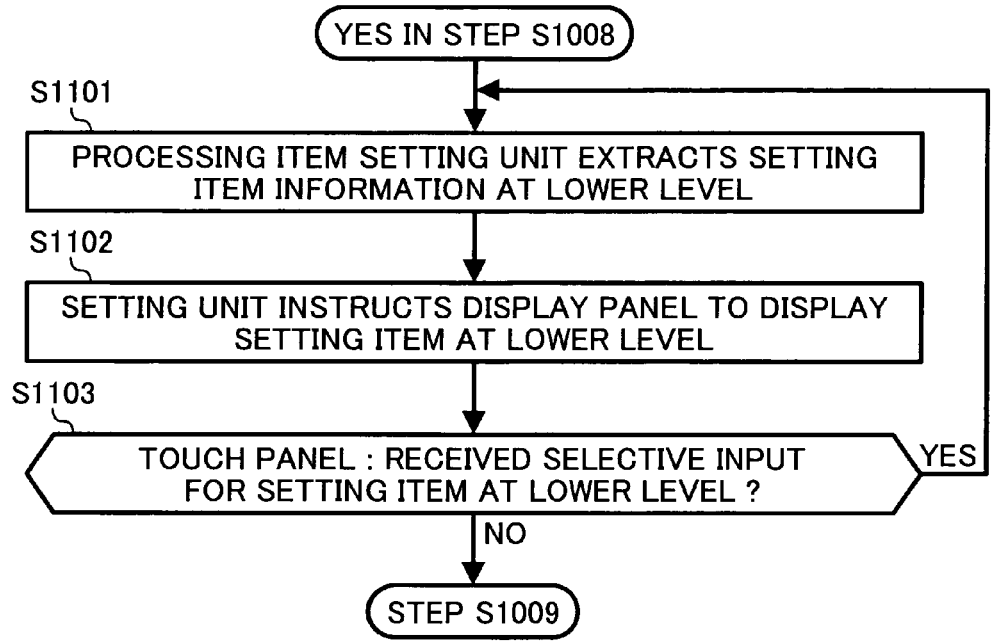
FIG. 45 is a flowchart illustrating a process flow for forming an image by the image-forming system according to the modification to the twelfth embodiment of the invention.

FIG. 45 is a flowchart illustrating a process flow for forming an image by the image-forming system according to the modification to the twelfth embodiment of the invention.

Since the steps up to S1007 and from S1009 on down are similar to those of the twelfth embodiment, the description thereon is herein abbreviated and the steps unique to the present embodiment are primarily described.

Onto the expected image finish which is generated from the previous image data input and currently displayed, the operator makes contact through the touch panel, the location information acquisition unit 139 acquires coordinate information, and the processing item setting unit 133 instructs the display panel 15c to display processing items (step S1007).

If a setting input is performed over the touch panel 15b by the operator through contacting to the processing item currently displayed, the touch panel 15b receives the selected item ("YES" in step S1007), the processing item setting unit 133 is adapted to extract processing item information which is one-level deeper than that on the selected item (step S1101).

The image finish information generation unit 132 generates another expected image finish information based on the processing items, previously set and currently extracted, which are displayed on the display panel 15c (step S1102).

The touch panel 15b is ready for detecting a contact operation by the pointer (step S1103). If the contact is detected, the processing item at the deeper level is set ("YES" in step S1103), and process returns to step S1101.

If no setting input is received through the touch panel 15b ("NO" in step S1103), the process proceeds to print processing (step S1009).

By preparing and displaying the processing items in the hierarchical structure, thus reducing the number of items, which are displayed on the display panel at one time, the image on the display panel can be made easier for the operator to watch.

In addition, by displaying relevant processing items sequentially at a deeper hierarchical level, more detailed setting of processing items becomes feasible for the operator.

If multiple options result from the selection of one processing item, as exemplified above in the case of enlargement/reduction processing, therefore, complexity of processing item setting can be reduced, while convenience increases, by providing the processing items in the hierarchical structure.

Embodiment 13

Figure 46:
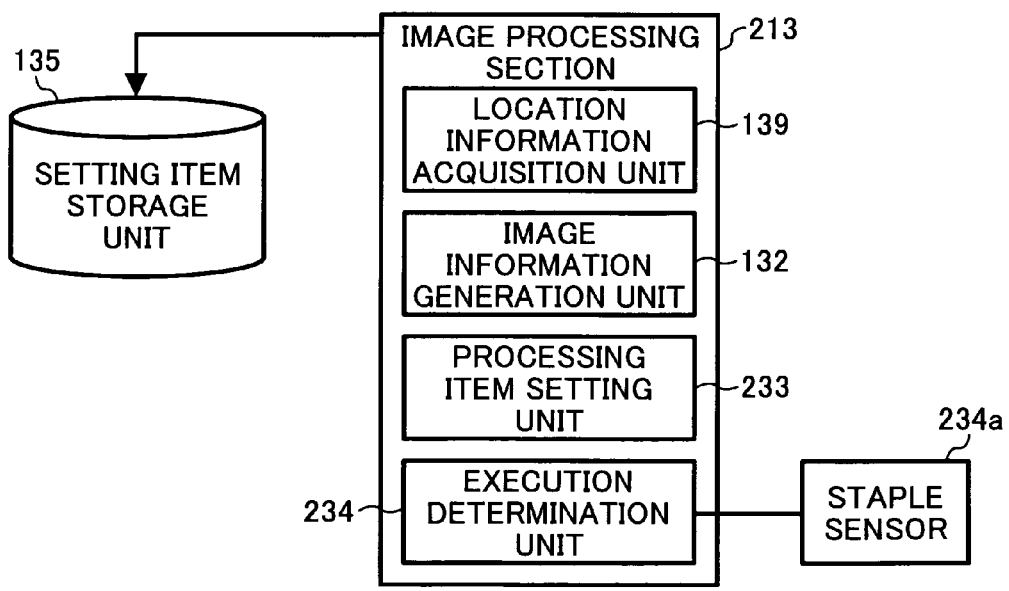
FIG. 46 is a functional block diagram primarily illustrating an image processing section 23 as a major portion of the image-forming system according to a thirteenth embodiment of the invention.

FIG. 46 is a functional block diagram primarily illustrating an image processing section 213 as a major portion of the image-forming system according to a thirteenth embodiment of the invention.

The image processing section 213 of FIG. 46 has a similar configuration as the section 113 of FIG. 35, with the exception that an execution determination unit 234 is additionally included.

The execution determination unit 234 is configured to determine whether a processing item set by the processing item setting unit is executable, and to display the contents of the determination, if the processing item is determined non-executable.

As described above, the execution determination unit 234 is configured to determine whether a processing item set by the processing item setting unit 233 is executable in practice. If the processing item is determined non-executable, the execution determination unit 234 instructs the information on this decision be stored in a corresponding column in the corresponding table.

The processing item setting unit 233 reads out this information stored in the corresponding table, and instructs the display panel 15c to display the content indicative of being non-executable.

While the following illustration is made on a staple processing as one of processing items determined by the execution determination unit 234, this is not intended to be limiting.

The execution determination unit 234 is further provided with a staple sensor 234a which is configured to determine whether a staple is charged.

The staple sensor 234a is adapted to determine whether a stapler is charged, and output the information on the determination by the sensor 234a to the setting item storage unit 135 to be stored in the corresponding table included therein.

If the stapler is found empty (i.e., not charged), the information indicative of "NO STAPLE" is stored in the table. This "NO STAPLE" information may also be used where necessary for indicating the reason for being non-executable, as will be described later on.

Figure 47:
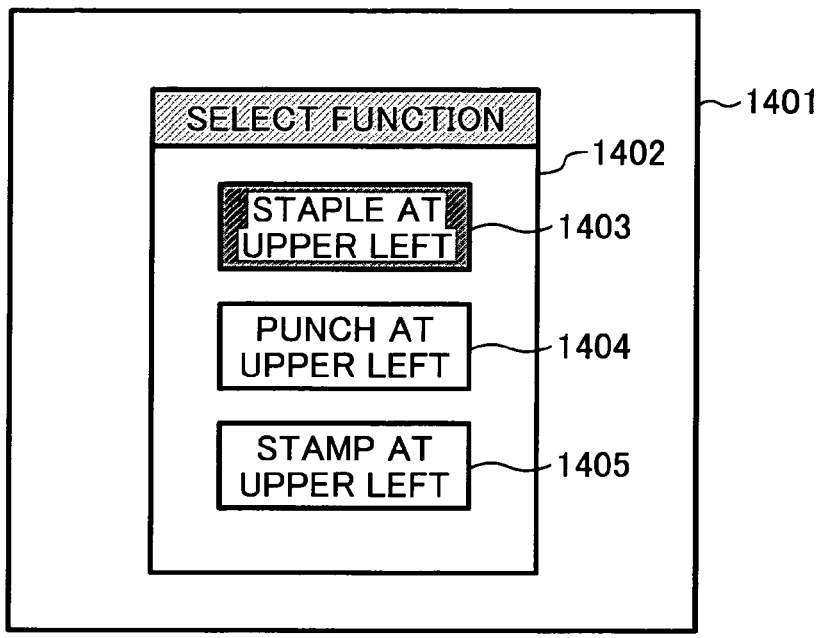
FIG. 47 is a plan view illustrating a display image of processing items including a shaded portion indicative of the staple processing.

FIG. 47 is a plan view illustrating a display image of processing items including a shaded portion indicative of the staple processing.

Figure 48:
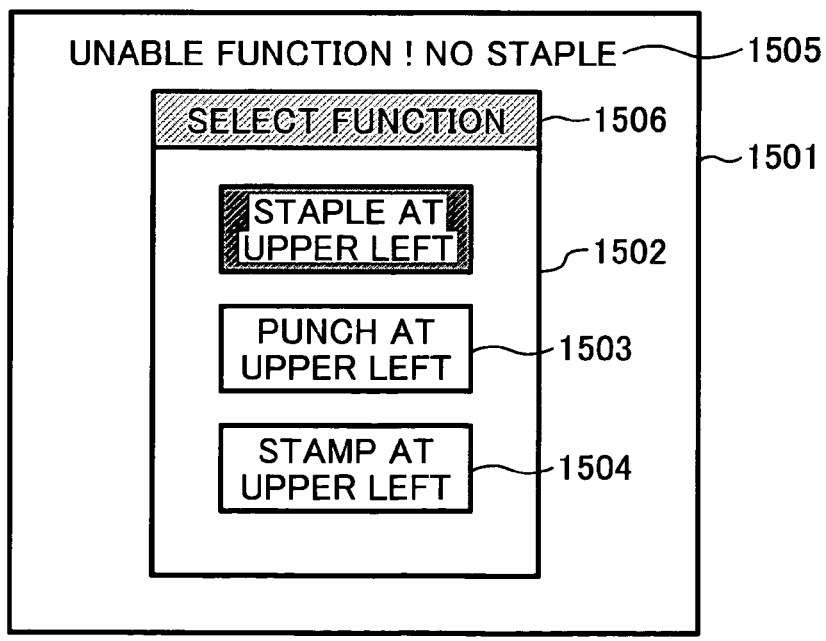
FIG. 48 is a plan view illustrating another display image showing the reason for the staple processing being non-executable.

FIG. 48 is a plan view illustrating another display image showing the reason for the staple processing being non-executable.

Figure 49:
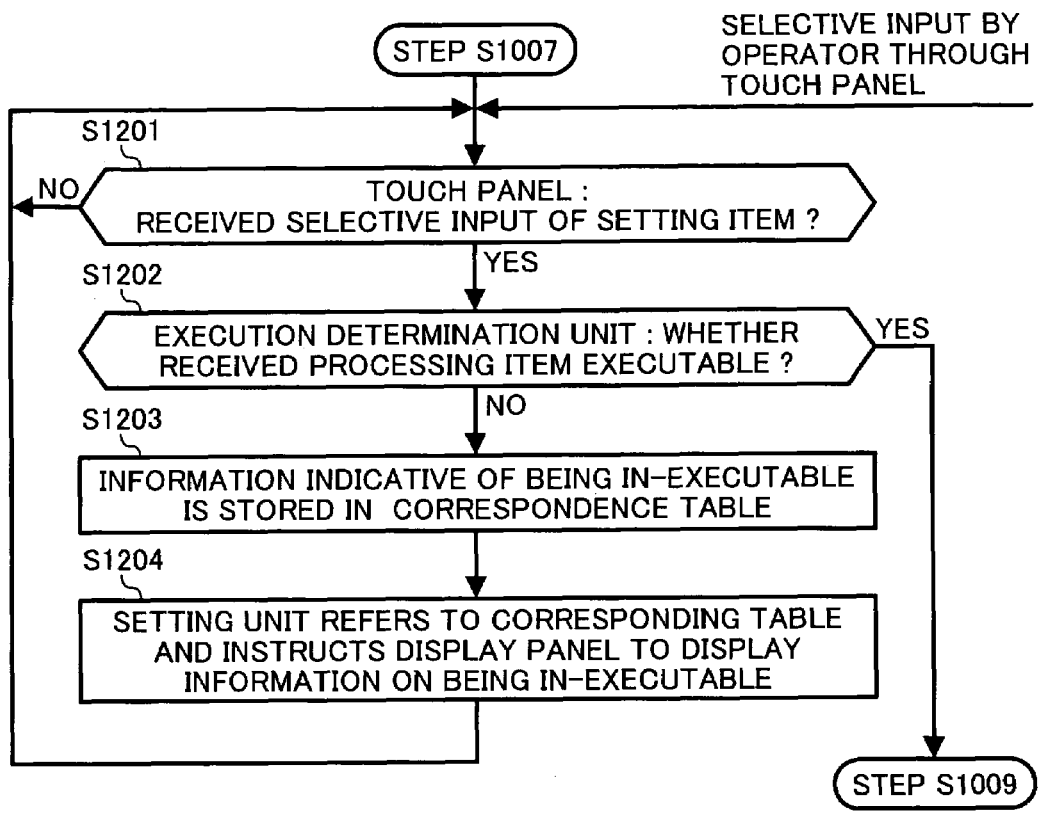
FIG. 49 is a flowchart illustrating a process flow for forming an image by the image-forming system according to the thirteenth embodiment of the invention.

FIG. 49 is a flowchart illustrating a process flow for forming an image by the image-forming system according to the thirteenth embodiment of the invention.

Referring to FIG. 49, since the steps up to S1007 and from S1009 on down are similar to those of the twelfth embodiment, the description thereon is herein abbreviated and the steps unique to the present embodiment are primarily described.

Onto the expected image finish which is generated from the previous image data input and currently displayed, the operator makes contact through the touch panel, the location information acquisition unit 139 acquires coordinate information, and the processing item setting unit 233 instructs the display panel 15c to display processing items (step S1007).

If the touch panel 15b receives a setting input for a selected processing item ("YES" in step S1201), and the execution determination unit 234 determines whether staple processing with respect to the coordinate information currently acquired is executable (step S1202).

If the staple processing is determined executable ("YES" in step S1202), the process proceeds to print processing S1009. By contrast, if the staple processing is determined non-executable ("NO" in step S1202), the execution determination unit 234 instructs the information indicative of being non-executable be stored in the corresponding table (step S1203).

The processing item setting unit 233 refers to the correspondence table and reads out the information indicative of being non-executable related to the coordinate information currently acquired, and instructs the display panel 15c to display the information on being non-executable (step S1204). Thereafter, the process returns again to step S1201.

The image finish information generation unit 132 now generates (1) an expected image finish, and (2) processing item screen information including the shaded portion indicative of staple at the upper left 1403 of FIG. 47, which is prepared to indicate that the staple processing is non-executable. The unit 132 then instructs the display panel 15c to display the processing item screen.

In the case when the reason for the staple processing being non-executable is further sought for, the operator makes contact onto the above noted shaded portion of the processing item (indicative of staple at the upper left 1403 of FIG. 47).

The touch panel 15b is ready for detecting the contact for inputting processing items. On detecting the contact onto the panel 15b, the processing item setting unit 233 reads out the information on the reason for being non-executable stored in the corresponding table and instructs the display panel 15c to display the information (not shown in the flow chart).

By determining whether the processing item currently set by the processing item setting unit is executable, and displaying the contents of the determination as a shaded image portion on display panel if the processing item is determined non-executable, it becomes feasible for the operator to more easily find the non-executable items and the reason therefor, convenience is further improved while reducing complexity of processing item setting in the image-forming system in the present invention.

A Modification to Embodiment 13

The performance by process steps according to a modification to the thirteenth embodiment is similar to the thirteenth embodiment, with the exception that the non-executable processing item(s) is not displayed on the panel from the beginning in contrast to the shaded portion displayed in the thirteenth embodiment. Therefore, only executable processing items are displayed for the operator in the present embodiment.

Figure 50:
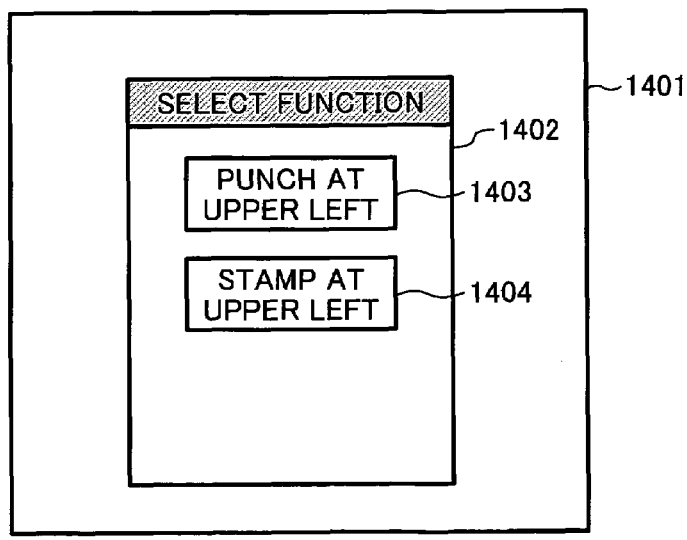
FIG. 50 is a plan view illustrating a display image of the candidates for processing items according to the modification to the thirteenth embodiment of the invention, in which only executable processing items are included in the display image, exclusive of non-executable processing item.

FIG. 50 is a plan view illustrating a display image of the candidates for processing items according to the modification to the thirteenth embodiment of the invention, in which only executable processing items are included in the display image, exclusive of non-executable processing item(s).

That is, the execution determination unit 234 determines there is no staple charged, and write the information indicative of "NO STAPLE" into the table.

The processing item setting unit 233 reads out the information previously written, instructs the image finish information generation unit 132 to generate expected image finish information exclusive of the staple processing item, and the display panel to show an expected image finish exclusive of the staple processing item.

Another modification to the thirteenth embodiment may be mentioned, in that the execution determination unit 234 is further provided with a sheet sensor (not shown) which is configured to determine whether paper sheet(s) is charged.

In this case, the operator makes contact onto or near the center of the display to invoke the enlargement/reduction menu, and the execution determination unit 234 determines whether paper sheet(s) is charged. If no sheet is detected necessary for performing the required enlargement/reduction processing, a screen image is shown displaying an enlargement/reduction processing corresponding to a sheet currently available.

When the operator makes further contact onto the display portion for the non-executable item, a message can be displayed indicating the reason for being non-executable, in that no sheet of the required size for the processing is charged.

In addition, the items may alternatively be limited only to those including sheet size, excluding others not relating the sheet size.

Still in addition, another mode of display may be provided so that, if black-and-white copy processing is selected, no item related to color copy is displayed on the display panel.

Therefore, a display panel for processing items can be made easier for the operator to watch, workability is improved during the steps for setting the processing items.

Embodiment 14

Figure 51:
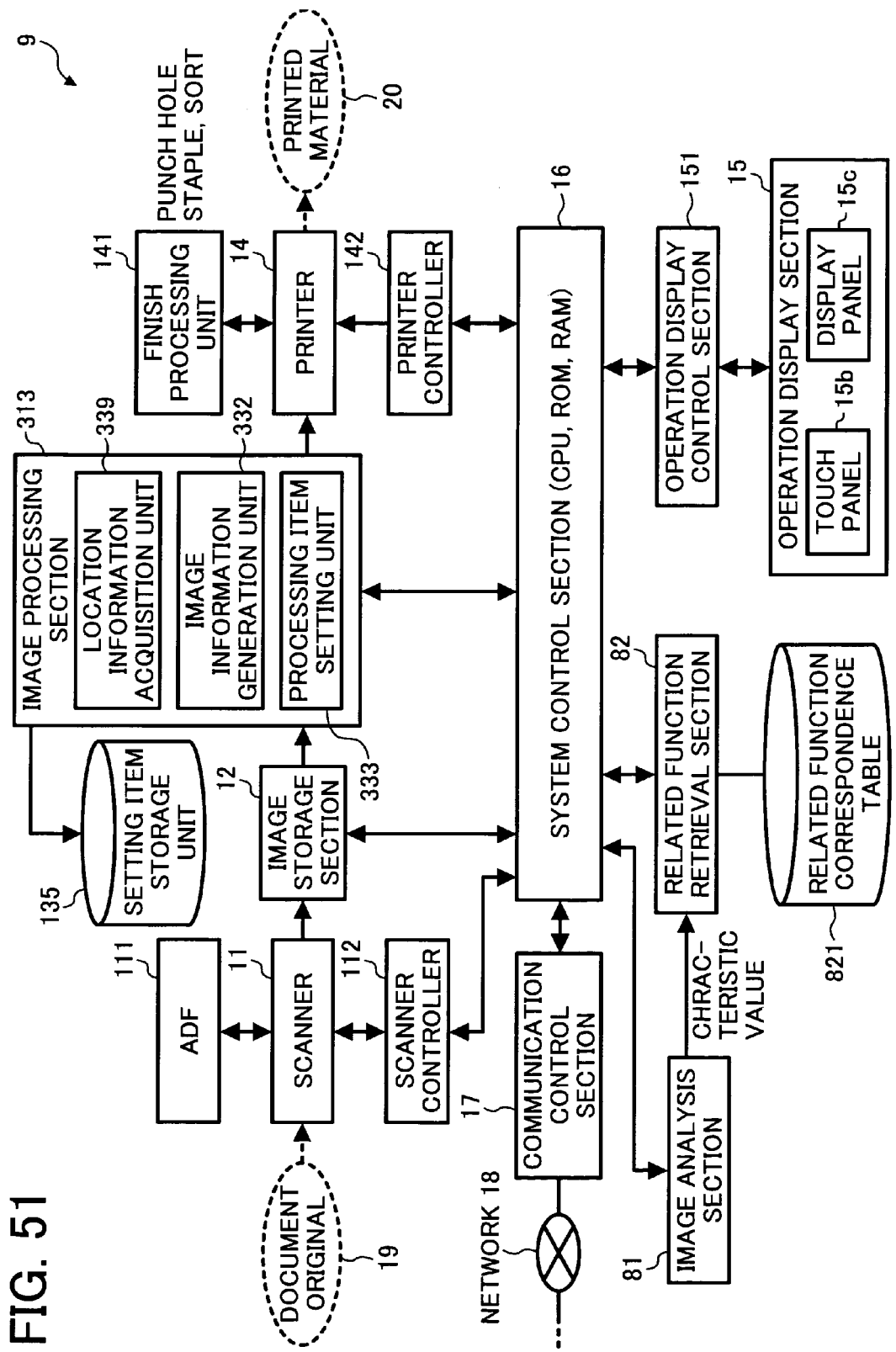
FIG. 51 is a functional block diagram illustrating an image-forming system according to a fourteenth embodiment of the invention.

FIG. 51 is a functional block diagram illustrating an image-forming system 9 according to a fourteenth embodiment the invention.

The block diagram of FIG. 51 has a similar configuration as that of FIG. 35, with the exception that the image-forming system 9 further includes an image analysis section 81, a related function retrieval section 82, and a related function correspondence table 821, configured to extract a document characteristic value from image data readout.

The image processing section 332 is adapted to generate expected image finish information utilizing the document characteristic value, and instruct the display panel 15c to display an expected image finish reflecting the document characteristic value and a screen displaying processing items selected based on the document characteristic value.

Specifically, an expected image finish and a display screen of processing items can be displayed reflecting the document characteristic value in the present embodiment.

The image analysis section 81 is configured to analyze document image data stored in the image storage section 12 and extract the document characteristic value indicative of document characteristics. The term "document characteristic value" corresponds to the size, orientation, and margin size of the document original 19, as examples.

On receiving a variety of information on the document characteristic value computed by the image analysis section 81, the related function retrieval section 82 is configured to search several related functions necessary to be set for duplicating the document original 19.

The related function retrieval section 82 is provided with a related function correspondence table 821 as a file which contains a table of various functions related to the document characteristic value.

The related function retrieval section 82 is configured to retrieve, from the related function correspondence table 821, several related functions corresponding to document characteristic value currently input, and to send narrowed-down related function information to the image processing section 333.

The related function information received by the processing item setting unit 333 is used for generating expected image finish information by the image information generation unit 332.

In addition, the processing item setting unit 333 is adapted to narrow down and select related processing items using the related function information, and instruct the image finish information generation unit 332 to generate processing item information displayed on the input screen.

Thus, the expected image finish and display screen of processing items are displayed reflecting the document characteristic value on the display panel 15c.

In addition, setting inputs may be received through an input screen displayed on the display panel 15c based on the input image information in a similar manner to the twelfth embodiment.

The image analysis section 81, the related function retrieval section 82, and related function correspondence table 821, therefore, constitute an image analyzing mechanism in the invention.

By way of example, if the image analysis section 82 analyzes a document original and find it to be double-sided, several options are displayed related to the direction of reading the document original 19. While the document original 19 is found to be single-sided, no display appears for the reading direction.

Figure 52:
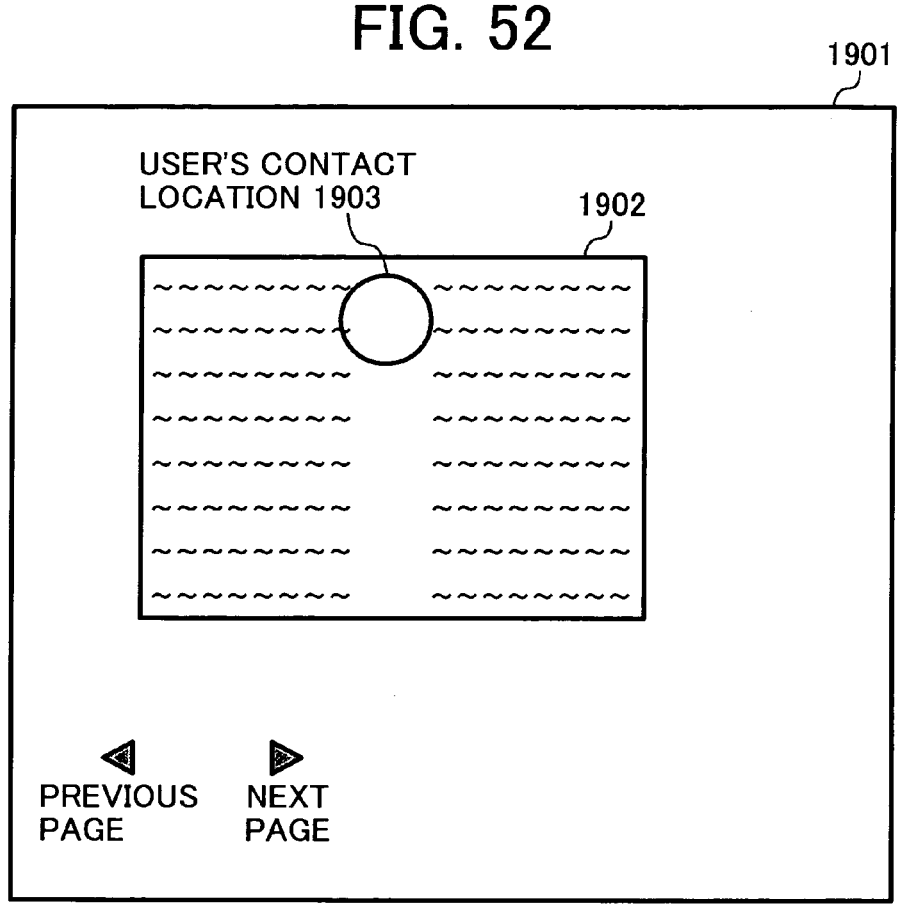
FIG. 52 is a plan view illustrating an expected image finish displayed based on the result obtained by the image analysis section, in which the document original is found as printed in the collective manner.

FIG. 52 is a plan view illustrating an expected image finish displayed based on the result obtained by the image analysis section 81, in which the document original 19 is found as printed in the collective manner.

When the operator makes contact onto the central portion 1903 of the display image indicative of collective image 1902, corresponding user items are displayed subsequently.

Figure 53:
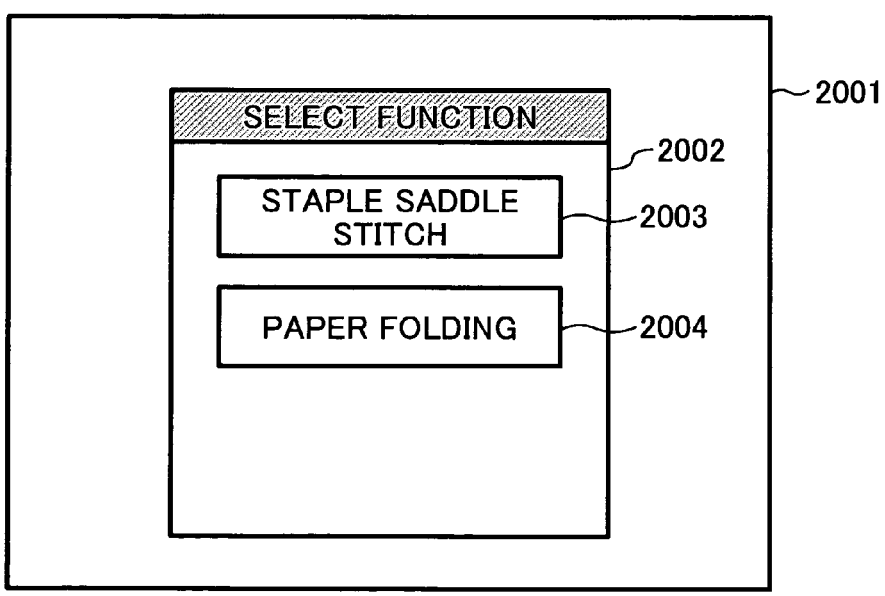
FIG. 53 is a plan view illustrating a display image of processing items for the collective document.

FIG. 53 is a plan view illustrating a display image of processing items for the collective document in which two items are shown as the option, one "STAPLE SADDLE STITCH" 2003 and the other "PAPER FOLDING" 2004.

Figure 54:
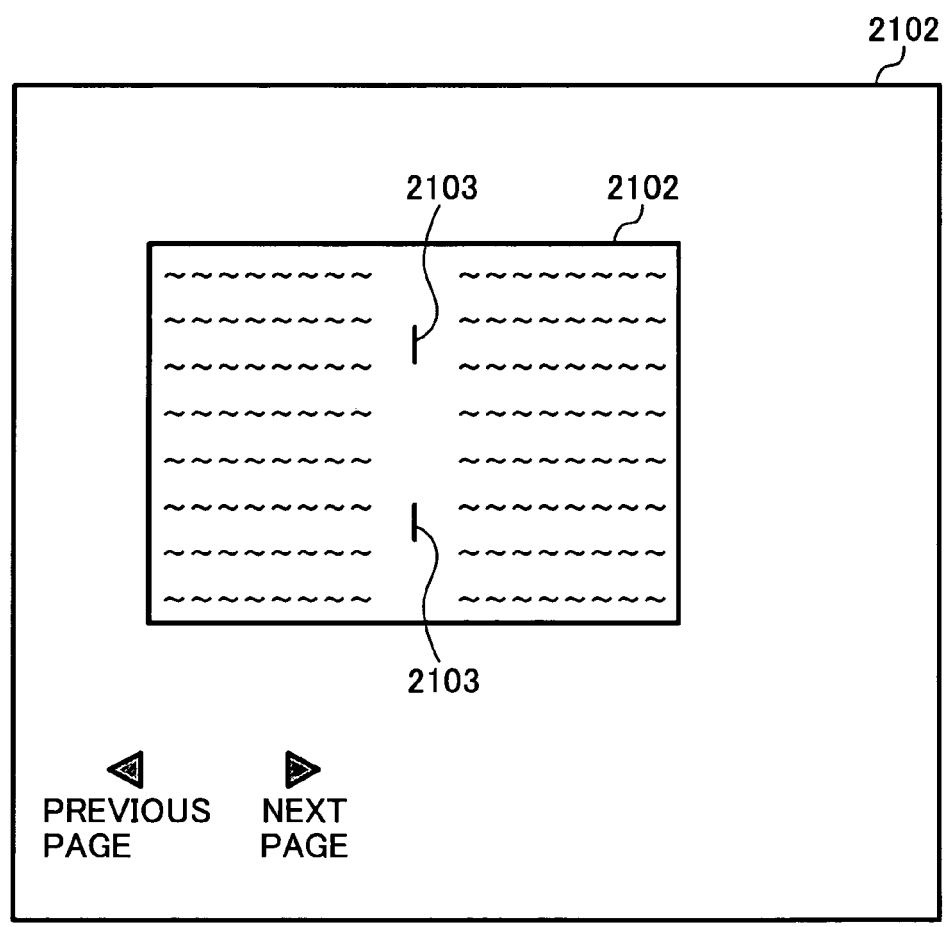
FIG. 54 is a plan view illustrating another display image of processing items, indicative of saddle stitch processing.

In the case when the operator has made selection by contacting to staple saddle stitch 2003, an expected image finish is displayed, being provided with the saddle stitch processing, as illustrated in FIG. 54.

Thus, by selecting "STAPLE SADDLE STITCH" 2003 among the processing items displayed in FIG. 53, the expected image finish is shown as the image saddle-stitched with the staple, as shown in FIG. 54.

By means of the capability of the image analysis section 81, processing items can be properly selected and displayed. As a result, simple and exact selections and displays become feasible regarding processing items to meet operator's needs with more ease.

Figure 55A:
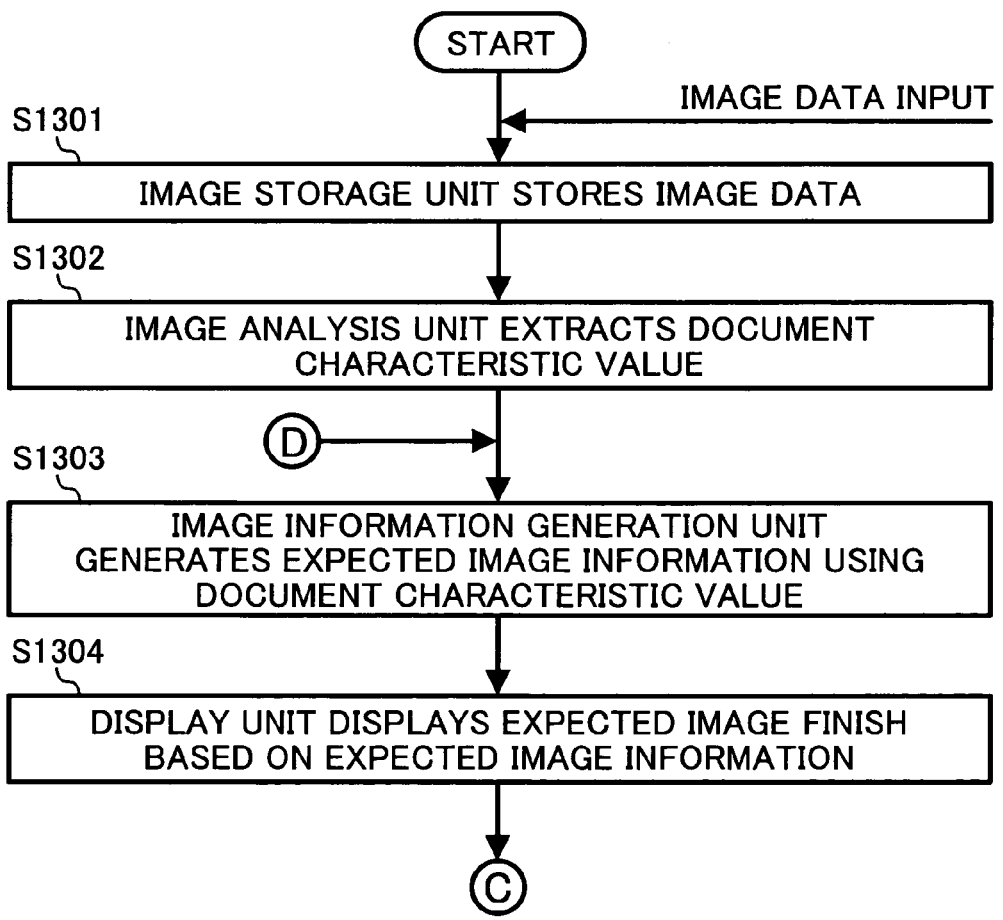
FIG. 55 is a flowchart illustrating a process flow for forming an image by the image-forming system according to the fourteenth embodiment of the invention.
Figure 55B:
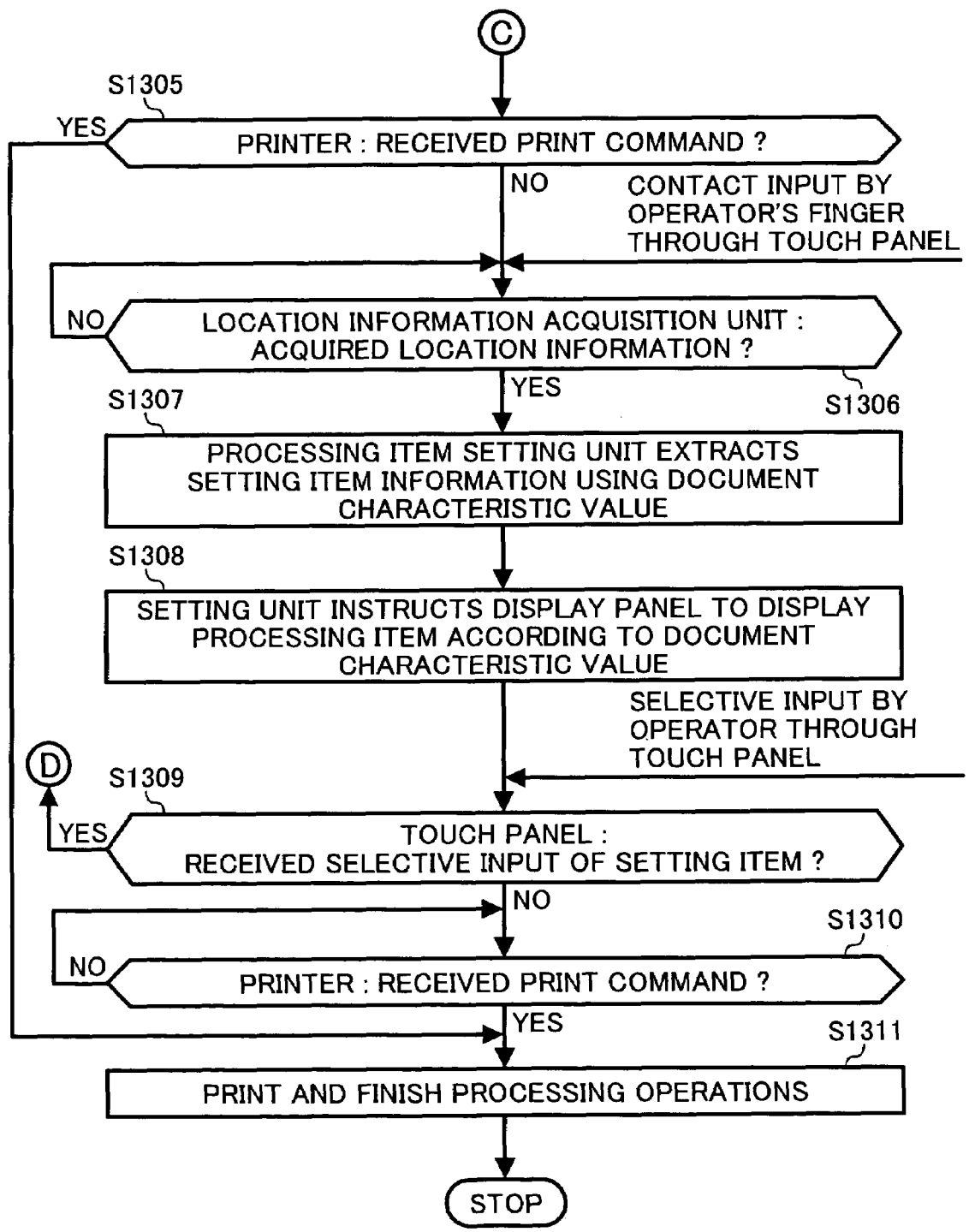

FIG. 55 is a flowchart illustrating a process flow for forming an image by the image-forming system according to the fourteenth embodiment of the invention.

Referring to FIG. 55, the image storage section 12 stores image data input (step S1301), the image analysis section 81 extracts a document characteristic value indicative of document characteristics (step S1302), the image finish information generation unit 332 generates processing item information based on the document characteristic value extracted by the image analysis section 81 to be displayed on the display panel 15*c* (step S1303), and the display panel 15*c* displays the expected image finish formed according to the expected image finish information generated using the document characteristic value (step S1304).

If the operator decides then to perform a print operation and invokes a print command by pressing a print execution button ("YES" in step S1305), the copy operation is performed (step S1311).

By contrast, if the printer does not receive a print command ("NO" in step S1305), the operator makes a contact onto the touch panel 15*b* to perform a contact input of location information. The location information acquisition unit 339 acquires coordinate information ("YES" in step S1306).

The processing item setting unit 333 is adapted to refer the document characteristic value to the correspondence table based on the acquired coordinate information, extract setting item information based on the coordinate information and document characteristic value (step S1307), and instruct the display panel 15*c* to display the processing item reflecting the document characteristic value (step S1308).

In the case when the operator has made selections and setting inputs while viewing the expected image finish through the touch panel 15*b* ("YES" in step S1309), the image information generation unit 332 generates expected image finish information reflecting the processing performed according to selected setting items (step S1303). The steps down to S1308 are subsequently repeated.

If the operator has made no alteration of the setting, no setting is received by the touch panel 15*b* ("NO" in step S1309), and the printer 14 is ready for receiving a print command ("NO" in step S1310). If a print command is received by the printer ("YES" in step S1310), the printer 14 performs a print operation and the finish processing unit 141 provides finish processing (step S1311).

As described herein above, the expected image finish and the setting screen in use for receiving additional user's setting are displayed, taking into account the document characteristic values analyzed by the image analysis section 81, and the setting inputs can be received by way of the setting screen on the display.

Therefore, the expected image finish and the processing items additionally to be input can be narrowed-down precisely by way of the present setting screen, the processing items can be selected with high certainty and precision, and item setting operation can be performed efficiently and reliably.

Embodiment 15

Figure 56:
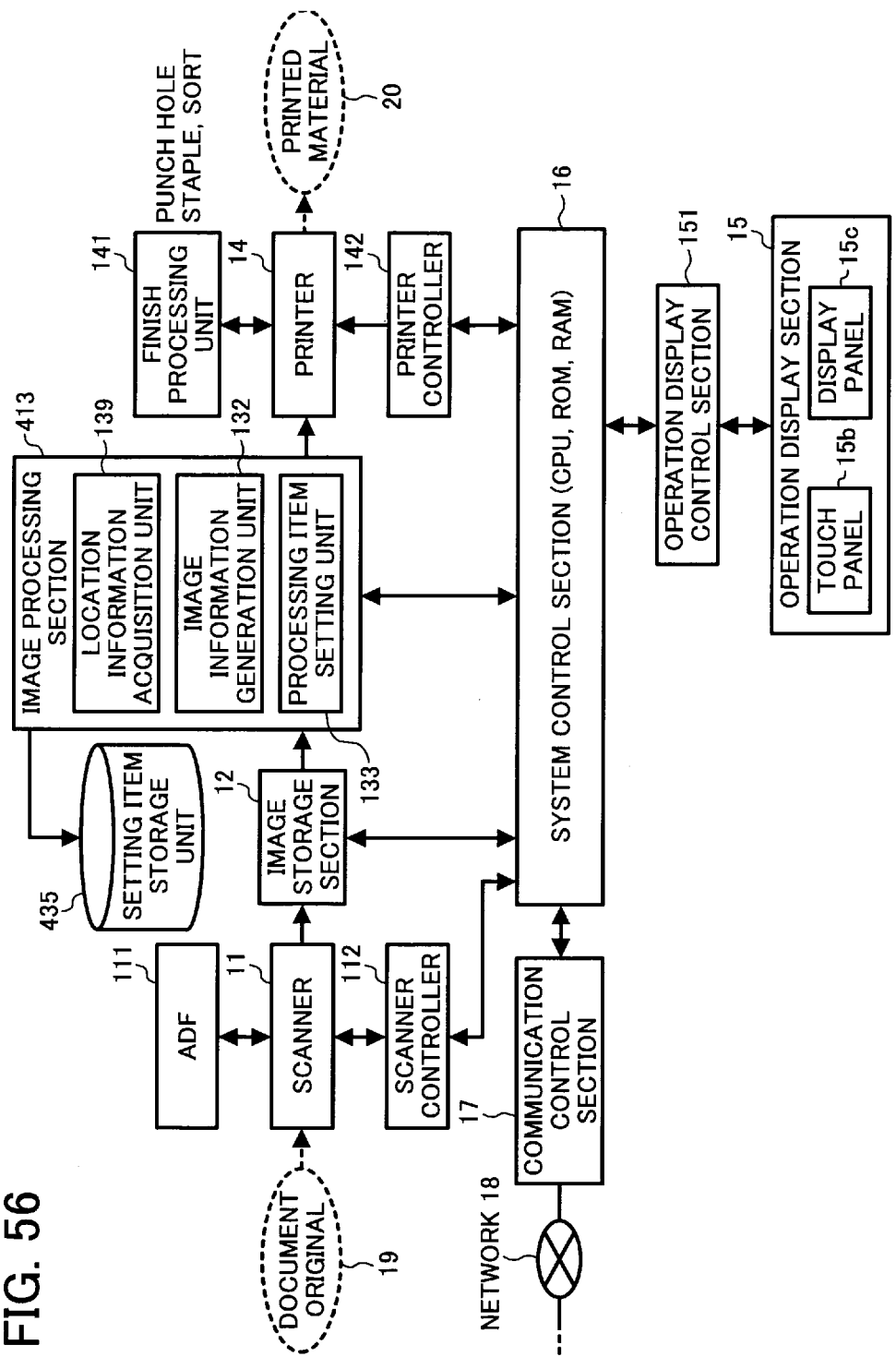
FIG. 56 is a functional block diagram illustrating an image-forming system according to a fifteenth embodiment of the invention.

FIG. 56 is a functional block diagram illustrating an image-forming system according to a fifteenth embodiment of the invention.

FIG. 57 is a functional block diagram illustrating a setting item storage unit 435 in the image processing section 413 of the image-forming system.

As described earlier, the setting item storage unit 435 in the image-forming system 9 of the twelfth embodiment of the invention is configured to store the processing item referring to coordinate information as the correspondence table.

By contrast, the setting item storage unit 135 in the image processing section 313 of the present embodiment further includes a display setting item table (or, display table) 435*a*.

The processing item setting unit 133 is now able to perform several operations such as canceling the item previously set, displaying related processing items such as further alterable processing items, and managing display contents.

These operations by the processing item setting unit 133 are performed by receiving a setting input onto the touch panel 15*b* from the operator, referring to the display table 435*a*, retrieving information on displayed setting items, and writing into or deleting a previous writing.

For example, in the case when a user setting item is set, an expected image finish is displayed on the operation display section 15 in a similar manner to the twelfth embodiment and the processing item information set by the user is written into the display table 435*a*. For canceling a setting item previously set by the user's operation, this item is deleted from the display table 435*a*.

For altering a setting by contacting to an expected image finish displayed on the operation display section 15, the processing item setting unit 133 first refers to the display table 435*a* and performs a search to determine whether setting item information set by the user is written into the location of the contact.

In the case when any written item information is retrieved, this processing item is displayed already. Related processing items are now referred to the display table 435*a* based on the premise of the processing item set already, and thus retrieved related processing items are displayed subsequently.

Therefore, whether the setting item is set already by the user is determined by acquiring coordinate information by the location information acquisition unit 131, retrieving the display table 435*a* by processing item setting unit 133, and retrieving the item corresponding to the coordinate information. If any corresponding item is retrieved, the retrieved item is displayed and related items, which are stored in the ordinary correspondence table 135*a*, are also displayed.

If no item information on the processing item set previously is retrieved by the processing item setting unit 133 on referring to the display table 435*a*, it is determined that no processing item is previously set, and processing items are displayed from the items stored in the ordinary correspondence table 135*a*.

Next, an operation process is illustrated by the image-forming system according to the fifteenth embodiment of the invention. Here assumed is that a setting item is already set so as to print two pages of document on one single sheet, and a display image of the collective 2-in-1 is shown already. In addition, utilizing the display image, a staple processing is added and then canceled.

These steps will be described herein below, for purposes of the illustration, to demonstrate the change in the expected image finish and in the display table.

FIG. 58 illustrates a statement in the display table indicating the collective 2-in-1 setting already stored, and FIG. 59 is a plan view illustrating an expected image finish displayed according to the statement in the display table.

The information of the collective setting alone is stored in the display table, indicative of two pages of document on one single sheet, and the expected image finish according to the statement is shown in FIG. 59, as the collective 2-in-1 image.

A user setting is performed now by contacting to the portion 2504.

Figure 60:
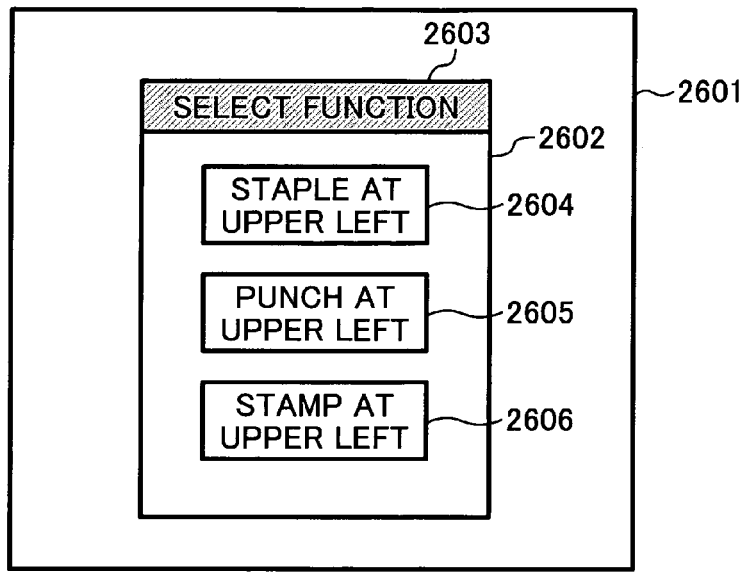
FIG. 60 is a plan view illustrating a display image of processing items related to the portion on the display contacted by the user.

FIG. 60 is a plan view illustrating a display image of processing items related to the portion on the display contacted by the user.

Since no item information previously set is found in the display table 435*a* of FIG. 60 at the location contacted by the user, the correspondence table 135*a* as the ordinary setting item table is referred. As a result, there displayed are three items, staple 2604, punched hole 2605, and stamp 2606, each at the upper left.

Figure 61:
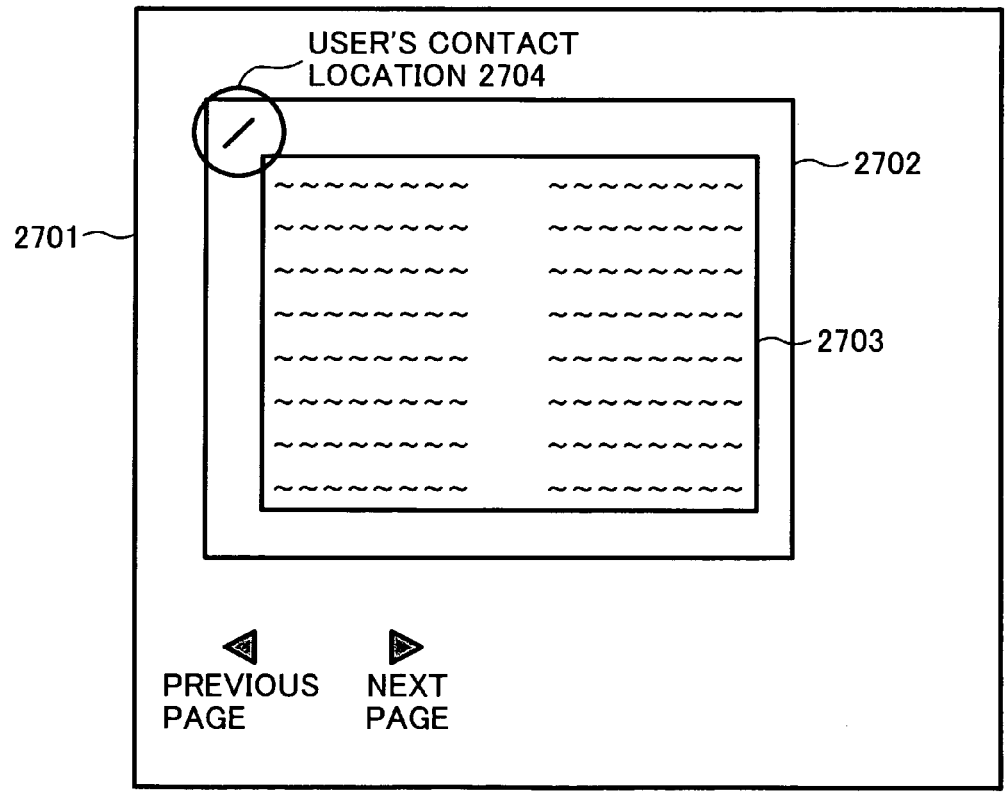
FIG. 61 is a plan view illustrating an expected image finish which is displayed after the selection of staple processing is made among the processing items of FIG. 60, in which a staple sign is additionally displayed at the location of contact by the user.

FIG. 61 is a plan view illustrating an expected image finish which is displayed after the selection of staple processing is made among the processing items of FIG. 60, in which a staple sign is additionally displayed at the location of contact by the user.

Figures 62, 63:
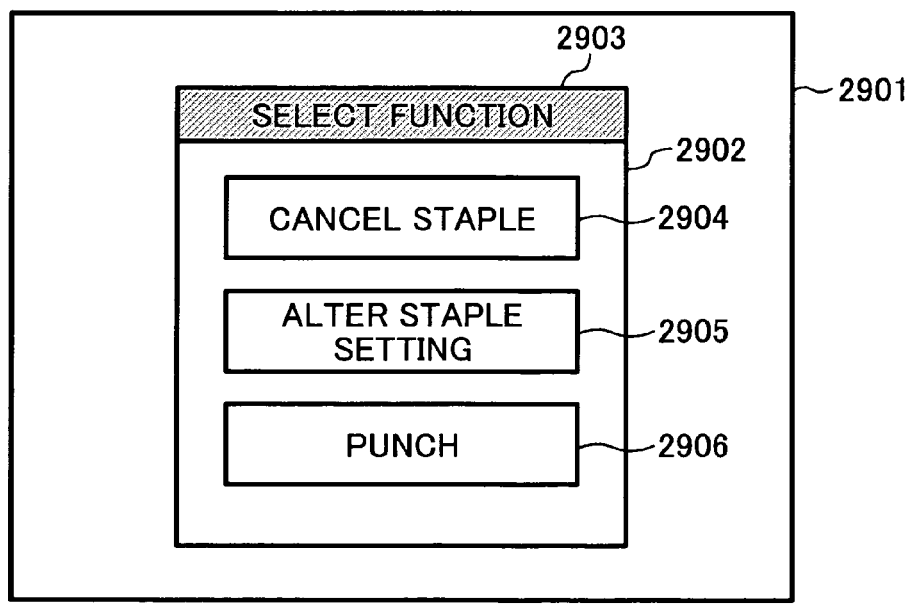
FIG. 62 illustrates the statement written into the display table after the selection of staple processing is made in FIGS. 60 and 61, in which the information "STAPLE AT THE UPPER LEFT" is written as a processing item.
FIG. 63 is a plan view illustrating a menu screen which is displayed after contacting the staple sign by the user again, in which the staple processing is already set and related processing items are displayed based on the premise of the processing item mentioned just above.

FIG. 62 illustrates the statement written into the display table after the selection of staple processing is made in FIGS. 60 and 61, in which the information "STAPLE AT THE UPPER LEFT" is written as a processing item at the location (5,5) in the (xy)-coordinate.

FIG. 63 is a plan view illustrating a menu screen which is displayed after contacting the staple sign (upper left in FIG. 61) by the user again, in which the staple processing is already set and related processing items are displayed based on the premise of the processing item mentioned just above.

That is, in response to the previous staple setting, three settings are shown such as staple cancel 2904, staple alteration 2905, and punch 2906. The user can therefore alter the staple setting, if necessary, by selecting and addressing a setting out of these displayed settings.

Figures 64, 65:
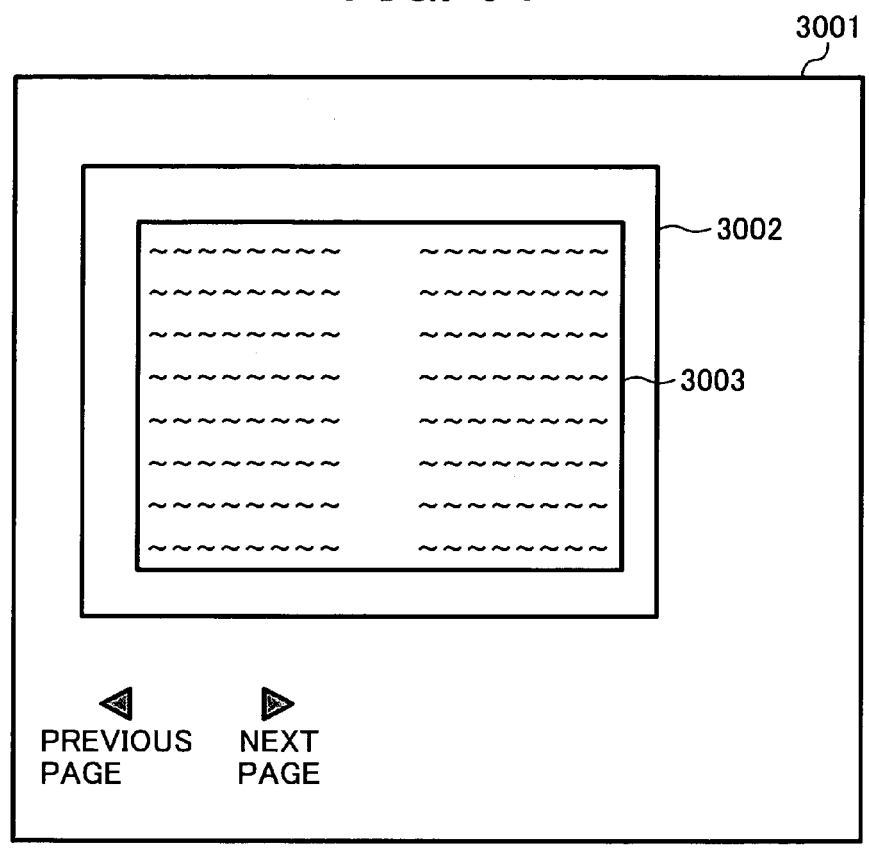
FIG. 64 is a plan view illustrating still another expected image finish which is displayed after canceling the staple processing, as described above.
FIG. 65 illustrates statements stored in the display table after canceling the staple processing in FIG. 63, in which setting information related to the staple processing has been removed from the display table and there remains only that related to the initial collective 2-in-1 setting.

FIG. 64 is a plan view illustrating still another expected image finish which is displayed after canceling the staple processing, as described above.

FIG. 65 illustrates statements stored in the display table after canceling the staple processing in FIG. 63, in which setting information related to the staple processing has been removed from the display table 435*a* and there remains only the information related to the initial collective 2-in-1 setting.

If no further setting is input, a print operation is performed. While similar setting steps are repeated if a further setting is necessary.

Figure 66B:
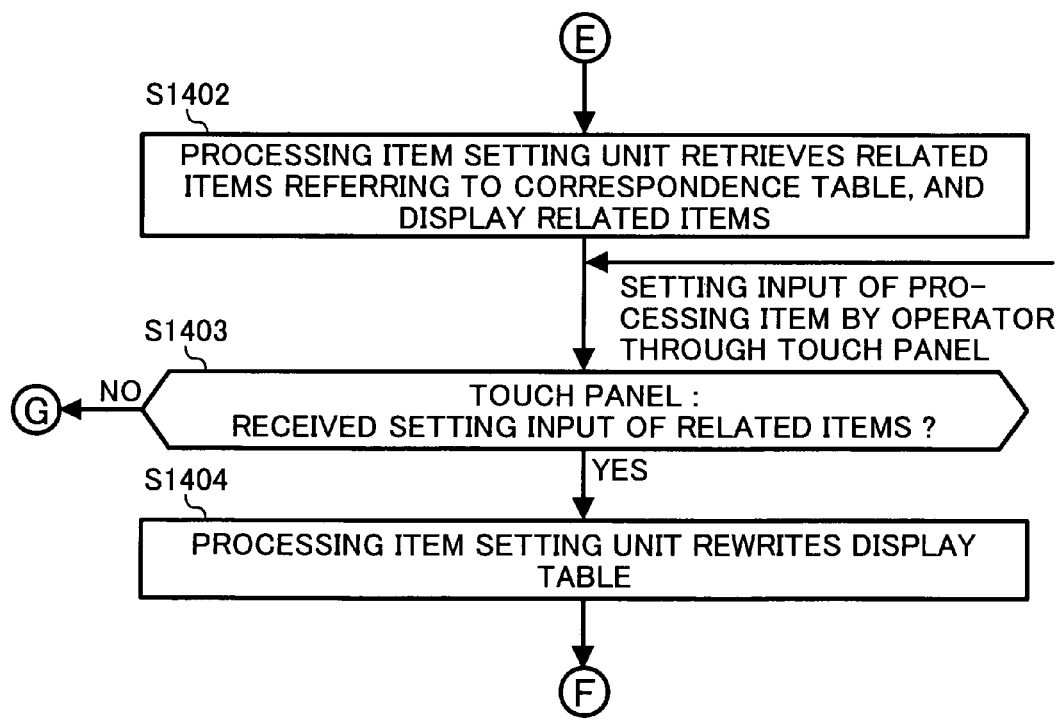
FIG. 66 is a flowchart illustrating a process flow for forming an image by the image-forming system according to the fifteenth embodiment of the invention.

FIG. 66 is a flowchart illustrating a process flow for forming an image by the image-forming system according to the fifteenth embodiment of the invention.

The steps up to S1007 of FIG. 66 are similar to those of the twelfth embodiment, where image data are first input, an expected image finish is displayed on the display panel, and setting items are displayed by contact input from the user. Therefore, the description on these steps is herein abbreviated and the steps unique to the present embodiment are primarily described.

On receiving a setting input onto the touch panel 15*b* from the operator, the processing item setting unit 133 refers to the display table 435*a*, and determines whether setting item information exists at the location corresponding to the coordinate where the user made contact (step S1401).

If processing items corresponding to the coordinate are retrieved ("YES" in step S1401), the processing item setting unit 133 refers to the display table 435*a*, retrieves the items related to the processing items found as above, and instructs to be displayed (step S1402).

For example, in the case when the staple processing is set through the display table, punched hole processing is read out and then displayed as the item related to the staple processing stored in the correspondence table.

Further, it is determined whether the operator makes an alteration, that is, whether the touch panel received any setting input of related item (step S1403). If a setting input of related item is received ("YES" in step S1403), the processing item setting unit 133 instructs to rewrite the display table (step S1404). Thereafter, the display panel is adapted to update and display the expected image finish (step S505), and the printer is ready for receiving a print command (step S1406).

In contrast, if no setting input of related item is received, as well, the printer is ready for receiving a print command (step S1406).

If it is determined that no processing item has been set previously ("NO" in step S1401), the processing item setting unit 133 refers to the correspondence table 135*a*, and a selection menu is displayed consisting of processing items (step S1407).

The touch panel is ready for receiving a setting input out of the processing items mentioned just above (step S1408). If a setting input is received ("YES" in step S1408), the processing item setting unit instructs to update the values of processing item (step S1409), and the display panel is adapted to update and display the expected image finish based on the updated values of processing item (step S1405).

If no print command is received by the printer ("NO" in step S1406), the process returns again to step S1401 to repeats a similar routine as above.

By contrast, if a print command is received, the printer 14 provides print processing and the finish processing unit 141 provides finish processing (step S1410).

Therefore, by providing further the display table 435*a*, and rewriting the table and updating the display according to the alteration of setting items, it becomes feasible to display clearly not only the processing items already set but also those related to alteration and cancellation.

As a result, the operator can make selections of process cancellation and alteration with more ease with the image-forming system according to the fifteenth embodiment of the invention.

Embodiment 16

An image processing apparatus according to a sixteenth embodiment of the invention is provided as a subsystem for primarily performing image processing, being incorporated into the image-forming system of the twelfth embodiment.

Figure 67:
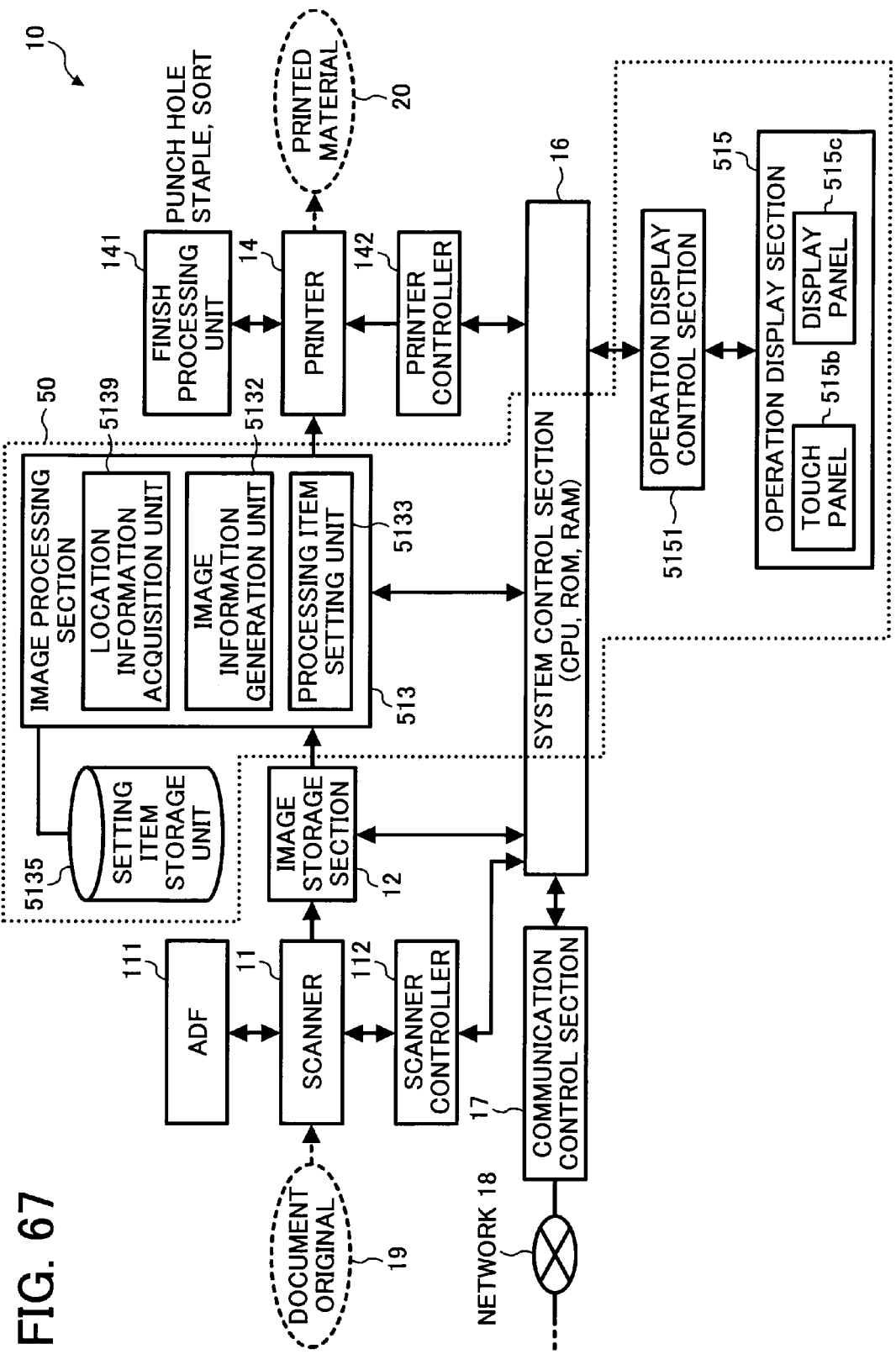
FIG. 67 is a functional block diagram illustrating an image-forming system, incorporating the image processing apparatus according to a sixteenth embodiment of the invention.

FIG. 67 is a functional block diagram illustrating an image-forming system 10, incorporating the image processing apparatus 50. Since the image processing apparatus 50 is configured to have the same image processing capabilities as those of the image-forming system 10, the description on these capabilities is herein abbreviated.

In the image-forming system according to the sixteenth embodiment of the invention, an expected image finish screen is displayed prior to print processing based on image data which are obtained by reading a document or by way of a network.

In addition, an input setting screen is also displayed to be used for receiving setting inputs from the operator while viewing the screen. Further, the expected image finish and input setting screen are updated according to added or altered setting items.

As a result, working efficiency and convenience for the user can therefore be much improved, and reliability of the system increases in the image-forming system.

Embodiment 17

Figure 68:
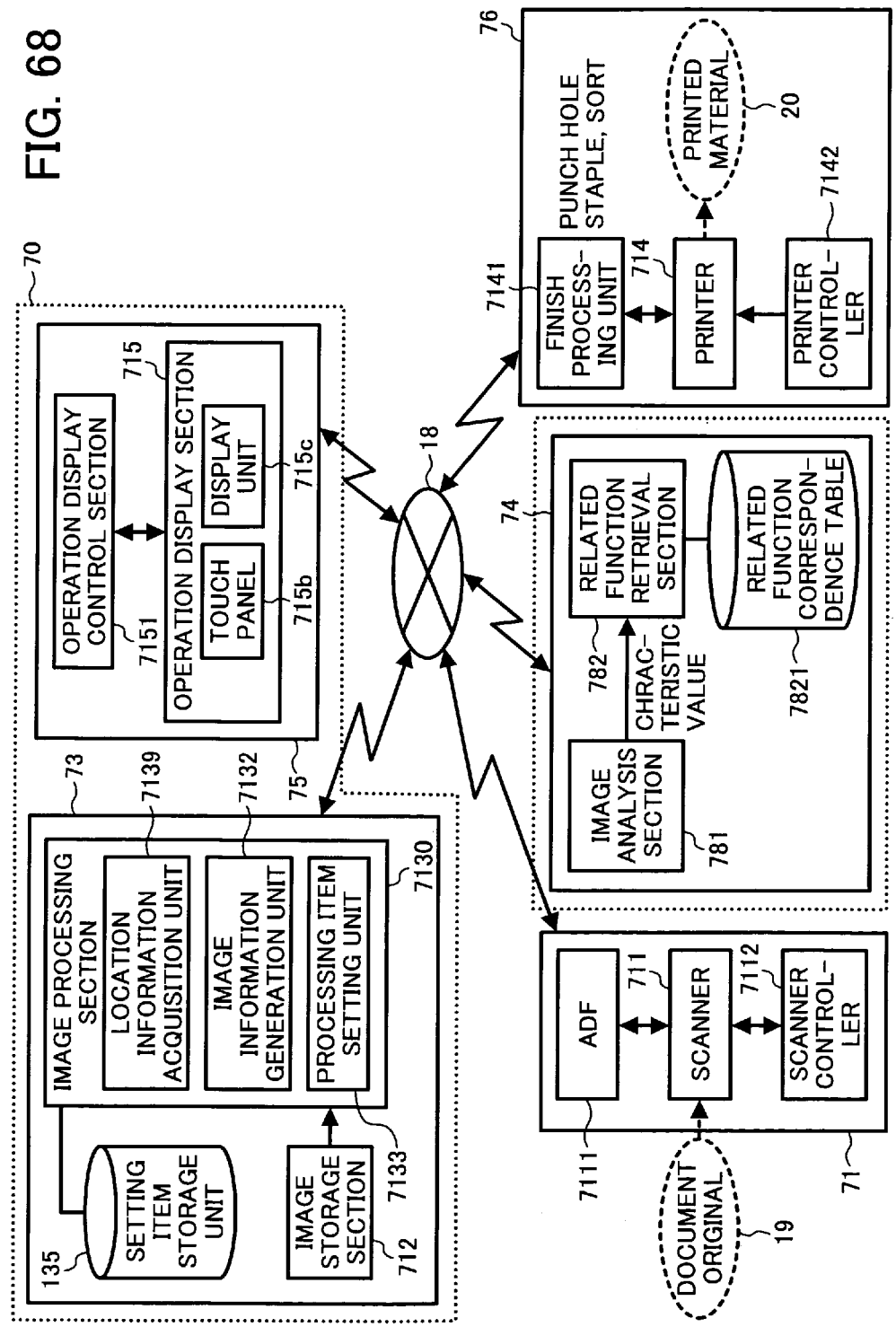
FIG. 68 is a functional block diagram illustrating an image-forming system according to the seventeenth embodiment of the invention.

FIG. 68 is a functional block diagram illustrating an image-forming system according to the seventeenth embodiment of the invention.

The image-forming system includes a first image processing apparatus 73, a document reading section 71, a second image processing apparatus 74, a finish processing section 76 including a printer 714, which are interconnected by way of a network 18.

In addition, the units included in the first image processing section 73 may alternatively be formed separately, being interconnected by way of the network 18.

The capabilities of the apparatuses and sections in the image-forming system are similar to those of the image-forming system 8 of the twelfth embodiment, except the formers are realized by connecting to the network 18.

Moreover, second image analysis apparatus 74 may further be included for analyzing document characteristic values, as shown also in FIG. 68.

In the image-forming system according to the seventeenth embodiment of the invention, an expected image finish screen is displayed prior to print processing and an input setting screen is also displayed to be used for receiving setting inputs from the operator, based on image data which are read out or acquired by way of the network 18.

Therefore, working efficiency and convenience for the user can be much improved, and reliability of the system connected to the network 18 increases with the image-forming system of the invention, by displaying the input setting screen to be used for receiving setting inputs from the operator while viewing the screen, updating the expected image finish and input setting screen according to added or altered setting items.

(Hardware Configuration)

Figure 69:
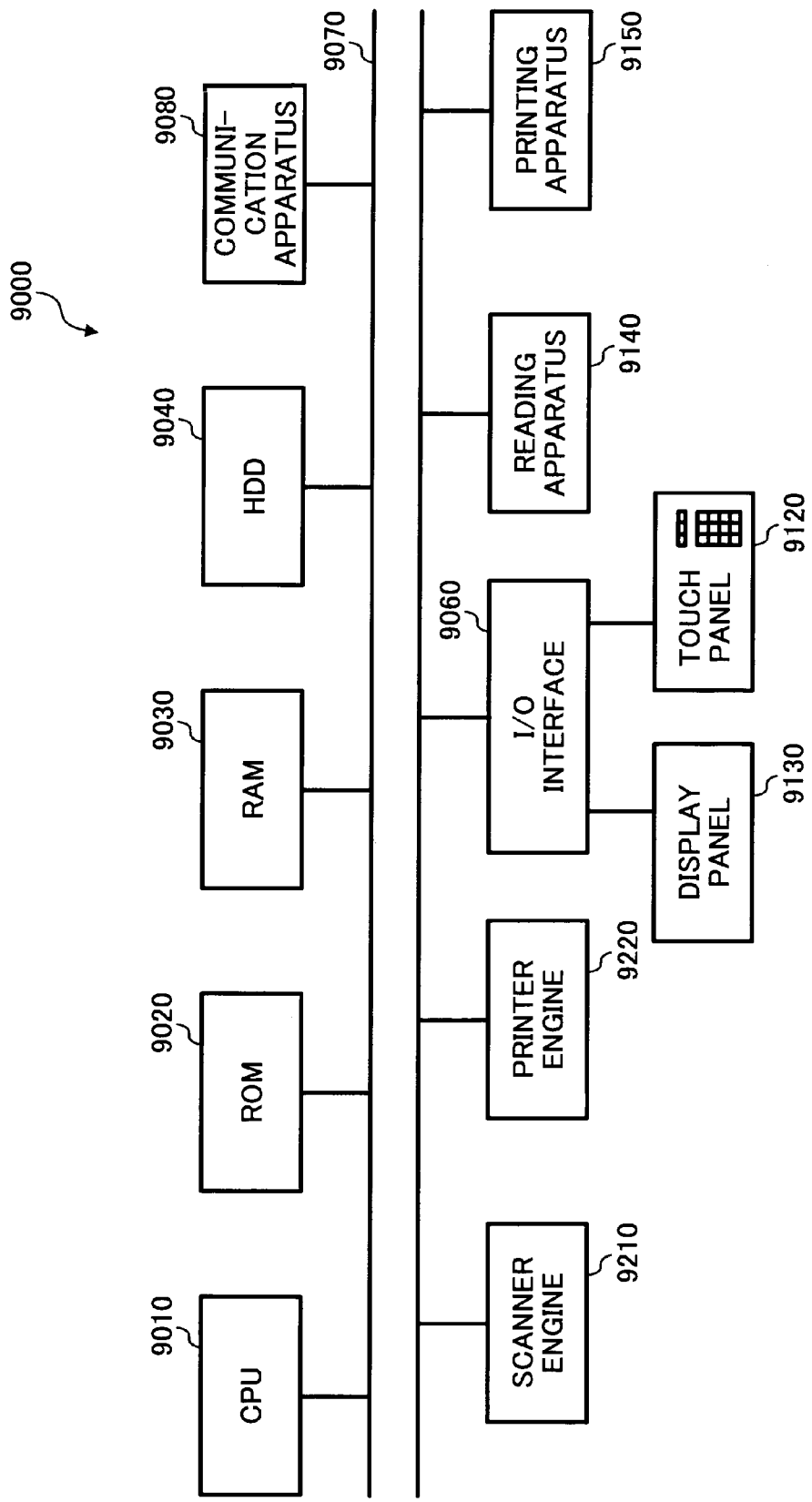
FIG. 69 is a block diagram diagrammatically illustrating a hardware configuration of the image-forming system of the invention.

FIG. 69 is a block diagram diagrammatically illustrating a hardware configuration of the image-forming system of the invention.

The image-forming system 9000 includes control units, such as CPU 9010 and other similar devices; storage units, such as ROM 9020 and RAM 9030; external storage units, such as HDD 9040 and CD drive (not shown); display units, such as a display panel 9130; input/output units, such as a touch panel 9120, which may connected through an input/output interface 9060; reading units, such as a reading apparatus 9140, a scanner 11,711 and a scanner engine 9210; and mechanical units, such as a printer engine 9220 and a printing apparatus 9150, which are all connected through a bus 9070 and altogether assume a conventional configuration of a computer system.

Computer programs for forming images are stored in ROM 9020, which are configured to embody a variety of instructions executable by the machine.

The computer programs may also be provided with files in the format installable or executable, which are stored in computer readable storage media, such as CD-ROM, flexible disc, CD-R, DVD other similar devices.

In such a case, by being retrieving from the ROM device and installed to the main storage unit, the computer programs are enabled to generate the capabilities of the abovementioned units and execute the computer programs.

Alternatively, the programs may be provided by first being storing in, and then downloaded from a computer connected to a network, such as, for example, the internet. In addition, the computer programs for forming images executable in the image-forming system of the present invention may be transmitted or distributed by way of the network.

It is apparent from the above description including the examples, the image-forming systems and the methods disclosed herein can offer several advantages over similar systems and methods previously known.

For example, the expected image finish information and the input setting screen information are generated based on image data, and the expected image finish and the input setting screen capable of receiving setting inputs from the operator are displayed. Then, a simplified, intuitively understandable, and accurate input setting menu, which contains the items narrowed-down from complex initial items to be used for inputting desirable items, can be displayed prior to various setting operations.

If some portions in the expected image finish screen are altered by a later user setting, the portions different from the initial expected image finish screen can be displayed with appropriate emphasis.

These portions can therefore be recognized visually by the operator with more ease. As a result, document print processing can be carried out in line closer with the operator's settings.

In addition, if the setting screen is altered by user setting, the thus altered setting screen is displayed to receive additional setting inputs. The operator can therefore carry out further input settings so as to bring the image finish asymptotically closer to a desired, ideal image.

It becomes feasible for the operator, therefore, to view the expected image finish and a setting screen containing proper setting items, working efficiency and convenience can therefore be much improved in the image-forming operation.

In another aspect, the spatial item identification unit is adapted to acquire spatial information on the expected image finish by the contact of a contacting material to identify a spatial instruction item as a spatial setting, and the language item identification unit receives voice information to identify a language instruction item.

The spatial instruction item identification unit identifies spatial certainty for the spatial instruction item, the language instruction item identification unit identifies a language certainty for the language instruction item, and the processing item setting unit determines item relevancy as information on relevancy of the spatial instruction item and the language instruction item.

In addition, the processing item setting unit determines an item relevancy as information on the relevancy of the spatial instruction item and the language instruction item. Processing item setting is performed according to the result obtained from a weighted addition of the spatial instruction item, the language instruction item, and the item relevancy, each appending weighting factors.

As a result, the processing items can be selected efficiently and reliably by selecting candidates out of spatial instruction, and language instruction items in proper sequence, the processing items can be selected with high certainty and relevancy, and item setting operation can be performed efficiently and reliably.

In still another aspect, if a first processing item is set, the processing item setting unit system is configured to provide second processing item(s) of a lower hierarchized level on the premise of the first processing item.

By preparing and displaying the processing items in the hierarchical structure, thus reducing the number of items, which are displayed on the display panel at one time, the image on the display panel can be made easier for the operator to view.

In addition, by displaying relevant processing items sequentially at a deeper hierarchical level, more detailed setting of processing items becomes feasible for the operator.

In the case when multiple options result from the selection of one processing item, in particular, complexity of processing item setting can be reduced, while convenience increases.

Obviously, additional modifications and variations of the present invention are possible in light of the above teachings. It is therefore to be understood that within the scope of the appended claims, the invention may be practiced otherwise than as specifically described herein.

What is claimed as new and desired to be protected by Letters Patent of the United States is:

1. An image-forming system configured to perform at least a first operation to input image data, a second operation to process said image data and form a print finish, and a third operation to display an expected image finish as a result of said first and said second operations, comprising:
    a finish information generation unit configured to generate expected image finish information on completion of said first and said second operations;
    an input setting screen information generation unit configured to generate input setting screen information for receiving a setting input by an operator based on said expected image finish information generated by said finish information generation unit;
    a display unit configured to display on a display unit an expected image finish resulting from said expected image finish information and an input setting screen resulting from said input setting screen information generated by said input setting screen information generation unit; and
    a setting unit configured to receive a variety of setting inputs including said setting input by the operator by way of said input setting screen displayed on said display unit,
        wherein, on receiving said variety of setting inputs by said setting unit:
        said finish information generation unit generates said expected image finish information based on said variety of setting inputs currently received,
        said input setting screen information generation unit generates said input setting screen information based on said expected image finish information generated by said finish information generation unit,
        said display unit displays said expected image finish resulting from said expected image finish information and said input setting screen resulting from said input setting screen information generated by said input setting screen information generation unit, and
        said setting unit receives said variety of setting inputs including said setting input by the operator by way of said input setting screen displayed on said display unit.

2. The image-forming system according to claim 1, further comprising:
    an image analysis unit configured to analyze said image data and extract a document characteristic value, wherein:
    said finish information generation unit generates said expected image finish information based on said document characteristic value extracted by said image analysis unit, and
    said input setting screen information generation unit generates said input setting screen information based on said document characteristic value extracted by said image analysis unit.

3. The image-forming system according to claim 2, wherein, if a portion in said input setting screen, resulting from said input setting screen information generated by said input setting screen information generation unit, is different from that corresponding to said portion in an initial input setting screen, resulting from initial setting values,
    said display unit displays said portion with emphasis.

4. The image-forming system according to claim 3, wherein, if said setting unit receives at least a setting item by the operator and if said display unit displays an updated input setting screen which is updated according to said setting item by the operator,
    said display unit displays a portion with emphasis, said portion in said updated input setting screen being different from a portion corresponding to said portion in an input setting screen prior to updating.

5. The image-forming system according to claim 4, wherein:
    said finish information generation unit generates expected image finish information containing a pictorial image, and
    said display unit displays an expected image finish containing said pictorial image.

6. The image-forming system according to claim 5, wherein:
    said pictorial image, which is contained in said expected image finish information generated by said finish information generation unit, includes at least one image selected from the group consisting of a plan image, a solid image, and an animated image; and
    said display unit displays said expected image finish containing said at least one image.

7. The image-forming system according to claim 6, wherein:
    said finish information generation unit generates expected image finish information containing text information,
    said input setting screen information generation unit generates an input setting screen information containing said text information based on said expected image finish information containing said text information,
    said display unit displays said expected image finish containing said text information and said input setting screen containing said text information, and
    said setting unit receives a variety of setting inputs containing said text information.

8. The image-forming system according to claim 1, wherein, if a portion in said input setting screen, resulting from said input setting screen information generated by said input setting screen information generation unit, is different from that corresponding to said portion in an initial input setting screen, resulting from initial setting values, said display unit displays said portion with emphasis.

9. The image-forming system according to claim 1, wherein, if said setting unit receives at least a setting item by the operator and if said display unit displays an updated input setting screen which is updated according to said setting item by the operator, said display unit displays a portion with emphasis, said portion in said updated input setting screen being different from a portion corresponding to said portion in an input setting screen prior to updating.

10. The image-forming system according to claim 1, wherein:

said finish information generation unit generates expected image finish information containing a pictorial image, and said display unit displays an expected image finish containing said pictorial image.

11. The image-forming system according to claim 1, wherein:

said finish information generation unit generates expected image finish information containing text information, said input setting screen information generation unit generates an input setting screen information containing said text information based on said expected image finish information containing said text information, said display unit displays said expected image finish containing said text information and said input setting screen containing said text information, and said setting unit receives a variety of setting inputs containing said text information.

12. The image-forming system according to claim 3, wherein:

said finish information generation unit generates expected image finish information containing a pictorial image, and said display unit displays an expected image finish containing said pictorial image.

13. The image-forming system according to claim 3, wherein:

said finish information generation unit generates expected image finish information containing text information, said input setting screen information generation unit generates an input setting screen information containing said text information based on said expected image finish information containing said text information, said display unit displays said expected image finish containing said text information and said input setting screen containing said text information, and said setting unit receives a variety of setting inputs containing said text information.

14. An image-forming system configured to perform at least a first operation to input image data, a second operation to process said image data and form a print finish, and a third operation to display an expected image finish as a result of said first and said second operations, comprising:

a finish information generation unit configured to generate expected image finish information on completion of said first and said second operations;

an input setting screen information generation unit configured to generate input setting screen information for receiving a setting input by an operator based on said expected image finish information generated by said finish information generation unit;

a display unit configured to display on a display unit an expected image finish resulting from said expected image finish information and an input setting screen resulting from said input setting screen information generated by said input setting screen information generation unit;

a setting unit configured to receive a variety of setting inputs including said setting input by the operator by way of said input setting screen displayed on said display unit; and an image analysis unit configured to analyze said image data and to extract a document characteristic value, wherein:

said finish information generation unit generates said expected image finish information based on said document characteristic value extracted by said image analysis unit, and said input setting screen information generation unit generates said input setting screen information based on said document characteristic value extracted by said image analysis unit.

15. An image-forming system configured to perform at least a first operation to input image data, a second operation to process said image data and form a print finish, and a third operation to display an expected image finish as a result of said first and said second operations, comprising:

a finish information generation unit configured to generate expected image finish information on completion of said first and said second operations;

an input setting screen information generation unit configured to generate input setting screen information for receiving a setting input by an operator based on said expected image finish information generated by said finish information generation unit;

a display unit configured to display on a display unit an expected image finish resulting from said expected image finish information and an input setting screen resulting from said input setting screen information generated by said input setting screen information generation unit; and a setting unit configured to receive a variety of setting inputs including said setting input by the operator by way of said input setting screen displayed on said display unit, wherein, if a portion in said input setting screen, resulting from said input setting screen information generated by said input setting screen information generation unit, is different from that corresponding to said portion in an initial input setting screen, resulting from initial setting values, said display unit displays said portion with emphasis.

16. An image-forming system configured to perform at least a first operation to input image data, a second operation to process said image data and form a print finish, and a third operation to display an expected image finish as a result of said first and said second operations, comprising:

a finish information generation unit configured to generate expected image finish information on completion of said first and said second operations;

an input setting screen information generation unit configured to generate input setting screen information for receiving a setting input by an operator based on said expected image finish information generated by said finish information generation unit;

a display unit configured to display on a display unit an expected image finish resulting from said expected image finish information and an input setting screen resulting from said input setting screen information generated by said input setting screen information generation unit; and a setting unit configured to receive a variety of setting inputs including said setting input by the operator by way of said input setting screen displayed on said display unit, wherein:
- said finish information generation unit generates expected image finish information containing text information,
- said input setting screen information generation unit generates an input setting screen information containing said text information based on said expected image finish information containing said text information,
- said display unit displays said expected image finish containing said text information and said input setting screen containing said text information, and
- said setting unit receives a variety of setting inputs containing said text information.

17. An image-forming system configured to perform at least a first operation to input image data, a second operation to process said image data and form a print finish, and a third operation to display an expected image finish as a result of said first and said second operations, comprising:
- first means for generating expected image finish information on completion of said first and said second operations;
- second means for generating input setting screen information for receiving a setting input by an operator based on said expected image finish information generated by said first means for generating;
- means for displaying on a display unit an expected image finish resulting from said expected image finish information and an input setting screen resulting from said input setting screen information generated by said second means for generating; and
- means for receiving a variety of setting inputs including said setting input by the operator by way of said input setting screen displayed on said means for displaying,
  - wherein, on receiving said variety of setting inputs by said setting unit:
  - said first means for generating generates said expected image finish information based on said variety of setting inputs currently received,
  - said second means for generating generates said input setting screen information based on said expected image finish information generated by said first means for generating,
  - said means for displaying displays said expected image finish resulting from said expected image finish information and said input setting screen resulting from said input setting screen information generated by said second means for generating, and
  - said means for receiving receives said variety of setting inputs including said setting input by the operator by way of said input setting screen displayed on said means for displaying.

18. The image-forming system according to claim 17, further comprising:
- means for analyzing said image data and to extract a document characteristic value,
wherein:
- said first means for generating generates said expected image finish information based on said document characteristic value extracted by said means for analyzing, and
- said second means for generating generates said input setting screen information based on said document characteristic value extracted by said means for analyzing.

19. The image-forming system according to claim 18, wherein, if a portion in said input setting screen, resulting from said input setting screen information generated by said second means for generating, is different from that corresponding to said portion in an initial input setting screen, resulting from initial setting values, said means for displaying displays said portion with emphasis.

20. The image-forming system according to claim 19, wherein, if said means for receiving receives at least a setting item by the operator and if said means for displaying displays an updated input setting screen which is updated according to said setting item by the operator, said means for displaying displays a portion with emphasis, said portion in said updated input setting screen being different from a portion corresponding to said portion in an input setting screen prior to updating.

21. The image-forming system according to claim 20, wherein:
- said first means for generating generates expected image finish information containing a pictorial image, and
- said means for displaying displays an expected image finish containing said pictorial image.

22. The image-forming system according to claim 21, wherein:
- said pictorial image, which is contained in said expected image finish information generated by said first means for generating, includes at least one image selected from the group consisting of a plan image, a solid image, and an animated image; and
- said means for displaying displays said expected image finish containing said at least one image.

23. The image-forming system according to claim 22, wherein:
- said first means for generating generates expected image finish information containing text information,
- said second means for generating generates an input setting screen information containing said text information based on said expected image finish information containing said text information,
- said means for displaying displays said expected image finish containing said text information and said input setting screen containing said text information, and
- said means for receiving receives a variety of setting inputs containing said text information.

24. A method for storing and processing image data for an image-forming system configured to perform at least a first operation to input image data, a second operation to process said image data and form a print finish, and a third operation to display an expected image finish as a result of said first and said second operations, comprising the steps of:
- receiving at least one of an image data input command, a process command, and a print finish command;
- generating expected image finish information on completion of said first and said second operations;
- generating input setting screen information for receiving a setting input by an operator based on said expected image finish information;
- displaying on a display unit an expected image finish resulting from said expected image finish information and an input setting screen resulting from said input setting screen information; and receiving a variety of setting inputs including said setting input by the operator by way of said input setting screen, wherein, on receiving said variety of setting inputs:

said step of generating expected image finish information generates said expected image finish information based on said variety of setting inputs currently received, said step of generating input setting screen information generates said input setting screen information based on said expected image finish information, said step of displaying an expected image finish displays said expected image finish resulting from said expected image finish information and said input setting screen resulting from said input setting screen information generated in said step of generating, and said step of receiving a variety of setting inputs receives said variety of setting inputs including said setting input by the operator by way of said input setting screen displayed in said step of displaying.

25. The method according to claim 24, further comprising the step of:

analyzing said image data and extracting a document characteristic value, wherein:

said step of generating expected image finish information generates said expected image finish information based on said document characteristic value extracted in said step of analyzing, and said step of generating input setting screen information generates said input setting screen information based on said document characteristic value extracted in said step of analyzing.

26. The method according to claim 25, wherein, if a portion in said input setting screen, resulting from said input setting screen information generated in said step of generating, is different from that corresponding to said portion in an initial input setting screen, resulting from initial setting values, said step of displaying an expected image finish displays said portion with emphasis.

27. The method according to claim 26, wherein, if said step of receiving receives at least a setting item by the operator and if said step of displaying displays an updated input setting screen which is updated according to said setting item by the operator, said step of displaying an expected image finish displays said portion with emphasis, in which said portion in said updated input setting screen is different from a portion corresponding to said portion in an input setting screen prior to updating.

28. The method according to claim 27, wherein;

said step of generating expected image finish information generates expected image finish information containing a pictorial image, and said step of displaying an expected image finish displays an expected image finish containing said pictorial image.

29. The method according to claim 28, wherein:

said pictorial image, which is contained in said expected image finish information generated in said step of generating, includes at least one image selected from the group consisting of a plan image, a solid image, and an animated image; and said step of displaying an expected image finish displays said expected image finish containing said at least one image.

30. The method according to claim 29, wherein:

said step of generating expected image finish information generates expected image finish information containing text information, said step of generating input setting screen information generates an input setting screen information containing said text information based on said expected image finish information containing said text information, said step of displaying an expected image finish displays said expected image finish containing said text information and said input setting screen containing said text information, and said step of receiving a variety of setting inputs receives a variety of setting inputs containing said text information.

31. A computer program product for use with an image-forming system configured to perform at least a first operation to input image data, a second operation to process said image data and form a print finish, and a third operation to display an expected finish as a result of said first and said second operations, said computer program product comprising:

a computer readable medium for storing computer instructions for performing the steps recited in anyone of claims 24 through 30.

32. An image processing system configured to perform at least a first operation to process image data input and form a print finish, and a second operation to display an expected image finish as a result of said first operation, said image processing system being interconnected by way of a network, comprising:

a finish information generation unit configured to generate expected image finish information on completion of said first and said second operations;

an input setting screen information generation unit configured to generate input setting screen information for receiving a setting input by an operator based on said expected image finish information generated by said finish information generation unit;

a display unit configured to display on a display unit art expected image finish resulting from said expected image finish information and an input setting screen resulting from said input setting screen information generated by said input setting screen information generation unit; and a setting unit configured to receive a variety of setting inputs including said setting input by the operator by way of said input setting screen displayed on said display unit, respectively connected with one another by way of the network, wherein, on receiving said variety of setting inputs by said setting unit:

said finish information generation unit generates said expected image finish information based on said variety of setting inputs currently received, said input setting screen information generation unit generates said input setting screen information based on said expected image finish information generated by said finish information generation unit, said display unit displays said expected image finish resulting from said expected image finish information and said input setting screen resulting from said input setting screen information generated by said input setting screen information generation unit, and said setting unit receives said variety of setting inputs including said setting input by the operator by way of said input setting screen displayed on said display unit.

33. The image processing system according to claim 32, further comprising:

an image analysis unit configured to analyze said image data and to extract a document characteristic value, wherein:

said finish information generation unit generates said expected image finish information based on said document characteristic value extracted by said image analysis unit, and said input setting screen information generation unit generates said input setting screen information based on said document characteristic value extracted by said image analysis unit.

34. The image processing system according to claim 33, wherein, if a portion in said input setting screen, resulting from said input setting screen information generated by said input setting screen information generation unit, is different from that corresponding to said portion in an initial input setting screen, resulting from initial setting values, said display unit displays said portion with emphasis.

35. An image processing apparatus configured to perform at least a first operation to input image data, a second operation to process said image data and form a print finish, and a third operation to display an expected image finish as a result of said first and said second operations, said image processing system being incorporated into an image-forming system and being provided with a setting unit configured to receive a setting input regarding said print finish processing, comprising:

a finish information generation unit configured to generate expected image finish information on completion of said first and said second operations;

an input setting screen information generation unit configured to generate input setting screen information for receiving a setting input by an operator based on said expected image finish information generated by said finish information generation unit; and a setting unit configured to receive at least one of (1) a setting input by the operator by way of an input setting screen formed on said display unit based on said input setting screen information generated by said input setting screen information generation unit and (2) said setting input regarding said print finish processing, wherein, on receiving said at least one setting input:

said finish information generation unit generates said expected image finish information based on said at least one setting input currently received, said input setting screen information generation unit generates said input setting screen information based on said expected image finish information generated by said finish information generation unit, and said setting unit receives said setting input by the operator by way of said input setting screen formed on said display unit based on said input setting screen information generated by said input setting screen information generation unit and said setting input regarding said print finish processing.

36. The image processing apparatus according to claim 35, further comprising:

an image analysis unit configured to analyze said image data and to extract a document characteristic value, wherein:

said finish information generation unit generates said expected image finish information based on said document characteristic value extracted by said image analysis unit, and said input setting screen information generation unit generates said input setting screen information based on said document characteristic value extracted by said image analysis unit.

37. An image-forming system configured to perform at least a first operation to input image data, a second operation to process said image data and form a print finish, and a third operation to display an expected image finish as a result of said first and said second operations, comprising:

a finish information generation unit configured to generate expected image finish information on completion of said first and said second operations;

an input setting screen information generation unit configured to generate input setting screen information for receiving a setting input based on said expected image finish information generated by said finish information generation unit;

a display unit configured to display on a display unit an expected image finish resulting from said expected image finish information and an input setting screen resulting from said input setting screen information generated by said input setting screen information generation unit; and a setting unit configured to receive at least said setting input, wherein, on receiving at least said setting input by said setting unit:

said finish information generation unit generates said expected image finish information based on at least said setting input, said input setting screen information generation unit generates said input setting screen information based on said expected image finish information generated by said finish information generation unit.

38. An image-forming system configured to perform at least a first operation to input image data, a second operation to process said image data and form a print finish, and a third operation to display an expected image finish as a result of said first and said second operations, comprising:

a finish information generation unit configured to generate expected image finish information on completion of said first and said second operations;

an input setting screen information generation unit configured to generate input setting screen information for receiving a setting input based on said expected image finish information generated by said finish information generation unit;

a display unit configured to display on a display unit an expected image finish resulting from said expected image finish information and an input setting screen resulting from said input setting screen information generated by said input setting screen information generation unit;

a setting unit configured to receive at least said setting input; and an image analysis unit configured to analyze said image data and to extract a document characteristic value, wherein:

said finish information generation unit generates said expected image finish information based on said document characteristic value extracted by said image analysis unit, and said input setting screen information generation unit generates said input setting screen information based on said document characteristic value extracted by said image analysis unit.

39. An image-forming system configured to perform at least a first operation to input image data, a second operation to process said image data and form a print finish, and a third operation to display an expected image finish as a result of said first and said second operations, comprising:

a finish information generation unit configured to generate expected image finish information on completion of said first and said second operations;

an input setting screen information generation unit configured to generate input setting screen information for receiving a setting input based on said expected image finish information generated by said finish information generation unit;

a display unit configured to display on a display unit an expected image finish resulting from said expected image finish information and an input setting screen resulting from said input setting screen information generated by said input setting screen information generation unit; and a setting unit configured to receive at least said setting input, and wherein, if a portion in said input setting screen, resulting from said input setting screen information generated by said input setting screen information generation unit, is different from that corresponding to said portion in an initial input setting screen, resulting from initial setting values, said display unit displays said portion with emphasis.

40. An image-forming system configured to perform at least a first operation to input image data, a second operation to process said image data and form a print finish, and a third operation to display an expected image finish as a result of said first and said second operations, comprising:

a finish information generation unit configured to generate expected image finish information on completion of said first and said second operations;

an input setting screen information generation unit configured to generate input setting screen information for receiving a setting input based on said expected image finish information generated by said finish information generation unit;

a display unit configured to display on a display unit an expected image finish resulting from said expected image finish information and an input setting screen resulting from said input setting screen information generated by said input setting screen information generation unit; and a setting unit configured to receive at least said setting input, wherein:

said finish information generation unit generates expected image finish information containing text information, and said input setting screen information generation unit generates an input setting screen information containing said text information based on said expected image finish information containing said text information.

41. An image-forming system configured to perform at least a first operation to input image data, a second operation to process said image data and form a print finish, and a third operation to display an expected image finish as a result of said first and said second operations, comprising:

first means for generating expected image finish information on completion of said first and said second operations;

second means for generating input setting screen information for receiving a setting input based on said expected image finish information generated by said first means for generating;

means for displaying on a display unit an expected image finish resulting from said expected image finish information and an input setting screen resulting from said input setting screen information generated by said second means for generating; and means for receiving at least said setting input, wherein, on receiving at least said setting input by said setting unit:

said first means for generating generates said expected image finish information based on at least said setting input, and said second means for generating generates said input setting screen information based on said expected image finish information generated by said first means for generating.

42. A method for storing and processing image data for an image-forming system configured to perform at least a first operation to input image data, a second operation to process said image data and form a print finish, and a third operation to display an expected image finish as a result of said first and said second operations, comprising the steps of:

receiving at least one of an image data input command, a process command, and a print finish command;

generating expected image finish information on completion of said first and said second operations;

generating input setting screen information for receiving a setting input based on said expected image finish information;

displaying on a display unit an expected image finish resulting from said expected image finish information and an input setting screen resulting from said input setting screen information; and receiving at least said setting input, wherein, on receiving at least said setting input:

said step of generating expected image finish information generates said expected image finish information based on said variety of setting inputs currently received, and said step of generating input setting screen information generates said input setting screen information based on said expected image finish information.

43. An image processing system configured to perform at least a first operation to process image data input and form a print finish, and a second operation to display an expected image finish as a result of said first operation, said image processing system being interconnected by way of a network, comprising:

a finish information generation unit configured to generate expected image finish information on completion of said first and said second operations;

an input setting screen information generation unit configured to generate input setting screen information for receiving a setting input based on said expected image finish information generated by said finish information generation unit;

a display unit configured to display on a display unit an expected image finish resulting from said expected image finish information and an input setting screen resulting from said input setting screen information generated by said input setting screen information generation unit; and a setting unit configured to receive at least said setting input by way of said input setting screen displayed on said display unit, respectively connected with one another by way of the network, wherein, on receiving at least said setting input by said setting unit:

said finish information generation unit generates said expected image finish information based on at least said setting input, and said input setting screen information generation unit generates said input setting screen information based on said expected image finish information generated by said finish information generation unit.

44. An image processing apparatus configured to perform at least a first operation to input image data, a second operation to process said image data and form a print finish, and a third operation to display an expected image finish as a result of said first and said second operations, said image processing system being incorporated into an image-forming system and being provided with a setting unit configured to receive a setting input regarding said print finish processing, comprising:

a finish information generation unit configured to generate expected image finish information on completion of said first and said second operations;

an input setting screen information generation unit configured to generate input setting screen information for receiving a setting input based on said expected image finish information generated by said finish information generation unit; and a setting unit configured to receive at least one of (1) a setting input based on said input setting screen information generated by said input setting screen information generation unit and (2) said setting input regarding said print finish processing, wherein, on receiving said at least one setting input:

said finish information generation unit generates said expected image finish information based on said at least one setting input, said input setting screen information generation unit generates said input setting screen information based on said expected image finish information generated by said finish information generation unit.

* * * * *